United States Patent
Hiraren et al.

(10) Patent No.: US 9,234,984 B2
(45) Date of Patent: Jan. 12, 2016

(54) PHOTOCHROMIC COMPOSITION

(75) Inventors: Toshimitsu Hiraren, Tsukuba (JP);
Katsuhiro Mori, Tsukuba (JP);
Yasutomo Shimizu, Tsukuba (JP)

(73) Assignee: Tokuyama Corporation, Yamaguchi (JP)

( * ) Notice: Subject to any disclaimer, the term of this patent is extended or adjusted under 35 U.S.C. 154(b) by 464 days.

(21) Appl. No.: 13/814,254

(22) PCT Filed: Aug. 4, 2011

(86) PCT No.: PCT/JP2011/067841
§ 371 (c)(1),
(2), (4) Date: Apr. 18, 2013

(87) PCT Pub. No.: WO2012/018070
PCT Pub. Date: Feb. 9, 2012

(65) Prior Publication Data
US 2013/0215488 A1    Aug. 22, 2013

(30) Foreign Application Priority Data

Aug. 6, 2010 (JP) ................. 2010-177704
Sep. 29, 2010 (JP) ................. 2010-218129
Jan. 28, 2011 (JP) ................. 2011-016108
Mar. 10, 2011 (JP) ................. 2011-052921
Mar. 11, 2011 (JP) ................. 2011-053701

(51) Int. Cl.
*G02F 1/07* (2006.01)
*G02B 1/04* (2006.01)
*C09K 9/02* (2006.01)
*G02B 5/23* (2006.01)

(52) U.S. Cl.
CPC ... *G02B 1/04* (2013.01); *C09K 9/02* (2013.01); *C09K 2211/1007* (2013.01); *C09K 2211/1011* (2013.01); *C09K 2211/1033* (2013.01); *C09K 2211/1088* (2013.01); *G02B 5/23* (2013.01)

(58) Field of Classification Search
CPC .............. G02B 1/04; G02B 5/23; G02F 1/01; G02F 1/07; G02F 2202/14; G02C 7/102
See application file for complete search history.

(56) References Cited

U.S. PATENT DOCUMENTS

| | | | |
|---|---|---|---|
| 5,693,738 A | 12/1997 | Okazaki et al. | |
| 5,820,988 A | 10/1998 | Nagaoka | |
| 7,118,806 B2 | 10/2006 | Nishizawa et al. | |
| 7,144,969 B2 | 12/2006 | Mcdonald | |
| 7,189,456 B2 | 3/2007 | King | |
| 7,261,842 B2 | 8/2007 | Henry et al. | |
| 2001/0050356 A1 | 12/2001 | Crano et al. | |
| 2003/0028549 A1 | 2/2003 | Hartel et al. | |
| 2003/0096935 A1 | 5/2003 | Nagpal et al. | |
| 2003/0105265 A1* | 6/2003 | McDonald | 528/44 |
| 2003/0193044 A1* | 10/2003 | Henry et al. | 252/582 |
| 2004/0138401 A1* | 7/2004 | Bojkova et al. | 528/44 |
| 2004/0220292 A1 | 11/2004 | Momoda et al. | |
| 2005/0196617 A1 | 9/2005 | King | |
| 2007/0256597 A1 | 11/2007 | Rukavina et al. | |

FOREIGN PATENT DOCUMENTS

| | | |
|---|---|---|
| EP | 0676429 A2 | 11/1995 |
| EP | 1394595 A1 | 3/2004 |
| EP | 1433814 A1 | 6/2004 |
| JP | S615910 A | 1/1986 |
| JP | 2002196103 A | 7/2002 |
| JP | 2003519398 A | 6/2003 |
| JP | 2005-509704 A | 4/2005 |
| JP | 2005-520034 A | 7/2005 |
| JP | 2006-509901 A | 3/2006 |
| JP | 2006-513276 A | 4/2006 |
| JP | 2007-138186 A | 6/2007 |
| WO | 01/57106 A1 | 8/2001 |
| WO | 02099513 A1 | 12/2002 |
| WO | 03/044071 A1 | 5/2003 |
| WO | 03/080693 A2 | 10/2003 |
| WO | 2007/139586 A2 | 12/2007 |

OTHER PUBLICATIONS

International application No. PCT/JP2011/067841, Notification of Transmittal of Translation of the International Preliminary Report on Patentability, dated Mar. 21, 2013.
English abstract of WO02099513 (A1).
English abstract of JP2002196103 (A).
English abstract of JP2003519398 (A).
English abstract of JPS615910 (A).
English abstract of JP 2007138186 (A).
English abstract of JP 2005509704 (A).
English abstract of JP 2005520034 (A).
English abstract of JP 2006513276 (A).
English abstract of JP JPS615910 (A).
European Application No. EP 11814695.0, Communication, dated Jun. 25, 2014.
Singapore Patent Application No. 201300943-6, Search Report, dated Apr. 11, 2014.

\* cited by examiner

*Primary Examiner* — Joseph P Martinez
(74) *Attorney, Agent, or Firm* — Cahn & Samuels, LLP

(57) ABSTRACT

A photochromic composition, which can function as an adhesive layer for bonding optical sheets made from a polycarbonate resin, may include a polyurethane-urea resin (A) obtained by reacting a polyol compound (A1), a polyisocyanate compound (A2) that has two or more isocyanato groups in the molecule, and an amino-containing compound (A3) that contains two or more isocyanato-reactive groups in the molecule, with at least one of the isocyanato-reactive groups being an amino group; and a photochromic compound (B).

21 Claims, No Drawings

PHOTOCHROMIC COMPOSITION

This application is a U.S. national stage application of PCT international application PCT/JP2011/067841 filed on 4 Aug. 2011 which claims priority of Japanese patent documents 2010-177704 filed on 6 Aug. 2010; 2010-218129 filed on 29 Sep. 2010; 2011-016108 filed on 28 Jan. 2011; 2011-052911 filed on 10 Mar. 2011; and 2011-053701 filed on 11 Mar. 2011, the entireties of which are incorporated herein by reference.

TECHNICAL FIELD

The present invention relates to a novel photochromic composition suitably used as a photochromic adhesive agent, particularly as a photochromic adhesive agent for binding optical sheets or films made of polycarbonate resins with each other. Also, the present invention relates to an optical article including a multilayer structure made by binding the optical sheets or films with each other via the adhesive layer comprising the photochromic composition.

DESCRIPTION OF THE RELATED ART

Recently especially in United States, the needs is rapidly increasing for the plastic base material using a polycarbonate of transparent and having excellent impact resistance, for the use of the sunglasses with a dizziness prevention property. Further, in regards with such plastic sunglass, the photochromic sunglass made of plastic is rapidly becoming popular which can control the dizziness prevention property by changing a transparency depending on the surrounding brightness by combining with a photochromic pigments.

However, the processing of the photochromic sunglass made of plastic is not necessarily easy. For example, in the method of injection molding (refer to Patent 1) the polycarbonate resin in the mold installed with a composite film formed with a photochromic coating film on the surface of the polycarbonate film by using the photochromic coating liquid which is added with photochromic agent to the acrylate copolymer, it was difficult to obtain a sunglass having good photochromic characteristic. Also, as the method for producing the synthetic resin laminated article having good photochromic characteristic, the method is proposed wherein to the one side of the transparent synthetic resin layer such as a polycarbonate sheet which moves continuously, the resin layer having photochromic characteristic is coated continuously; then after carrying out the drying of the resin layer, other transparent resin layer is adhered with each other or so (refer to Patent 2 and Patent 3).

However, in such methods, the resin composition (specifically, polyurethane resin composition) used for forming the resin having above mentioned photochromic characteristic includes solvents such as tetrahydrofuran or toluene. In order to exhibit the photochromic characteristic of the resin layer, the resin layer has to be coated thick, and in such case, since the used amount of the solvent increases, when said resin composition is coated to the transparent synthetic resin layer such as polycarbonate sheet or so, there were problems such as the deteriorated appearance caused by the dissolving of the transparent synthetic resin layer, and the lowered photochromic characteristic due to the synthetic resin eluted into the urethane resin.

Also, in the method described in the Patent article 1, instead of said composite film, there is a method which uses "the multilayer sheet binding the polycarbonate sheet by comprising the photochromic pigment" (refer to Patent 4 and Patent 5). However, in such method, the adhesion and the heat resistance of the polycarbonate sheet in the above mentioned multilayer sheet were insufficient. Thus, when the optical article is produced by installing the above mentioned laminated article into the metal mold and injection molding the polycarbonate resin to the metal mold; there were problems such as the peeling of the obtained the optical article and the optical strain or so.

[Patent 1] JP Patent Application Laid Open No S61-5910
[Patent 2] WO2002/099513
[Patent 3] JP Patent Application Laid Open No. 2002-196103
[Patent 4] JP Patent Application Laid Open No 2003-519398
[Patent 5] US Patent Application Publication No. 2004-096666

SUMMARY OF INVENTION

The object of the present invention is, firstly, to provide the photochromic composition having excellent adhesion and heat resistance, and also exhibiting an excellent photochromic property when used as the adhesive layer for binding the optical sheets or the optical films.

Also, the second object of the present invention is to provide an optical article including the multilayer structure in which the optical sheets or the optical films are bound by the adhesive layer comprising the photochromic property; wherein said optical article has excellent adhesion and heat resistance, and further has excellent photochromic characteristic in said multilayer structure.

Further, the third object of the present invention is to provide a method of capable of producing the optical article without damaging the appearance even in case the thermoplastic resin such as polycarbonate or so is used as the optical sheet or the optical film.

In order to solve above mentioned problem, the present inventors have carried out keen examination concerning the relation between the structure of the photochromic polyurethane resin adhesive layer and the characteristic of the obtained optical article. As a result, (1) in case the photochromic polyurethane-urea resin adhesive layer is formed by using the polyurethane-urea resin, the obtained laminated article has excellent adhesion, the heat resistance, the photochromic property and the durability or so; also (2) in case of forming the above mentioned photochromic polyurethane-urea resin adhesive layer without using the solvent, or by drying after forming the cast membrane using the solvent (removal of the solvent), and to produce the laminated article using the photochromic adhesive sheet (the photochromic polyurethane-urea resin adhesive layer) comprising the polyurethane-urea resin and the photochromic compound dispersed therein, the present inventors have found that the bad influence caused by the solvent can be avoided and the photochromic property does not decline, thereby the present invention was accomplished.

That is, the present invention is the photochromic composition comprising (A) polyurethane-urea resin having the urea bond in the molecular chain, and (B) photochromic compound.

The photochromic composition of the present invention functions as the adhesive agent or the binder, and when the laminated article binding the optical sheets or films formed of polycarbonate resin or so by using the adhesive layer formed of said composition, the obtained laminated article shows excellent adhesion and photochromic characteristic. Further, as the above mentioned adhesive layer shows excellent heat resistance, even when the optical article is produced by installing the above mentioned laminated article into the metal mold and injection molding the thermoplastic resin such as polycarbonate resin or so in the metal mold, the adhesion and the photochromic characteristic barely declines, and thus the optical strain is unlikely to happen.

Also, according to the method of the present invention, even when the thermoplastic resin such as polycarbonate or so having low solvent resistance is used as the optical sheet or film, the bad influence caused by the solvent can be avoided; hence the photochromic property is not lowered.

DETAILED DESCRIPTION OF THE INVENTION

The photochromic composition of the present invention comprises (A) a polyurethane-urea resin having urea bond in a molecular chain (hereinafter it may be referred to as A component), and (B) a photochromic compound (hereinafter, it may be referred to as B component). Herein below, these A component and B component will be described.

A Component: Polyurethane-Urea Resin

The polyurethane resin used in the conventional photochromic adhesive agent or binder is an urethane resin having a chain extension by urethane bond using diol compound such as 1,4-butane diol or so, and it did not have urea bond in the molecule of the resin. On the contrary, A component of the photochromic composition of the present invention is the polyurethane-urea resin having urea bond (—R—NH—CO—NH—) in the molecular chain; and by comprising such resin as the resin component, the heat resistance, and the adhesion and the durability of the photochromic compound can be improved when the photochromic composition of the present invention is used as the adhesive agent or the binder.

It is not necessarily clearly understood why such effect can be obtained, however the present inventors speculate the following reasons. That is, by having a urea bond in the polyurethane resin, the rigidity of the molecule is enhanced, and also the hydrogen bond between the molecule become further strong; thereby the heat resistance is thought to be improved. Also, in regards with the improvement of the durability of the photochromic compound, due to the presence of the urea bond in between the molecule, the hydrogen bond becomes stronger; thus the oxygen in the air becomes difficult to disperse into the polyurethane-urea resin; thereby the photooxidative degradation which is known as the general degradation system of the photochromic compound is thought to be suppressed. Further, in regards with the improvement of the adhesive strength, it is thought that the cohesion failure of the resin is less likely to happen since the hydrogen bond between the molecular chain has become stronger due to the presence of the urea bond.

As the polyurethane-urea resin used as A component, it is not particularly limited as long as the polyurethane-urea resin has the urea bond in the molecular chain, however the polyurethane-urea resin which does not have the isocyanate group at the terminal end of the molecule is preferable from the point that good photochromic characteristic can be obtained when used as the composition of the present invention. Also, from the point of easy production, it is preferably the polyurethane-urea resin obtained by reacting, (A1) (hereinafter, it may be referred to as A1 component) at least one polyol compound selected from the group consisting of polyether polyol, polycarbonate polyol, polycaprolactone polyol, and polyester polyol;

(A2) (hereinafter, it may be referred to as A2 component) a polyisocyanate compound comprising two or more isocyanate groups in the molecule, and (A3) (hereinafter, it may be referred to as A3 component) an amino group containing compound comprising two or more groups capable of reacting with the isocyanate group and among these groups, at least one thereof is the amino group. In such polyurethane-urea resin, urea bond is introduced in the molecule as the compound having the amino group is used as A3 component which is the source material. Hereinafter, these component will be explained.

A1 Component: The Polyol Compound

As for the polyol compound of A1 component, from the point that the prepared polyurethane-urea resin is not excessively highly crosslinked, preferably two to six hydroxyl groups are included in the molecule, and further considering the solubility to the organic solvent, the number of the hydroxyl group included in the molecule are preferably 2 to 3. Also, the aforementioned polyol compound such as polyether polyol, polycarbonate polyol, polycaprolactone polyol, polyester polyol or so may be used alone or it may be used by mixing two or more thereof. However, from the point of the heat resistance, the adhesion, the weather resistance, and the hydrolysis degradation resistance or so, it is preferable to use polycarbonate polyol, polycaplolactone polyol; and among these, polycarbonate polyol is preferably used.

Herein below, various compounds used as A1 component will be described in detail.

Polyether Polyol:

As for polyether polyol used as A1 component, polyether polyol compounds obtained by a reaction between an alkylene oxide and a compound having two or more of active hydrogen containing group in the molecule; and polymerpolyol, urethane modified polyetherpolyol, and polyetherestercopolymer polyol or so which are the modification of said polyether polyol may be mentioned.

Note that, as for the compound having two or more active hydrogen containing groups in the molecule, polyol compounds such as glycol or glycerin having one or more hydroxyl groups in the molecule such as water, ethyleneglycol, propyleneglycol, butanediol, glycerin, trimethylolpropane, hexanetriol, triethanolamine, diglycerin, pentaerythritol, trimethylolpropane, hexanetriol or so may be mentioned, and these may be used alone or by combining two or more thereof.

Also, as for said alkylene oxide, cyclic ether compound such as ethylene oxide, propylene oxide, and tetrahydrofurane or so may be mentioned, and these may be used alone or by combining two or more thereof.

For the polyetherpolyol of A1 component, from the point of the heat resistance and the photochromic characteristic (a color optical density, a color fading speed, a weather resistance or so) of the obtained polyurethane-urea resin, in particular from the point of the weather resistance of the photochromic compounds; the number average molecular weight is preferably 400 to 3000, more preferably 400 to 2000, and most preferably it is 400 to 1500.

Such polyether polyol can be obtained as a chemical reagent or as for the industrial use, and as for the commercially available examples, "EXENOL™" series and "EMULSTAR™" made by ASAHI GLASS CO., Ltd, "ADEKA POLYETHER" series made by ADEKA CORPORATION or so may be mentioned.

Polycarbonate Polyol:

As for polycarbonate polyol used as A1 component; polycarbonate polyol obtained by phosgenation of one or more of low molecular polyols such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethyleneglycol, dipropyleneglycol, neopentylglycol, cyclohexane-1,4- diol, cyclohexane-1,4-dimethanol, dimer acid diol, ethylene oxide adduct or propylene oxide adduct of bisphenol A, bis (β-hydroxyethyl)benzene, xylene glycol, glycerin, trimethylolpropane, pentaerythritol; or polycarbonate polyol obtained by ester exchange method from ethylenecarbonate, diethylcarbonate, and diphenylcarbonate or so may be mentioned. As for polycarbonate polyol for A1 component, from the same reason as polyether polyol, the number average molecular weight is preferably 400 to 3000, and more preferably it is 400 to 2000, and most preferably it is 400 to 1500. These polycarbonate polyol can be obtained as a chemical reagent or as for industrial use, and as for the commercially available examples, "DURANOL™" series made by Asahi Kasei Chemicals Corporation, "Kuraray Polyol™" series made by KURARAY CO., LTD, "Praccel™" series made by DAICEL CORPORATION, "NIPPOLAN™" series made by NIPPON POLYURETHANE INDUSTRY CO., LTD, "ETERNACOLL™" series made by UBE INDUSTRIES LTD or so may be mentioned.

Polycaprolactone Polyol:

As polycaprolactone polyol used for A1 component, the compound obtained by ring-opening polymerization of ε-caprolactone can be used. For polycaprolactone as A1 component, from the same reason as polyether polyol, the number average molecular weight is preferably 400 to 3000, and more preferably it is 400 to 2000, and most preferably it is 400 to 1500. These polycaprolactone polyol can be obtained as a chemical reagent or as for the industrial use, and as for the commercially available example; "Praccel™" series made by DAICEL CORPORATION may be mentioned.

Polyester Polyol:

As polyester polyol used for A1 component, polyester polyol obtained by condensation reaction between polyvalent alcohol and polybasic acid or so may be mentioned. Here, as said polyvalent alcohol, ethyleneglycol, 1,2-propanediol, 1,3-butanediol, 1,4-butanediol, 3-methyl-1,5-pentadiol, 1,6-hexanediol, 3,3'-dimethylolheptane, 1,4-cyclohexanedimethanol, neopentylglycol, 3,3-bis(hydroxymethyl)heptane, diethyleneglycol, dipropyleneglycol, glycerin, trimethylolpropane or so may be mentioned; and these may be used alone or by combining two or more thereof. Also, as said polybasic acid, succinic acid, adipic acid, azelaic acid, sebacic acid, dodecanedicarboxylic acid, cyclopentanedicarboxylic acid, cyclohexanedicarboxylic acid, ortophthalic acid, isophthalic acid, terephthalic acid, naphthalenedicarboxylic acid or so may be mentioned; and these may be used alone or by combining two or more thereof.

As polyester polyol for A1 component, from the same reason as polyether polyol, the number average molecular weight is preferably 400 to 3000, and more preferably it is 400 to 2000, and most preferably it is 400 to 1500. These polyesterpolyol can be obtained as a chemical reagent or as for the industrial use, and as for the commercially available example; "POLYLITE™" series made by DIC Corporation, "NIPPOLAN™" series made by NIPPON POLYURETHANE INDUSTRY CO., LTD, "MAXIMOL™" series made by KAWASAKI KASEI CHEMICALS LTD or so may be mentioned.

A2 Component: The Polyisocyanate Compounds

As the polyisocyanate compound having two or more isocyanate group in the molecule which is used as A2 component in the present invention, an aliphatic polyisocyanate compounds, an alicyclic polyisocyanate compound, an aromatic polyisocyanate compound, and the mixture thereof may be used. Among these, from the point of the weather resistance, the aliphatic polyisocyanate compound and/or the alicyclic polyisocyanate compound are preferably used. Also, as for the same reason, the aliphatic polyisocyanate compound is preferably 30 to 100 wt %, particularly 50 to 100 wt % of the polyisocyanate compound of A2 component. Note that, in the polyisocyanate compound of A2 component, the number of the isocyanate group included in the molecule only need to be two or more, however from the point of the solubility to the organic solvent, the number of the isocyanate groups included in the molecule are preferably two.

For examples of polyisocyanate compound suitably used for A2 component, the aliphatic polyisocyanate compounds such as tetramethylene-1,4-diisocyanate, hexamethylene-1,6-diisocyanate, octamethylene-1,8-diisocyanate, 2,2,4-trimethylhexane-1,6-diisocyanate or so; the alicyclic polyisocyanate compound such as cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, isomer mixture of 4,4'-methylenebis (cyclohexylisocyanate), hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis(isocyanatomethyl)cyclohexane, 2-isocyanato-4-[(4-isocyanatocyclohexyl)methyl]-1-methylcyclohexane, 2-(3-isocyanatopropyl)cyclohexylisocyanate, norbornanediisocyanate or so; the aromatic polyisocyanate compound such as phenylcyclohexylmethandiisocyanate, isomer mixture of 4,4'-methylenebis(phenylisocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylenediisocyanate, tetramethylxylylenediisocyanate, naphthalenediisocyanate, diphenyletherdiisocyanate, 1,3-diisocyanatomethylbenzene, 4,4'-diisocyanato-3,3'-dimethoxy(1,1'-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenylisocyanate or so; the reaction product of 1,2,2,6,6-pentamethyl-4-hydroxypiperidine with 1-methylbenzene-2,4,6-triisocyanate, and the reaction product between 1,2,2,6,6-pentamethyl-4-hydroxypiperidine with 1,6,11-undecanetriisocyanate or so may be mentioned.

Among these, from the point of the weather resistance of the obtained polyurethane-urea resin, as mentioned in the above, 30 to 100 wt %, particularly 50 to 100 wt % of the polyisocyanate compound of A2 component is preferably at least one polyisocyanate compound selected from the group consisting of the aliphatic polyisocyanate compound, and the alicyclic polyisocyanate compound. As specific examples of preferable compounds, tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, isomer mixture of 4,4'-methylenebis(cyclohexylisocyanate), hexahydrotoluene-2,4-diisocyanate, hexahydrotoluene-2,6-diisocyanate, hexahydrophenylene-1,3-diisocyanate, hexahydrophenylene-1,4-diisocyanate or so may be mentioned. These isocyanate compounds may be used alone or by combining two or more thereof.

A3 Component: The Amino Group Containing Compound

The amino group containing compound used for A3 component in the present invention is the amino group containing compound having two or more groups capable of reacting with an isocyanate group, and among these groups, at least one is the amino group (—NH$_2$, or NH(R). Note that, R refers to an alkyl group, particularly to the alkyl group having 1 to 5 carbon atoms.). Here, the reactive group other than the amino group which can react with the isocyanate group is a hydroxyl group (—OH), a mercapto group (—SH) and a carboxyl group (—C(=O)OH) or so.

The A3 component functions as a chain extender when producing the polyurethane-urea resin; and by using A3 component as the chain extender, the urea bond is introduced into the polyurethane resin, and becomes the polyurethane-urea resin.

In order to make the obtained polyurethane-urea resin to a suitable hardness, and also to maintain the heat resistance, the adhesion, the photochromic characteristic in a good condition, the molecular weight of the amino group containing compound is preferably 50 to 300, more preferably 50 to 250, and most preferably 55 to 200.

As the amino group containing compound of A3 component, at least one compound selected from the group consisting of diamine, triamine, aminoalcohol, amino carboxylic acid, and aminothiol or so can be used suitably. As the specific examples of the compound suitably used as the amino group containing compound in the present invention, as diamine and triamine; isophoronediamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis-(2-aminoethyl) piperazine, bis-(4-aminocyclohexyl)methane, bis-(4-amino-3-butylcyclohexyl)methane, 1,2-, 1,3- and 1,4-diaminocyclohexane, norbornanediamine, hydrazine, dihydrazine adipate, phenyldiamine, 4,4'-diphenylmethandiamine, N,N'-diethylethylenediamine, N,N'-dimethylethylenediamine, N,N'-dipropylethylenediamine, N,N'-dibutylethylenediamine, N-methylethylenediamine, N-ethylethylenediamine, bis(hexamethylene)triamine, 1,2,5-pentatriamine or so may be mentioned. Also, as amino alcohol, 2-aminoethanol, 3-aminopropanol, 4-aminobutanol, 5-aminopentanol, 6-aminohexanol, 2-piperidinemethanol, 3-piperidinemethanol, 4-piperidinemethanol, 2-piperidineethanol, 4-piperidineethanol or so may be mentioned. As for aminocarboxylic acid, glycine, alanine, lysine, leucine or so may be mentioned; and as aminothiol, 1-aminothiol, 2-aminothiol or so may be mentioned. These amino group containing compounds may be used alone or by combining two or more thereof.

As for the amino group containing compounds, from the point of the heat resistance, the adhesion, and the durability of the photochromic compounds, particularly diamine compounds are preferably used. The reason for this is because by using the amino group containing compound when producing A component, the obtained polyurethane-urea resin has the urea bond; thereby the rigidity of the molecule increases and also the hydrogen bond between the molecular chain becomes stronger, thus it is speculated that the heat resistance is enhanced. Also, in regards with the improvement of the durability of the photochromic compounds, the hydrogen bond between the molecular chain becomes further strong due to the presence of the urea bond; hence the oxygen in the air becomes difficult to disperse into said polyurethane-urea resin; thereby the photooxidized degradation known as the general degradation system of photochromic compounds is thought to be suppressed. Further, regarding the improvement of the adhesive strength, the hydrogen bond between the molecular chain becomes further strong due to the presence of the urea bond; hence the cohesion failure of the resin becomes less likely to happen.

The Preparation Method of A Component

In case of obtaining A component by reacting these A1 component, A2 component, and A3 component; the one shot method or the prepolymer method can be used, and for example, A component can be suitably obtained by the following method.

First, urethane prepolymer is obtained by reacting A1 component and A2 component, then A component is produced by reacting said urethane prepolymer and A3 component.

In the above mentioned method, the reaction between A1 component and A2 component is carried out under the presence of the solvent or without the presence of the solvent, both in the inert gas atmosphere such as nitrogen or argon at 25 to 120° C. for 0.5 to 24 hours. As for the solvent, the organic solvent such as methylethylketone, diethylketone, toluene, hexane, heptane, ethyl acetate, dimethylformamide (DMF), dimethylsulfoxide (DMSO), tetrahydrofurane or so may be used. During the reaction, in order to avoid the reaction between the isocyanate group in the polyisocyanate compound and water as impurities, it is preferable that various reaction reagents and solvent are carried out with dehydration treatment in advance to dry sufficiently. Also, when carrying out the above mentioned reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be used. The added amount when using the catalyst is preferably 0.001 to 1 parts by weight with respect to total 100 parts by weight of said A component.

The reaction between A3 component and the urethane prepolymer obtained as such may be carried out under the presence of solvent or without the solvent, both in the inert gas atmosphere such as nitrogen or argon or so at 25 to 120° C. for 0.5 to 24 hours. As for the solvent, methanol, ethanol, isopropyl alcohol, t-butanol, 2-butanol, n-butanol, methylethylketone, diethylketone, toluene, hexane, heptane, ethyl acetate, DMF, DMSO, THF or so can be used.

The amount ratio of A1 component, A2 component, and A3 component used in the reaction of the above mentioned method can be determined accordingly; however from the point of the balance of the heat resistance, the adhesive strength, and the photochromic characteristics (the color optical density, the color fading speed, the weather resistance or so) of the obtained polyurethane-urea resin, it is preferably at the amount ratio of the following. That is, when the total mol numbers of the hydroxyl group included in A1 component is n1, the total mol numbers of isocyanate group included in A2 component is n2, and the total mol number of amino group included in A3 component is n3; the amount ratio of n1:n2:n3=0.3 to 0.9:1:0.1 to 0.7 is preferable, and particularly n1:n2:n3=0.35 to 0.85:1:0.15 to 0.65 is preferable, and most preferably n1:n2:n3=0.4 to 0.8:1:0.2 to 0.6. Here, above mentioned n1 to n3 can be obtained as the product of used mol number of the compound used for each component, and the number of each group present in one molecule of said compound.

The polyurethane-urea resin obtained by such reaction is carried out with the after treatment such as distillation of the solvent if needed, or dropping the poor solvent such as water or so thereby precipitate/filter the polyurethane-urea resin then carrying out the drying or so, then it may be used as A component, or it can be used as the photochromic composition of the present invention by keeping it dissolved in the reaction solvent.

The polyurethane-urea resin of A component has the molecular weight of 10000 to 1000000, more preferably 30000 to 900000, and most preferably 50000 to 800000 from the point of the heat resistance, the adhesive strength, the photochromic characteristics (the color optical density, the color fading speed, the weather resistance or so) of the obtained polyurethane-urea resin. Note that, the molecular weight of the above mentioned polyurethane-urea resin refers to the molecular weight in terms of polystyrene measured under the condition of using a gel permeation chromatography (GPC), column: Shod ex KD-805, KD-804 (made by SHOWA DENKO K.K.), eluent: LiBr (10 mmol/L)/DMF solution, flow speed: 1 ml/min, detector: R1 detector, polyurethane-urea resin sample solution: 0.5% dimethylformamide (DMF) solution.

Also, if the molecular weight of the polyurethane-urea resin measured as same as the above is in terms of polyethyleneoxide, the preferable range of the molecular weight thereof is 5000 to 150000, more preferably 8000 to 100000, and most preferably 10000 to 60000.

Also, from the point of processability when producing the laminated article by adhering the optical sheets or films with each other using the photochromic composition of the present invention; or when producing the optical articles using the obtained laminated article, and also from the point of processability of coating and curing the hard coat liquid in case of forming the hard coat layer on the surface of these laminated article or optical articles; the polyurethane-urea resin as A component has the heat resistance of 60 to 200° C. and particularly 80 to 150° C. Note that, the heat resistance refers to the softening point measured at the following condition using the thermomechanical analysis (made by SII Nano Technology Inc., TMA 120C).

(Measuring Condition)

Temperature raising speed: 10° C./min, measuring temperature range: 30 to 200° C., probe: probe with needle of tip diameter 0.5 mm.

A4 Component: The Functionalization Compound

In the present invention, besides the above described A1 to A3 components, the functionalization compound having one or two groups capable of reacting with isocyanate groups in the molecule, and having the piperidine structure, the hindered phenol structure, the triazine structure, or the benzotriazol structure is preferably used. By using such functionalization compound, the piperidine structure, the hindered phenol structure, the triazine structure, or the benzotriazol structure can be provided to the polyurethane-urea resin, and the polyurethane-urea resin having excellent functionality such as the hindered amine photostability, the antioxidation property or the ultraviolet ray absorbing property or so.

The Functionalization Compound Having One or Two Groups Capable of Reacting with the Isocyanate Group in the Molecule, and Having Piperidine Structure, Hindered Phenol Structure, Triazine Structure, or Benzotriazol Structure in the Molecule As the group capable of reacting with the isocyanate group, the amino group (—NH$_2$, and —NH(R)), the hydroxyl group (—OH), the mercapto group (—SH:thiol group), the carboxyl group (—C(=O)OH) or chloride group (—C(=O)OCl) or so may be mentioned. Particularly, in order to obtain the polyurethane-urea resin exhibiting excellent effect, the group capable of reacting with this isocyanate group is preferably one in the molecule. This reason is not clear, however the following reasons is thought to be the reason. By having only one said group, the functionalization compound is introduced to the side chain or the terminal end of the polyurethane-urea resin. Therefore, the functionalization compound is thought to act efficiently to the substance which lowers the durability of the radical or so.

Also, the above mentioned piperidine structure, the hindered phenol structure, the triazine structure, or the benzotriazol structure exhibits the photo stabilization effect (the piperidine structure), the antioxidation effect (the hindered phenol structure), or the ultraviolet ray absorbing effect (the triazine structure, or the benzotriazol structure). By using the compound having such structure, the durability (the photo stability, the antioxidation property, the ultraviolet ray absorbing property) of the polyurethane-urea resin itself as A component and the photochromic compound can be improved. Among these, in order to improve the durability of the photochromic compound, the compound having the piperidine structure is preferably used. Hereinafter, various compounds used as A4 component is described in detail.

The Functionalization Compound Having the Piperidine Structure

As for the functionalization compound having the piperidine structure used as A4 component in the present invention, the compound having the structure shown in the following general formula can be used suitably.

[Chemical formula 1]

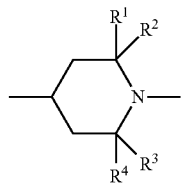

(i)

(in the above formula, $R^1$, $R^2$, $R^3$, and $R^4$ are preferably alkyl group having carbon atoms of 1 to 4 respectively, and particularly it is methyl group.)

The compound having nitrogen atom of above piperidine ring or the group capable of reacting with the isocyanate group at the carbon atom of the fourth position corresponds to the functionalization compound having the piperidine structure.

Hereinafter, further specific compound will be described.

Among the functionalization compound used as A4 component in the present invention, as for the compound which can introduce the piperidine structure at the terminal end of the polyurethane-urea resin, the compounds shown by the following general formula (1) may be mentioned.

[Chemical formula 2]

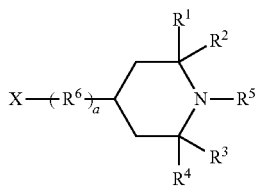

(1)

(in the above formula, $R^1$, $R^2$, $R^3$, and $R^4$ are same as in said general formula (1), $R^5$ is alkyl group having carbon atoms of 1 to 10 or hydrogen, $R^6$ is alkylene group having carbon atoms of 1 to or polymethylene group having carbon atoms of 3 to 20, a is 0 or 1, and X is the group capable of reacting with the isocyanate group.)

In the above mentioned general formula (1), $R^1$, $R^2$, $R^3$, and $R^4$ are independent an alkyl group having carbon atoms of 1 to 4 respectively, however it is preferable that all four alkyl groups are methyl group.

$R^5$ is an alkyl group having carbon atoms of 1 to 10 or hydrogen. Among these, from the point of easiness to obtain, it is preferably an alkyl group having carbon atoms of 1 to 4, or hydrogen. Note that, since $R^1$, $R^2$, $R^3$, and $R^4$ are alkyl group having carbon atoms of 1 to 4, thus even if $R^5$ is hydrogen atom, the nitrogen atom where $R^5$ is bonded will not react with the isocyanate group due to the steric hindrance.

$R^6$ is alkylene group having carbon atoms of 1 to 20 or polymethylene group having carbon atoms of 3 to 20; however preferably it is alkylene group having carbon atoms of 1 to 10, or polymethylene group having carbon atoms of 3 to 10. Note that, when a is 0, it indicates that X is directly bonded to the piperidine ring.

X is a group capable of reacting with the isocyanate group, and preferably it is the amino group, the hydroxyl group, the carboxyl group or the thiol group. Among these, the amino group and hydroxyl group are preferable from the point of the reactivity with the isocyanate group and easiness to obtain.

As for specific examples of the functionalization compound shown by the above formula (1), 1,2,2,6,6-pentamethyl-4-hydroxypiperidine, 1,2,2,6,6-pentamethyl-4-aminopiperidine, 2,2,6,6-tetramethyl-4-hydroxypiperidine, 2,2,6,6-tetramethyl-4-aminopiperidine, 1,2,2,6,6-pentamethyl-4-aminomethylpiperidine, and 1,2,2,6,6-pentamethyl-4-aminobutylpiperidine or so may be mentioned.

Also, as for the functionalization compound which can introduce the piperidine structure to the terminal end of the polyurethane-urea resin, the following compound which is the reaction product between dimethyl succinate and 4-hydroxy-2,2,6,6-tetramethyl-1-piperidineethanol can be used.

[Chemical formula 3]

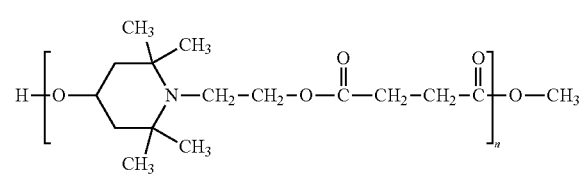

Note that, in the above compound, n preferably satisfies the range of 5 to 20.

Among A4 component used in the present invention, as for the functionalization compound which can introduce the piperidine structure into the main chain of the polyurethane-urea resin, the compounds shown by the following general formula (2), (3), (4) can be preferably used.

[Chemical formula 4]

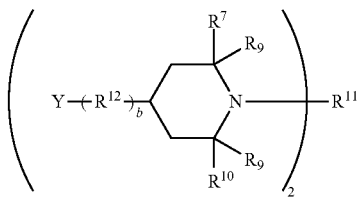

Following the formula (2).

(in the above formula, $R^7$, $R^8$, $R^9$ and $R^{10}$ are alkyl group having carbon atoms of 1 to 4 respectively, $R^{11}$ is an alkylene group having carbon atoms of 1 to 20, or a polymethylene group having carbon atoms of 3 to 20, $R^{12}$ is an alkylene group having carbon atoms of 1 to 20, or a polymethylene group having carbon atoms of 3 to 20, and Y is the group capable of reacting with the isocyanate group.)

The compound shown in the above can be suitably used as well.

In the above general formula (2), $R^7$, $R^8$, $R^9$, and $R^{10}$ are alkyl group having carbon atoms of 1 to 4 respectively; however it is preferable that all four alkyl groups are methyl group.

$R^{11}$ is an alkylene group having carbon atoms of 1 to 20, or polymethylene group having carbon atoms of 3 to 20; and it is preferably alkylene group having carbon atoms of 1 to 10, or polymethylene group having carbon atoms of 3 to 10.

$R^{12}$ is alkylene group having carbon atoms of 1 to 20, or polymethylene group having carbon atoms of 3 to 20; and it is preferably alkylene group having carbon atoms of 1 to 10, or polymethylene group having carbon atoms of 3 to 10. Note that, when b is 0, it indicates that Y is directly bonded to the piperidine ring.

Y is same as X shown in said general formula (1).

As examples of the functionalization compound shown in the above formula (2), the following compounds may be mentioned.

[Chemical formula 5]

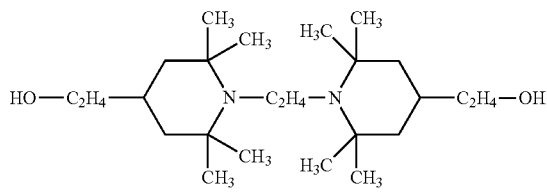

[Chemical formula 6]

Following formula (3).

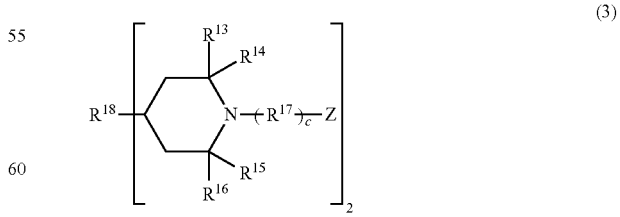

(in the above formula, $R^{13}$, $R^{14}$, $R^{15}$ and $R^{16}$ are independent alkyl group having carbon atoms of 1 to 4 respectively, $R^{17}$ is alkylene group having carbon atoms of 1 to 20 or polymethylene group having carbon atoms of 3 to 20, c is 0 or 1, $R^{18}$ is alkylene group having carbon atoms of 1 to 20 or polymethylene group having carbon atoms of 3 to 20, and Z is a group capable of reacting with the isocyanate group.)

The compound shown in the above can be suitably used.

In the above mentioned general formula (3), $R^{13}$, $R^{14}$, $R^{15}$ and $R^{16}$ are independent alkyl group having carbon atoms of 1 to 4 respectively; however it is preferable that all four alkyl groups are methyl group.

$R^{17}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10. Note that, when c is 0, it indicates that Z is directly bonded to piperidine ring.

$R^{18}$ is alkylene group having carbon atoms of 1 to 20 or polymethylene group having carbon atoms of 3 to 20.

Z is same as X in said general formula (1).

As for the examples of the functionalization compounds having the piperidine structure shown by the above general formula (3), bis(2,2,6,6-tetramethyl-1-methoxy-4-piperidinyl)sebacate or so may be mentioned.

[Chemical formula 7]

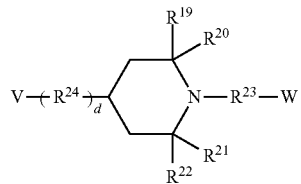

(4)

(in the above formula, $R^{19}$, $R^{20}$, $R^{21}$, and $R^{22}$ are alkyl group having carbon atoms of 1 to 4 respectively, $R^{23}$ is alkylene group having carbon atoms of 1 to 20, or a polymethylene group having carbon atoms of 3 to 20, $R^{24}$ is alkylene group having carbon atoms of 1 to 20, or a polymethylene group having carbon atoms of 3 to 20, and V and W are respectively the group capable of reacting with the isocyanate group.)

In the above described general formula (4), $R^{19}$, $R^{20}$, $R^{21}$, and $R^{22}$ are alkyl group having carbon atoms of 1 to 4 respectively; however it is preferable that all four alkyl groups are methyl group.

$R^{23}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10, $R^{24}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10. Note that, d is 0 or 1, and when d is 0, it indicates that V is directly bonded to the piperidine ring.

Also, V and W are same as X in said general formula (1), and it may be the same group or different group.

As for the examples of the functionalization compounds having the piperidine structure shown by the above general formula (4), 4-hydroxy-2,2,6,6-tetramethyl-1-piperidineethanol or so may be mentioned.

The Functionalization Compound Having the Hindered Phenol Structure

As the functionalization compound having the hindered phenol structure used as A4 component in the present invention, the compound having the structure shown by the following general formula (ii) in the molecule can be used.

[Chemical formula 8]

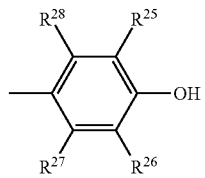

(ii)

(in the above formula, $R^{25}$, $R^{26}$, $R^{27}$ and $R^{28}$ are alkyl group having a carbon atoms of 1 to 18 or a hydrogen atom respectively, and at least one of $R^{25}$ or $R^{26}$ is alkyl group having carbon atoms of 4 or more.)

Further, the compound having the group capable of reacting with the isocyanate group at the carbon atom of first position of the above structure will be the terminator having the hindered phenol structure. Since at least one of $R^{25}$ and $R^{26}$ is alkyl group, the hydroxyl group of the fourth position in the above formula (ii) is unlikely to react with the isocyanate group due to the steric hindrance. Therefore, the hydroxyl group of the fourth position will not be a group capable of reacting with the isocyanate group.

The compound having the above mentioned structure and having two groups capable of reacting with the isocyanate group can introduce the hindered phenol structure in the main chain of the polyurethane-urea resin of A component as described in said functionalization compound having the piperidine structure. Also, in case the group capable of reacting with the isocyanate group is one, the hindered phenol structure can be introduced to the side chain or the terminal end of the polyurethane-urea resin.

Among the functionalization compound having the hindered phenol structure, as for the preferable compound, the following general formula (5) can be mentioned.

[Chemical formula 9]

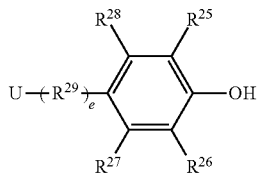

(5)

(in the above formula, $R^{25}$, $R^{26}$, $R^{27}$ and $R^{28}$ are alkyl group having a carbon atoms of 1 to 18 or a hydrogen atom respectively, at least one of $R^{25}$ or $R^{26}$ is alkyl group having carbon atoms of 4 or more, $R^{29}$ is alkylene group having carbon atoms of 1 to 10 or polymethylene group having carbon atoms of 3 to 10, e is 0 or 1, and U is the group capable of reacting with isocyanate group.)

In the above general formula (5), $R^{25}$ and $R^{26}$ is alkyl group having carbon atoms of 1 to 18 or hydrogen atom, and at least one of them is alkyl group having carbon atom of 4 or more. Preferably, at least one of $R^{25}$ and $R^{26}$ is tert-butyl group. By setting either one of group as the alkyl group having carbon atoms of 4 or more, the durability of the obtained photochromic composition can be further improved.

$R^{27}$ and $R^{28}$ are alkyl group having carbon atoms of 1 to 18, or hydrogen atom; and further preferably alkyl group having carbon atoms of 1 to 10 or hydrogen.

Also, U is the group capable of reacting with the isocyanate group, and it is amino group, hydroxyl group, thiol group, carboxyl group, or chloride group; more preferably it is amino group, hydroxyl group thiol group and carboxyl group.

$R^{29}$ is alkylene group having carbon atoms of 1 to 10, or a polymethylene group having carbon atoms of 3 to 10; and preferably it is alkylene group having carbon atoms of 1 to 5, or a polymethylene group having carbon atoms of 3 to 5. Also, e indicates the number of $R^{29}$, and it is 0 or 1. In case e is 0, U is directly bonded to the benzene ring. Preferably, it is a compound wherein e is 0.

As specific examples of the functionalization compound having the hindered phenol structure, 3-methyl-4-hydroxy benzoate, 3,5-di-t-butyl-4-hydroxy benzoate, 3,5-dimethyl-4-hydroxy benzoate, 3-t-butyl-4-hydroxy benzoate, 3-t-butyl-5-methyl-4-hydroxy benzoate, 3-t-butyl-6-methyl-4-hydroxy benzoate, 3-t-butyl-5-ethyl-hydroxy benzoate, 3-t-butyl-6-ethyl-4-hydroxy benzoate, 3-t-octyl-4-hydroxy benzoate, 3-t-octyl-5-methyl-4-hydroxy benzoate, 3-t-octyl-5-ethyl-4-hydroxy benzoate, 3-t-octyl-6-methyl-4-hydroxy benzoate, 2-(3-methyl-4-hydroxyphenyl)acetate, 2-(3,5-dimethyl-4-hydroxyphenyl)acetate, 2-(3,5-di-t-butyl-4-hydroxyphenyl)acetate, 2-(3-t-butyl-4-hydroxyphenyl)acetate, 2-(3-t-butyl-5-methyl-4-hydroxyphenyl)acetate, 2-(3-t-butyl-6-methyl-4-hydroxyphenyl)acetate, 2-(3-t-butyl-5-ethyl-4-hydroxyphenyl)acetate, 2-(3-t-octyl-4-hydroxyphenyl)acetate, 2-(3-t-octyl-5-methyl-4-hydroxyphenyl)acetate, 2-(3-t-octyl-6-methyl-4-hydroxyphenyl)acetate, 3-(3-methyl-4-hydroxyphenyl)propionate, 3-(3,5-dimethyl-4-hydroxyphenyl)propionate, 3-(3,5-di-t-butyl-4-hydroxyphenyl)propionate, 3-(3-t-butyl-4-hydroxyphenyl)propionate, 3-(3-t-butyl-5-methyl-4-hydroxyphenyl)propionate, 3-(3-t-butyl-6-methyl-4-hydroxyphenyl)propionate, 3-(3-t-butyl-5-ethyl-4-hydroxyphenyl)propionate, 3-(3-t-butyl-6-ethyl-4-hydroxyphenyl)propionate, 3-(3-t-octyl-4-hydroxyphenyl)propionate, 3-(3-t-octyl-5-methyl-4-hydroxyphenyl)propionate, 3-(3-t-octyl-6-methyl-4-hydroxyphenyl)propionate, 3-(3,5-didodecyl-4-hydroxyphenyl)propionate, 4-(3-methyl-4-hydroxyphenyl)lactate, 4-(3,5-dimethyl-4-hydroxyphenyl)lactate, 4-(3-t-butyl-4-hydroxyphenyl)lactate, 4-(3,5-di-t-butyl-4-hydroxyphenyl)lactate, 4-(3-t-butyl-5-methyl-4-hydroxyphenyl)lactate, 4-(3-t-butyl-5-ethyl-4-hydroxyphenyl)lactate, 4-(3-t-butyl-6-methyl-4-hydroxyphenyl)lactate, 4-(3-t-butyl-6-ethyl-4-hydroxyphenyl)lactate, 4-(3-t-octyl-4-hydroxyphenyl)lactate, 4-(3-t-octyl-5-methyl-4-hydroxyphenyl)lactate, 4-(3-t-octyl-6-methyl-4-hydroxyphenyl)lactate, 3,5-dimethyl-4-hydroxyphenylamine, 3,5-diisopropyl-4-hydroxyphenylamine, 3,5-di-t-butyl-4-hydroxyphenylamine or so can be mentioned.

Among these, as for further preferable compound, 3,5-di-t-butyl-4-hydroxy benzoate, 3-t-butyl-4-hydroxy benzoate, 3-t-butyl-5-methyl-4-hydroxy benzoate, 3-t-butyl-6-methyl-4-hydroxy benzoate, 3-t-butyl-5-ethyl-4-hydroxy benzoate, 3-t-butyl-6-ethyl-4-hydroxy benzoate, 2-(3,5-di-t-butyl-4-hydroxyphenyl)acetate, 2-(3-t-butyl-hydroxyphenyl)acetate, 2-(3-t-butyl-5-methyl-4-hydroxyphenyl)acetate, 2-(3-t-butyl-6-methyl-4-hydroxyphenyl)acetate, 2-(3-t-butyl-5-ethyl-4-hydroxyphenyl)acetate, 3-(3,5-di-t-butyl-4-hydroxyphenyl)propionate, 3-(3-t-butyl-4-hydroxyphenyl)propionate, 3-(3-t-butyl-5-methyl-4-hydroxyphenyl)propionate, 3-(3-t-butyl-6-methyl-4-hydroxyphenyl)propionate, 3-(3-t-butyl-5-ethyl-4-hydroxyphenyl)propionate, 3-(3-t-butyl-6-ethyl-4-hydroxyphenyl)propionate, 4-(3-t-butyl-4-hydroxyphenyl)lactate, 4-(3,5-di-t-butyl-4-hydroxyphenyl)lactate, 4-(3-t-butyl-5-methyl-4-hydroxyphenyl)lactate, 4-(3-t-butyl-5-ethyl-4-hydroxyphenyl)lactate, 4-(3-t-butyl-6-methyl-4-hydroxyphenyl)lactate, 4-(3-t-butyl-6-ethyl-4-hydroxyphenyl)lactate, 3,5-di-t-butyl-4-hydroxyphenylamine or so can be mentioned.

The Functionalization Compound Having the Triazine Structure or the Benzotriazol Structure As for the functionalization compound having the triazine structure or the benzotriazol structure used as A4 component in the present invention, the compound having the structure of following descried general formula (iii), (iv) in the molecule can be used suitably.

[Chemical formula 10]

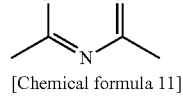

(iii)

[Chemical formula 11]

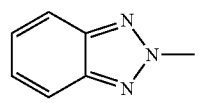

(iv)

The compound having the above described structure in the molecule, and two groups capable of reacting with the isocyanate group can introduce the triazine structure or the benzotriazol structure in the main chain of the polyurethane-urea resin of A component, as described in the functionalization compound having said piperidine structure. Also, when the group capable of reacting with the isocyanate group is only one, the triazine structure or the benzotriazol structure can be introduced to the side chain or the terminal end of said polyurethane-urea resin.

Among the functionalization compound having the triazine structure or benzotriazol structure, as the preferable compound, following described general formula (6) and (7) can be mentioned. First, the compound having the triazine structure will be explained.

Following general formula (6)

[Chemical formula 12]

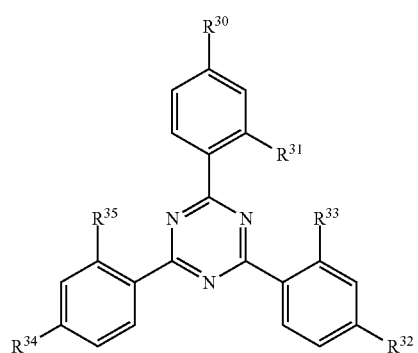

(6)

(in the above formula, $R^{30}$, $R^{31}$, $R^{32}$, $R^{33}$, $R^{34}$, and $R^{35}$ are respectively independent alkyl group having carbon atoms of 1 to 10, alkyloxy group, hydrogen atom, amino group, hydroxyl group, carboxyl group, or thiol group, and said alkyl group and alkyloxy group may comprise a substituent group selected from the group of amino group, hydroxyl group, carboxyl group, and thiol group, note that, among $R^{30}$ to $R^{35}$, one or two groups are the group capable of reacting with the isocyanate group)

The above described compound can be used suitably.

In the above described general formula (6), $R^{30}$, $R^{31}$, $R^{32}$, $R^{33}$, $R^{34}$, and $R^{35}$ are respectively independent alkyl group having carbon atoms of 1 to 10, alkyloxy group having carbon atoms of 1 to 10. Further preferably, it is alkyl group having carbon atoms of 1 to 5, or alkyloxy group having carbon atoms of 1 to 5. Also, these groups may comprise the substituent group capable of reacting with the isocyanate group, and preferably amino group, hydroxyl group, carboxyl group, or thiol group or so may be comprised as the substituent group.

Also, the above described general formula (6), $R^{30}$, $R^{31}$, $R^{32}$, $R^{33}$, $R^{34}$, and $R^{35}$ may be a hydrogen atom or the group capable of reacting with the isocyanate group; and preferably it is hydrogen atom, amino group, hydroxyl group, carboxyl group or thiol group.

Note that, among $R^{30}$, $R^{31}$, $R^{32}$, $R^{33}$, $R^{34}$, and $R^{35}$, one or two groups must be a group capable of reacting with the isocyanate group, and preferably it must be amino group, hydroxyl group, carboxyl group, or thiol group.

Among these, $R^{30}$, $R^{31}$, $R^{32}$, $R^{33}$, $R^{34}$, and $R^{35}$ are preferably methyl group, ethyl group, normal propyl group, isopropyl group, normal butyl group, tert-butyl group, hydroxymethyl group, 2-hydroxyethyl group, 3-hydroxypropyl group, 2-hydroxypropyl group, 4-hydroxybutyl group, 3-hydroxybutyl group, 2-hydroxyethyloxy group, 3-hydroxypropyloxy group, 2-hydroxypropyloxy group, hydrogen atom, or hydroxyl group. Further, among these, the one or two groups are preferably hydroxymethyl group, 2-hydroxyethyl group, 3-hydroxypropyl group, 2-hydroxypropyl group, 4-hydroxybutyl group, 3-hydroxybutyl group, 2-hydroxyethyloxy group, 3-hydroxypropyloxy group, 2-hydroxypropyloxy group, or hydroxyl group.

As examples of specific compounds, 2-(2,4-dihydroxyphenyl)-4,6-diphenyl-s-triazine, 2-(2,4-dihydroxyphenyl)-4,6-bis(2,4-dimethylphenyl)-s-triazine, 2-(2,4-dihydroxyphenyl)-4,6-bis(2-methoxyphenyl)-s-triazine, 2-(2,4-dihydroxyphenyl)-4,6-bis(4-methoxyphenyl)-s-triazine, 2-(2,4-dihydroxyphenyl)-4,6-bis(2,4-dimethoxyphenyl)-s-triazine, 2-(2-hydroxy-4-hydroxymethylphenyl)-4,6-diphenyl-s-triazine, 2-(2hydroxy-4-hydroxymethylphenyl)-4,6-bis(2,4-dimethylphenyl)-s-triazine, 2-(2-hydroxy-4-(2-hydroxyethyl)phenyl)-4,6-diphenyl-s-triazine, 2-(2hydroxy-4-(2-hydroxyethyl)phenyl)-4,6-bis(2,4-dimethylphenyl)s-triazine, 2-(2-hydroxy-4-(2-hydroxyethyloxy)phenyl)-4,6-diphenyl-s-triazine, 2-(2hydroxy-4-(2-hydroxyethyloxy)phenyl)-4,6-bis(2,4-dimethylphenyl)-s-triazine, 2-(2-hydroxy-4-(2-hydroxypropyl)phenyl)-4,6-diphenyl-s-triazine, 2-(2hydroxy-4-(2-hydroxypropyl)phenyl)-4,6-bis(2,4-dimethylphenyl)-s-triazine, 2-(2-hydroxy-4-(3-hydroxypropyl)phenyl)-4,6-diphenyl-s-triazine, 2-(2hydroxy-4-(3-hydroxypropyl)phenyl)-4,6-bis(2,4-dimethylphenyl)-s-triazine, 2-(2-hydroxy-4-(2-hydroxypropyloxy)phenyl)-4,6-diphenyl-s-triazine, 2-(2hydroxy-4-(2-hydroxypropyloxy)phenyl)-4,6-bis(2,4-dimethylphenyl)-s-triazine, 2-(2-hydroxy-4-(4-hydroxybutyl)phenyl)-4,6-diphenyl-s-triazine, 2-(2hydroxy-4-(4-hydroxybutyl)phenyl)-4,6-bis(2,4-dimethylphenyl)-s-triazine, 2-(2-hydroxy-4-(3-hydroxybutyl)phenyl)-4,6-diphenyl-s-triazine, 2-(2hydroxy-4-(3-hydroxybutyl)phenyl)-4,6-bis(2,4-dimethylphenyl)-s-triazine, 2-(2-hydroxy-4-(4-dimethylphenyl)-s-triazine, 2-(2-hydroxy-4-(4-hydroxybutyloxy)phenyl)-4,6-diphenyl-s-triazine, 2-(2hydroxy-4-(4-hydroxybutyloxy)phenyl)-4,6-bis(2,4-dimethylphenyl)-s-triazine, 2-phenyl-4,6-bis(4-hydroxyphenyl)-s-triazine, 2-(2,4-dimethoxyphenyl)-4,6-bis(2-hydroxyphenyl)-s-triazine, 2-(2,4-dimethylphenyl)-4,6-bis(2-hydroxy-4-dimethylphenyl)-s-triazine, 2-phenyl-4,6-bis(2-hydroxy-4-methylphenyl)-s-triazine, 2-(2-methoxy-4-ethylphenyl)-4,6-bis(2-hydroxy-4-methylphenyl)-s-triazine, 2-(2-ethoxy-4-methylphenyl)-4,6-bis(2-hydroxy-4-methylphenyl)-s-triazine, 2-(2-methyl-4-propylphenyl)-4,6-bis(2-(4-hydroxybutyloxy)-4-methylphenyl)-s-triazine, 2-(2-methoxy-4-propylphenyl)-4,6-bis(2-hydroxy-4-methylphenyl)-s-triazine, 2-(2-ethoxy-4-propylphenyl)-4,6-bis(2-hydroxypropyloxy-4-dimethylphenyl)-s-triazine or so can be mentioned.

Next, the functionalization compound having the benzotriazol structure will be explained. As for preferable compounds, the compounds shown by following general formula (7) can be mentioned.

[Chemical formula 13]

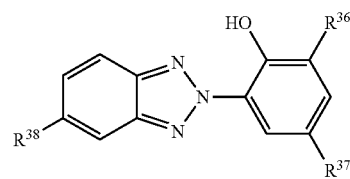

(7)

(in the above formula, $R^{36}$ and $R^{37}$ are respectively independent alkyl group having carbon atoms of 1 to 10, alkyloxy group having carbon atoms of 1 to 10, hydrogen atom, aryl group; wherein said alkyl group and alkyloxy group may comprise the group capable of reacting with the isocyanate group; however note that the group capable of reacting with the isocyanate group is only one, said aryl group may comprise alkyl group having carbon atoms of 1 to 5 as the substituent group, and $R^{38}$ is hydrogen atom or halogen atom.)

In the above described general formula (7), $R^{36}$ and $R^{37}$ are respectively independent alkyl group having carbon atoms of 1 to 10 or alkyloxy group having carbon atoms of 1 to 10. These groups may comprise the group capable of reacting with the isocyanate group; specifically, amino group, hydroxyl group, carboxyl group, acid chloride group, or thiol group may be comprised. Note that, the group capable of reacting with the isocyanate group is only one.

Also, $R^{36}$ and $R^{37}$ may be aryl group having alkyl group of carbon atoms of 1 to 5 as the substituent group, and preferably it may be phenyl group having alkyl group of carbon atoms of 1 to 5 as the substituent group or hydrogen atom.

As examples of suitable $R^{36}$ and $R^{37}$, methyl group, ethyl group, normal propyl group, isopropyl group, normal butyl group, tert-butyl group, hexyl group, 1,1,3,3-tetramethylbutyl group, phenyl group, benzyl group, 1,1-dimethyl benzyl group carboxyl group, carboxymethyl group, carboxyethyl group, carboxypropyl group, amino group, aminomethyl group, aminoethyl group, aminopropyl group; and acid chloride group or so corresponding to carboxyl group, carboxymethyl group, carboxyethyl group, carboxypropyl group may be mentioned.

As specific compounds, 3-[3'-(2"H-benzotriazol-2"-yl)-4'-hydroxyphenyl]propionate, 3-[3'-(2"H-benzotriazol-2"-yl)-5'-methyl-4'-hydroxyphenyl]propionate, 3-[3'-(2"H-benzotriazol-2"-yl)-5'-ethyl-4'-hydroxyphenyl]propionate, 3-[3'-(2"H-benzotriazol-2"-yl)-5'-t-butyl-4'-hydroxyphenyl] propionate, 3-[3'-(5"-chloro-2"H-benzotriazol-2"-yl)-5'-t-butyl-4'-hydroxyphenyl]propionate, 3-[3'-(2"H-benzotriazol-2"-yl)-4"-hydroxy-5"-(1',1'-dimethylbenzyl)phenyl]propionate, 3-[3'-(2"H-benzotriazol-2"-yl)-4"-hydroxy-5"-(1",1",3",3"-tetramethylbutyl)phenyl] propionate, and an acid chloride compound thereof, 2-(5-methyl-2-hydroxyphenyl)benzotriazol, 2-[2-hydroxy-3,5-bis($\alpha,\alpha$-dimethylbenzyl)phenyl]-2H-benzotriazol, 2-[2'-hydroxy-5'-t-octylphenyl]benzotriazol, 2-[2'-hydroxy-5'-(hydroxymethyl)phenyl]-2H-benzotriazol, 2-[2'-hydroxy-5'-(hydroxyethyl)phenyl]-2H-benzotriazol, 2-[2'-hydroxy-5'-(hydroxypropyl)phenyl]-2H-benzotriazol, 2-[2'-hydroxy-3'-methyl-5'-(hydroxymethyl)phenyl]-2H-benzotriazol, 2-[2'-hydroxy-3'-methyl-5'-(hydroxyethyl)phenyl]-2H-benzotriazol, 2-[2'-hydroxy-3'-methyl-5'-(hydroxypropyl)phenyl]-2H-benzotriazol, 2-[2'-hydroxy-3'-t-butyl-5'-(hydroxymethyl)phenyl]-2H-benzotriazol, 2-[2'-hydroxy-3'-t-butyl-5'-(hydroxyethyl)phenyl]-2H-benzotriazol, 2-[2'-hydroxy-3'-t-butyl-5'-(hydroxypropyl)phenyl]-2H-benzotriazol, 2-[2'-hydroxy-3'-t-octyl-5'-(hydroxymethyl)phenyl]-2H-benzotriazol, 2-[2'-hydroxy-3'-t-octyl-5'-(hydroxyethyl)phenyl]-2H-benzotriazol, 2-[2'-hydroxy-3'-t-octyl-5'-(hydroxypropyl)phenyl]-2H-benzotriazol, 2-[2'-hydroxy-3'-t-butyl-5'-(hydroxyethyl)phenyl]-5-chloro-2H-benzotriazol or so can be mentioned.

The above mentioned A4 component can be introduced into the terminal end of main chain, side chain of the obtained polyurethane-urea resin for the purpose of improving the weather resistance of the polyurethane-urea resin and the photochromic compound; however it is preferable to introduce at the terminal end of the polyurethane-urea resin from the point that it does not damage the innate heat resistance and the mechanical strength (the adhesive strength) of the polyurethane-urea resin.

The Preparation Method of A Component Using A1 to A4 Components

In case of obtaining A component by reacting A1 component, A2 component, A3 component, and A4 component, so called one shot method or prepolymer method can be applied; and for example, A component can be suitably obtained by the following method.

The Preparation Method 1 (A Component Comprising the Functionalization Compound at the Terminal End)

The reaction of A1 component, A2 component and A3 component can be carried out by the method as already described. The reaction between the obtained urethane polymer and A4 component may be carried out under the presence of the solvent or without the solvent, and both in the inert gas atmosphere such as nitrogen or argon or so at 25 to 120° C. for 0.5 to 24 hours. As for the solvent, methanol, ethanol, isopropyl alcohol, t-butanol, 2-butanol, n-butanol, methylethyl ketone, diethyl ketone, toluene, hexane, heptane, ethyl acetate, DMF, DMSO, THF, or so can be used.

The Preparation Method 2 (A Component Having the Functionalization Compound at the Main Chain)

A1 component and A2 component are reacted to obtain the urethane prepolymer, then A4 component is mixed/reacted which has, in the molecule, the group capable of reacting with two isocyanate groups to obtain the urethane prepolymer comprising the functionalization compound. Then, by reacting said urethane prepolymer with A3 component, A component of the present invention can be produced.

In the above method, the reaction between A1 component and A2 component, and further the reaction with A4 component may be carried out under the presence of the solvent or without the solvent, in the atmosphere of the inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently. Also, when carrying out the reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be added. As for the added amount when using the catalyst, it is preferably 0.001 to 1 parts by weight with respect to total 100 parts by weight of said A component.

The reaction between the urethane prepolymer obtained as such and A3 component may be carried out under the presence of the solvent or without the solvent, in the atmosphere of inert gas such as nitrogen or argon or so at 25 to 120° C. for 0.5 to 24 hours. As for the solvent, methanol, ethanol, isopropyl alcohol, t-butanol, 2-butanol, n-butanol, methylethyl ketone, diethyl ketone, toluene, hexane, heptane, ethyl acetate, DMF, DMSO, THF, or so can be used.

The Preparation Method 3 (A Component Having the Functionalization Compound at the Side Chain)

First, A4 component comprising, in the molecule, the group capable of reacting with one isocyanate group and the triisocyanate compound comprising three isocyanate groups are reacted to prepare the diisocyanate compound having the functionalization structure the side chain. The urethane prepolymer is obtained by reacting this diisocyanate compound and A1 compound and A2 compound; next by reacting A3 component, the A component of the present invention can be produced.

In the above method, the reaction between the triisocyanate compound and A4 component may be carried out under the presence of the solvent or without the solvent, in the atmosphere of inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently.

The reaction between the diisocyanate group having the functionalization compound at the side chain obtained by the above described method, A1 component, and A2 component may be carried out under the presence of the solvent or without the solvent, in the atmosphere of inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently. Also, when carrying out the reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be added. As for the added amount when using the catalyst, it is preferably 0.001 to 1 part by weight with respect to total 100 parts by weight of said A component.

The reaction between the urethane prepolymer obtained as such and A3 component may be carried out under the presence of the solvent or without the solvent, in the atmosphere of inert gas such as nitrogen or argon or so at 25 to 120° C. for 0.5 to 24 hours. As for the solvent, methanol, ethanol, isopropyl alcohol, t-butanol, 2-butanol, n-butanol, methylethyl ketone, diethyl ketone, toluene, hexane, heptane, ethyl acetate, DMF, DMSO, THF, or so can be used.

The Blending Ratio of Each Component, Characteristic of A Component

The amount ratio of A1 component, A2 component, A3 component, A4 component used for the reaction described in above may be determined accordingly; however from the point of the balance between the heat resistance, the adhesive strength, and the photochromic characteristics (the color optical density, the color fading speed, the weather resistance or so) of the obtained polyurethane-urea resin, it is preferable to be the following amount ratio. That is, when the total mol numbers of the hydroxyl group included in A1 component is n1, the total mol numbers of isocyanate group included in A2 component is n2, the total mol number of amino group included in A3 component is n3, and the total mol number of the groups capable of reacting with the isocyanate group (specifically, amino group, hydroxyl group, mercapto group and/or carboxyl group) is n4; then the weight ratio satisfy n1:n2:n3:n4=0.3 to 0.89:1.0:0.1 to 0.69:0.01 to 0.2, particularly n1:n2:n3:n4=0.34 to 0.83:1.0:0.15 to 0.6:0.02 to 0.15 is preferable, and n1:n2:n3:n4=0.4 to 0.78:1.0:0.2 to 0.5:0.02 to 0.1 is most preferable.

The polyurethane-urea resin obtained by such reaction may be used as it is dissolved in the reaction solvent; however it may be carried out with the after treatment such as distillation of the solvent if needed, or dropping the poor solvent such as water or so thereby precipitate/filter the polyurethane-urea resin followed by drying or so, then it may be used as A component.

A5 Component: The Terminator

When the isocyanate group is left at the terminal end of the polyurethane-urea resin obtained by the above reaction, it is preferable that the terminator comprising the active hydrogen which reacts with the isocyanate group is added to make the terminal end inactive. When the isocyanate group is left at the terminal end, the photochromic characteristic tends to decline. Whether the isocyanate group is left or not can be determined by measuring the infrared absorbing spectroscopy.

Also, in case of improving the adhesive strength of the optical articles using the isocyanate compound comprising at least one isocyanate group in the molecule as (D) component which will be described in the following, the polyurethane-urea resin needs to be quenched by non-reactive group at the terminal end thereof. The polyurethane-urea resin of which the terminal end is quenched by the non-reactive group can be obtained by reacting the polyurethane-urea resin of which the terminal end is the isocyanate group and the terminator (A5) comprising the group capable of reacting with one isocyanate group in the molecule.

As the group capable of reacting with said isocyanate group, amino group (—NH$_2$, and NH(R)), hydroxyl group (—OH), mercapto group (—SH:thiol group), carboxyl group [—C(=O)OH], or acid chloride group [—C(=O)OCl] can be mentioned.

This terminator comprise, in the molecule, only one group capable of reacting with the isocyanate group. If two or more of the group capable of reacting with the isocyanate groups are present in the molecule, the polyurethane-urea resin becomes high molecular weight, and becomes to obtain high viscosity when diluting with the organic solvent; hence it becomes difficult to form the film ę, further it lowers the adhesion (the adhesion with the optical sheet) of the obtained photochromic adhesive agent. By introducing said terminator at the terminal end of the polyurethane-urea resin, it becomes possible to control the number average molecular weight of the urethane-urea resin, and the adhesion, the heat resistance, and the photochromic characteristic can be easily controlled to the physical properties of the object.

As for the terminator, amine, alcohol, thiol and carboxylic acid can be used. Specifically, normal butyl amine, sec-butyl amine, tert-butyl amine, dibutyl amine, diisopropyl amine, methanol, ethanol, isopropanol, normal butanol, sec-butanol, tert-butanol, acetic acid or so may be mentioned.

Also, by using the functionalization compound which is A4 component mentioned in above as the terminator, the functionalization compound can be introduced into the polyurethane-urea resin and also at the same time, the terminal end of the isocyanate group can be made inactive. That is, A4 component can be used as A5 component.

Hereinbelow, the terminator which can be suitably used in the present invention will be described.

The preferable compound as the terminator can be indicated by the following general formula (8) and (9).

[Chemical formula 14]

(8)

(in the above formula, R$^{39}$ is alkyl group having carbon atoms of 1 to 20, aryl group, aralkyl group, alkyloxycarbonyl group or hydrogen atom, R$^{40}$ is alkyl group having carbon atoms of 1 to 20, aryl group, aralkyl group, or ester group.)

In case R$^{39}$ uses the compound which is the hydrogen atom as A5 component, the terminal end of the polyurethane-urea resin becomes —NH(R$^{40}$), however this —NH(R$^{40}$) substantially does not react with other polymers, and other isocyanate compounds. Therefore, —NH(R$^{40}$) is not considered as the group capable of reacting with the isocyanate group.

In the above general formula (8), R$^{39}$ is alkyl group having carbon atoms of 1 to 20, aryl group, aralkyl group, alkyloxycarbonyl group or hydrogen atom. Among these, R$^{39}$ is preferably alkyl group having carbon atoms of 1 to 10, aryl group, aralkyl group, alkyloxycarbonyl group or hydrogen atom. Said aryl group and aralkyl group may have an alkyl group having carbon atoms of 1 to 5, halogen atom as the substituent group.

As examples of suitable R$^{39}$, methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group, or hydrogen atom or so may be mentioned.

Also, $R^{40}$ is alkyl group having carbon atoms of 1 to 20, aryl group, aralkyl group, or alkyloxycarbonyl group. Among these, $R^{40}$ is preferably alkyl group having carbon atoms of 1 to 10, aryl group, aralkyl group, or alkyloxycarbonyl group. Said aryl group may comprise the alkyl group having carbon atoms of 1 to 5, and halogen atom as the substituent group.

As examples of suitable $R^{40}$, methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group or so may be mentioned.

[Chemical Formula 15]
Following general formula (9).

$$Z-R^{41} \qquad (9)$$

(in the above formula, $R^{41}$ is alkyl group of carbon atoms of 1 to 20, aryl group, aralkyl group or alkyloxycarbonyl group,
Z is hydroxyl group, carboxyl group, or thiol group.)

The above shown compound can also be suitably used as the terminator.

In the above general formula (9), $R^{41}$ is alkyl group of carbon atoms of 1 to 20, aryl group, aralkyl group or alkyloxycarbonyl group; and preferably it is alkyl group having carbon atoms of 1 to 10, aryl group, aralkyl group, or alkyloxycarbonyl group. This aryl group and aralkyl group may have alkyl group having carbon atoms of 1 to 5, and halogen atom as the substituent group. As for the preferable groups, alkyl group having carbon atoms of 1 to 5, phenyl group, and phenyl group having halogen atoms or so may be mentioned. As examples of suitable $R^{41}$, methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group or so may be mentioned.

Z in the above general formula (9) is the group capable of reacting with the isocyanate group present at the terminal end of the polyurethane-urea resin, and specifically it is hydroxyl group, carboxyl group or thiol group; and preferably it is hydroxyl group.

As the specific compounds shown by above described general formula (8) and (9); amines such as methylamine, ethylamine, propylamine, isopropylamine, butylamine, tert-butylamine, pentylamine, hexylamine, heptylamine, 4-heptylamine, octylamine, 1,1-dipropylbutylamine, phenylamine, benzylamine, dimethylamine, diethylamine, dipropylamine, diisopropylamine, dibutylamine, di-tert-butylamine, dipentylamine, dihexylamine, diheptylamine, dioctylamine, methylethylamine, methylbutylamine, methylpentylamine, methylhexylamine, methylheptylamine, methyloctylamine, ethylpropylamine, ethylbutylamine, ethylpentylamine, ethylhexylamine, ethylheptylamine, ethyloctylamine, propylbutylamine, isopropylbutylamine, propylpentylamine, propylhexylamine, propylheptylamine, propyloctylamine or so; alcohols such as methanol, ethanol, propanol, isopropanol, butanol, 2-butanol, tert-butyl alcohol, pentyl alcohol, hexyl alcohol, heptyl alcohol, octyl alcohol, nonyl alcohol, decanol, 2-decanol or so; thiols such as methane thiol, ethane thiol, 1-propane thiol, 2-propane thiol, 1-butane thiol, 2-butane thiol, propane thiol, hexane thiol, heptane thiol, octane thiol, dodecane thiol, 2-methyl-1-butane thiol, 2-methylpropane thiol, 3-methyl-2-butene thiol, 1,1-dimethylheptane thiol, cyclohexane thiol, cyclopentane thiol, benzene thiol, benzene methane thiol, 2,6-dimethylbenzene thiol or so; carboxylic acid groups such as acetic acid, propionic acid, lactic acid, pentanoic acid, hexanoic acid, heptanoic acid, octanoic acid, nonanoic acid, decanoic acid, dodecanoic acid or so may be mentioned.

The above mentioned terminator may be used alone or by combining two or more thereof.

The Blending Ratio of A5 Component, the Characteristic of A Component

A5 component can be introduced to the polyurethane-urea resin by reacting as the same method as the above mentioned A4 component.

The amount ratio of A1 component, A2 component, A3 component, and A5 component can be determined accordingly, however it is preferable to satisfy the below amount ratio from the point of the balance between the heat resistance, the adhesive strength, and the photochromic characteristics (the color optical density, the color fading speed, the weather resistance or so) of the obtained polyurethane-urea resin. As aforementioned, the amount ratio of A1 component, A2 component, and A3 component, when the total mol numbers of the hydroxyl group included in A1 component is n1, the total mol numbers of isocyanate group included in A2 component is n2, the total mol number of amino group included in A3 component is n3, and the total mol number of the group capable of reacting with the isocyanate group included in A5 component is n5; n1:n2:n3:n5=0.30 to 0.89: 1:0.1 to 0.69:0.01 to 0.20 is preferable. In order to make the obtained photochromic composition (the photochromic adhesive agent) to exhibit excellent adhesion, durability, and photochromic characteristics, n1:n2:n3:n5=0.34 to 0.83:1: 0.15 to 0.6:0.02 to 0.15; and more preferably n1:n2:n3: n5=0.4 to 0.78:1:0.2 to 0.5:0.02 to 0.1. Here, above mentioned n1, n2, n3, and n5 can be obtained as the product of used mol number of the compound used for each component, and the number of each group present in one molecule of said compound.

Note that, when A component before the introduction of A5 component is those having a isocyanate group at the terminal end, the total sum (n1+n3') of n1 and n3' (n3' is the total mol number of the group capable of reacting with amino group and other isocyanate group included in A3 component) is smaller than the value of n2 (n1+n3'<n2). Further, in order to make the terminal end of A component inactive, n5 must be larger or equal to the difference between n2 and the total sum of n1 and n3' (n2−(n1+n3')). When preparing A component, the most preferable blending is to satisfy the above amount ratio, and when n2 is equal to the total sum of n1, n3' and n5 (n2=n1+n3'+n5).

When making the terminal end of A component inactive, A5 component can be used by the blending amount wherein the total sum of n1, n3' and n5 is n2 or larger (n2<n1+n3'+n5). In this case, A5 component added excessively may be removed by reprecipitation. Also, in case the excessive A5 component is an amount which does not damage the effect of the present invention, the photochromic composition can be formed as it is. In this case, when the photochromic composition is formed, said A5 component is thought to be consumed by reacting with D component added optionally which will be described in below. Therefore, as long as the excessive A5 component is an amount which does not damage the effect of the present invention, it is not a problem. Note that, since the isocyanate group in A5 component will be consumed which should be used for the preparation of the polyurethane-urea resin, the most preferable embodiment is to use A5 component so that it satisfy n1+n3'+n5=n2. Note that, in case of using A4 component instead of A5 component, said n5 can be read as n4. Also, in case of using both A4 component and A5 component as the terminator, said n5 can be read as the total n5 and n4 (n5+n4).

Also, the molecular weight and the heat resistance of the polyurethane-urea resin when using A4 component or A5 component obviously satisfy the aforementioned range.

B Component: The Photochromic Compound

As the photochromic compound used as B component in the photochromic composition of the present invention, the known photochromic compounds such as chromene compounds, fulgimide compounds, spirooxazine compounds, spiropyran compounds or so can be used without any limitation. These may be used alone or by combining two or more thereof.

As the above mentioned, fulgimide compounds, spiroxazine compounds, spiropyran compounds, and chromene compounds, for examples the compounds described in JP Patent Application Laid Open No. H02-28154, JP Patent Application Laid Open No. S62-288830, WO94/22850 pamphlet, WO96/14596 or so may be mentioned.

Particularly, as for chromene compounds other than those described in the above listed patent articles, the chromene compound having excellent photochromic characteristics is known and such chromene compounds can be suitably used as B component. As such chromene compounds, JP Patent Application Laid Open No. 2001-031670, JP Patent Application Laid Open No. 2001-011067, JP Patent Application Laid Open No. 2001-011066, JP Patent Application Laid Open No. 2000-344761, JP Patent Application Laid Open No. 2000-327675, JP Patent Application Laid Open No. 2000-256347, JP Patent Application Laid Open No. 2000-229976, JP Patent Application Laid Open No. 2000-229975, JP Patent Application Laid Open No. 2000-229974, JP Patent Application Laid Open No. 2000-229973, JP Patent Application Laid Open No. 2000-229972, JP Patent Application Laid Open No. 2000-219678, JP Patent Application Laid Open No. 2000-219686, JP Patent Application Laid Open No. H11-322739, JP Patent Application Laid Open No. H11-286484, JP Patent Application Laid Open No. H11-279171, JP Patent Application Laid Open No. H09-218301, JP Patent Application Laid Open No. H09-124645, JP Patent Application Laid Open No. H08-295690, JP Patent Application Laid Open No. 08-176139, JP Patent Application Laid Open No. H08-157467, U.S. Pat. No. 5,645,767, U.S. Pat. No. 5,658,501, U.S. Pat. No. 5,961,892, U.S. Pat. No. 6,296,785, JP Patent No. 4424981, JP Patent No. 4424962, WO2009/136668 pamphlet, WO2008/023828 pamphlet, JP Patent No. 4369754, JP Patent No. 4301621, JP Patent No. 4256985, WO2007/086532 pamphlet, JP Patent Application Laid Open No. 2009-120536, JP Patent Application Laid Open No. 2009-67754, JP Patent Application Laid Open No. 2009-67680, JP Patent Application Laid Open No. 2009-57300, JP Patent No. 4195615, JP Patent No. 4158881, JP Patent No. 4157245, JP Patent No. 4157239, JP Patent No. 4157227, JP Patent No. 4118458, JP Patent Application Laid Open No. 2008-74832, JP Patent No. 3982770, JP Patent No. 3801386, WO2005/028465 pamphlet, WO2003/042203 pamphlet, JP Patent Application Laid Open No. 2005-289812, JP Patent Application Laid Open No. 2005-289807, JP Patent Application Laid Open No. 2005-112772, JP Patent No. 3522189, WO2002/090342 pamphlet, JP Patent No. 3471073, JP Patent Application Laid Open No. 2003-277381, WO2001/060811 pamphlet, WO00/71544 pamphlet or so are disclosed.

Among these other photochromic compounds, from the point of the photochromic characteristics such as the color optical density, the initial coloring, the durability, the color fading speed or so, it is preferable to use one or more of the chromene compounds comprising indeno(2,1-f)naphtho-(2,1-b) pyran structure. Further, among these chromene compounds, the compounds having the molecular weight of 540 or more is suitable as it exhibits particularly excellent color optical density and color fading speed.

Such chromene compounds can be shown by the following general formula.

[Chemical formula 16]

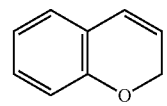

(10)

The chromene compounds having the structure shown by said general formula (10) is not particularly limited for the substituent group thereof, and it may have known substituent group.

As mentioned in the above, among these chromene compounds, from the point of the photochromic characteristics such as the color optical density, the initial coloring, the durability, the color fading speed or so, it is further preferably a chromene compounds comprising indeno(2,1-f)naphtho-(2,1-b) pyran structure as shown by the following general formula (11).

[Chemical formula 17]

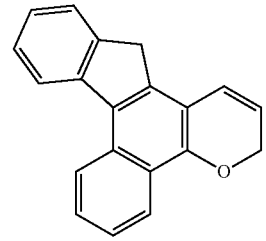

(11)

The chromene compounds comprising the structure shown by said general formula (11) is not particularly limited for the substituent group thereof, and it may comprise known substituent group.

For examples of the photochromic compounds which can be used in the present invention, the following may be mentioned.

[Chemical formula 18]

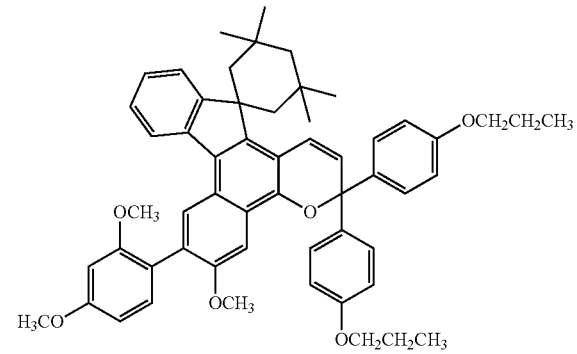

(1)

-continued
[Chemical formula 19]
(2)
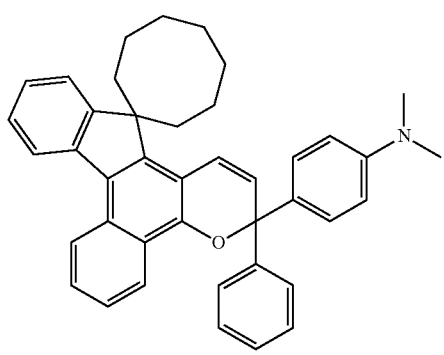
[Chemical formula 20]
(3)
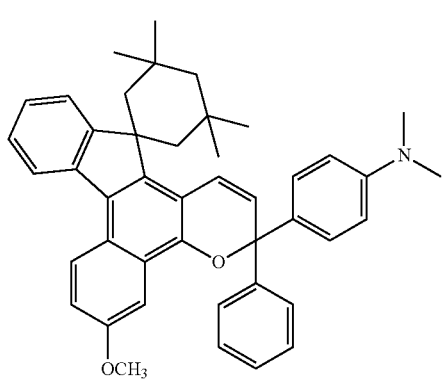
[Chemical formula 21]
(4)
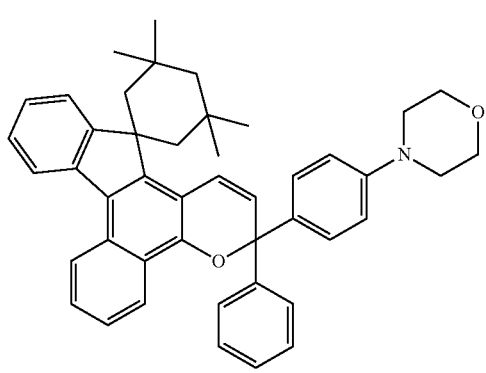
[Chemical formula 22]
(5)
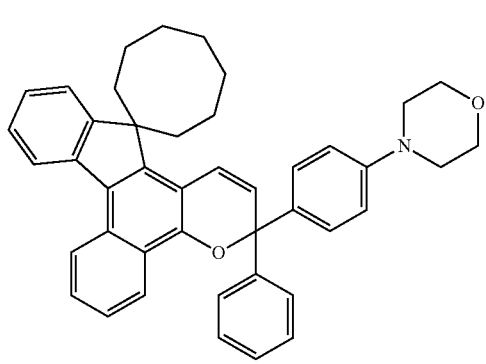
-continued
[Chemical formula 23]
(6)
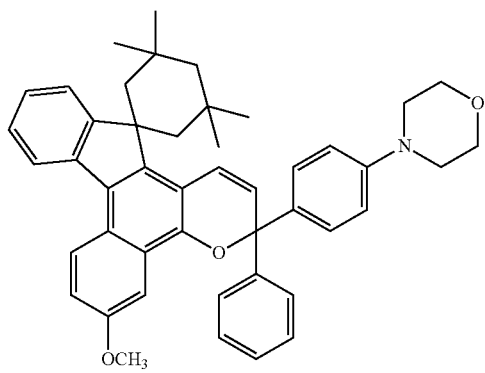
[Chemical formula 24]
(7)
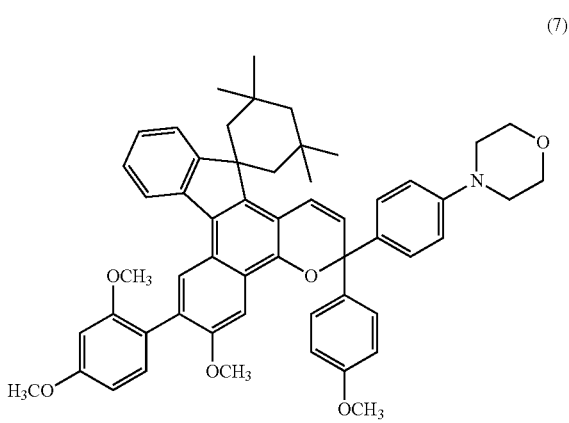
[Chemical formula 25]
(8)
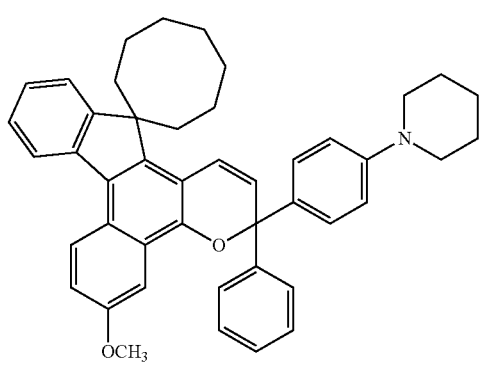

[Chemical formula 26]

(9)

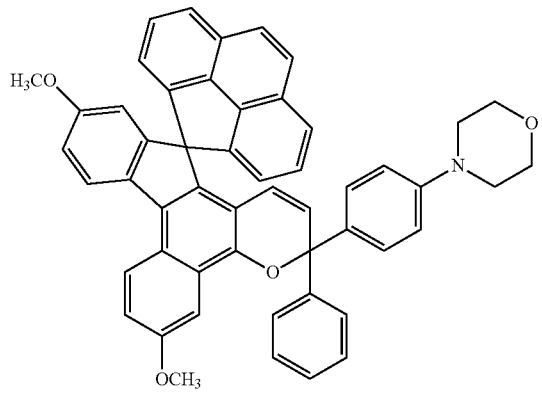

The blending amount of B component in the photochromic composition of the present invention is suitably 0.01 to 20 parts by weight with respect to 100 parts by weight of A component from the point of the photochromic characteristic. In case the above mentioned blending amount is too small, sufficient color optical density or durability tends to be difficult to obtain, and when it is too much, although it depends on the type of the photochromic compound, the photochromic compositions becomes difficult to dissolve against A component which not only causes the uniformity of the composition to decline, but also the bonding force (the adhesive force) tends to decline. In order to maintain the photochromic characteristics such as the color optical density or the durability or so while sufficiently maintaining the adhesion between the optical base material such as plastic film or so, the added amount of B component is preferably 0.5 to 10 parts by weight and more preferably 1 to 7 parts by weight with respect to 100 parts by weight of A component.

The Optional Component

Besides A component and B component, the photochromic composition of the present invention may include an organic solvent as optional component (C) (hereinafter, it may simply referred as C component), the isocyanate compound comprising two or more isocyanate groups in the molecule (D), and other components. Hereinafter, these optional components will be explained.

C Component: The Organic Solvent

By adding the organic solvent to the photochromic composition of the present invention, the polyurethane-urea resin (A component) and the photochromic compound (B component), further other components added depending on the needs becomes easy to mix, and the uniformity of the composition can be improved. Also, the viscosity of the photochromic composition of the present invention can be controlled appropriately, and the processability and the evenness of the thickness of the coated layer when coating the photochromic composition of the present invention to the optical sheet or film can be further enhanced. Note that, in case the material easily affected by the organic solvent is used as the optical sheet or film, the appearance may be damaged, or the photochromic characteristic may decline; however such problems can be avoided by applying the following described method. Also, regarding the photochromic composition of the present invention, as it will be described in the following, various types of solvent can be used, thus the above mentioned problems can be prevented by using the solvent selected from those which barely affects the optical sheet or film as the solvent.

For examples of the organic solvent which can be suitably used as C component, alcohols such as methanol, ethanol, n-propanol, i-propanol, n-butanol, t-butanol, 2-butanol or so; polyvalent alcohol derivatives such as ethyleneglycolmonomethylether, ethyleneglycolmonoisopropylether, ethyleneglycolmonoethylether, ethyleneglycolmono-n-propylether, etheyleneglycolmono-n-butylether, ethyleneglycolmono-t-butylether, propyleneglycolmonomethylether, propyleneglycolmonoethylether, propyleneglycol-n-butylether, ethyleneglycoldimethylether or so; diacetone alcohol; ketones such as methylethyl ketone, diethylketone or so; toluene; hexane; heptane; acetates such as ethyl acetate, acetate-2-methoxyethyl, acetate-2-ethoxyethyl or so; DMF; DMSO; THF; cyclohexane or so; and the combinations thereof may be mentioned.

Among these, it may be selected accordingly depending on the type of A component used or the material of the optical sheet or film. For example, in case of using the polycarbonate resin as the optical sheet or film and coating the photochromic composition of the present invention directly, alcohols, or polyvalent alcohol derivatives is preferably used as for the solvent.

Also, from the point that the organic solvent is hardly left, and to increase the speed of the drying speed while maintaining the smoothness of the photochromic adhesive sheet in case of using the coated layer pasting the photochromic composition of the present invention to the optical sheet or film; or in case of using the method described in the following; it is preferable to use as C component by mixing the organic solvent having the boiling point of less than 90° C. and the organic solvent having the boiling point of 90° C. or higher. The blending ratio of the organic solvent having the boiling point of less than 90° C. and that of 90° C. or higher may be determined accordingly depending on other components used. Among these, in order to exhibit excellent effect, it is preferable that the organic solvent having the boiling point of less than 90° C. is 20 to 80 wt % and the organic solvent having the boiling point of 90° C. or higher is 80 to 20 wt % when whole organic solvent amount is 100 wt %.

Also, in case of adding C component, from the point of the effect obtained by adding C component as mentioned in above, the added amount is 5 to 900 parts by weight, more preferably 20 to 750 parts by weight, and most preferably 40 to 400 parts by weight with respect to 100 parts by weight of A component.

D Component: The Isocyanate Compound Having at Least One Isocyanate Group in the Molecule In the present invention, by further using the isocyanate compound having at least one isocyanate group in the molecule as D component, the following described adhesive strength of the optical article can be further improved.

In the present invention, as for the isocyanate compound having at least one isocyanate group in the molecule, known isocyanate compound can be used without any limitation. These may be used alone, or by combining two or more thereof.

The reason why excellent adhesion is exhibited by adding D component to the above mentioned A component is not clear, however the following reason is thought. A part of the isocyanate group included in D component is hydrolyzed by the water included in the photochromic composition of the present invention, or by the moisture in the surrounding environment (that is, under the presence of water); thereby amino group is produced. This amino group formed reacts with the isocyanate group left in D component; thereby produces the reaction product comprising urea bond. The urea bond of the reaction product generated here forms the hydrogen bond between the urethane bond and urea bond present in A component; thereby it is thought that the aggregation force of the photochromic adhesive layer is improved, and the adhesion and the heat resistance are also improved. Particularly, after being contacted with the hot water, the adhesion (the adhesion between the optical sheet and said adhesive layer) can be highly maintained. This effect is better than that of when using the polyurethane resin of 2 liquid type.

The reaction product of this D component can be confirmed by comparing the infrared absorption spectrum of the photochromic composition of the present invention and the obtained photochromic adhesive agent (layer). In the photochromic compound and the adhesive agent layer, the generation of the reaction product can be confirmed by the reduction of the absorption of the isocyanate group. The reaction product can be confirmed for example from the peak intensity ratio between the isocyanate group and the methylene group. As the photochromic composition, the absorption of the isocyanate group origin can be confirmed. On the other hand, for the photochromic adhesive layer taken out from the photochromic laminated article produced under the presence of the water, the absorption of said isocyanate group decreases as time passes, and at the end, it is confirmed to disappear. Also, in the adhesive layer, the increase of the absorption of the urea bond is confirmed as the absorption of the isocyanate group decreases. Therefore, at the adhesive layer, the presence of the reaction product (the reaction product comprising the urea bond) of D component can be confirmed.

As for the above mentioned isocyanate compound, in addition to the isocyanate compound shown as examples of A2 component, the compound having at least one isocyanate group in the molecule, such as 1-adamantyl isocyanate, propyl isocyanate, isopropyl isocyanate, butyl isocyanate, tert-butyl isocyanate, hexane isocyanate, nonyl isocyanate, dodecyl isocyanate, cyclohexyl isocyanate, 4-methylcyclohexyl isocyanate, allyl isocyanate, 3-isocyanatepropyltriethoxy silane, 2-methacryloyloxyethyl isocyanate, 2-acryloyloxyethyl isocyanate, 1,1-bis(acryloyloxymethyl)ethyl isocyanate, isocyanic acid m-tolyl, isocyanic acid phenyl, 3,5-di(trifluoromethyl)phenyl isocyanate, 4-fluorophenyl isocyanate, 4-(trifluoromethoxy)phenyl isocyanate, 3-(trifluoromethyl) phenyl isocyanate, 1-isocyanato-2,4-dimethoxy benzene, isocyanato ethyl acetate, 2-isocyanatobenzoylchloride, 3-isocyanato-1,2,4,5-tetramethyl benzene, 4-isocyanato-4-propyl pentane, 1-isocyanato-1-propene, 3-bromo-2-(4-isocyanatophenyl)thiophene, isocyanatopropyldimethylsilylcyclohexylpolyhedraloligomericsilsesquioxane, isocyanatopropyldimethylsilylisobutylpolyhedralorigomericsilsesqueoxane or so may be mentioned.

Also, the compound having three isocyanate group in the molecule such as, 1,3,5-tris(6-isocyanatohexyl)biuret, (2,4, 6-trioxytriazine-1,3,5(2H, 4H, 6H)tolyl)tris(hexamethylene) isocyanate, 1-methylbenzene-2,4,6-tolyltriisocyanate, 4,4'4"-methylidynetris(isocyanatobenzene), methylsilanetolyltris isocyanate, 2,6-diisocyanatocaproic acid 2-isocyanatoethyl, 2,6-bis[(2-isocyanatophenyl)methyl]phenyl isocyanate, tris(3-methyl-6-isocyanatobenzoyl)methane, tris(4-methyl-3-isocyanatobenzoyl)methane, tris(3-isocyanatophenyl)methane, tris(3-methyl-4-isocyanatobenzoyl)methane, tris(4-methyl-2-isocyanatobenzoyl)methane or so may be mentioned. Also, the compound having three isocyanurate groups may be mentioned as well.

Further, the compound having four isocyanate groups in the molecule such as, tetraisocyanatosilane, [methylenebis(2, 1-phenylene)]bisisocyanate or so may be mentioned.

Also, the isocyanate compound (D') (hereinafter, it may simply referred as D' component) obtained by reacting aforementioned A3 component with the isocyanate compound having two or more isocyanate groups in the molecule can also be used as D component of the present invention.

When preparing the above mentioned D' component, it is preferably those obtained by reacting diisocyanate compound which is the aforementioned A2 component, and aminoalcohol compound which is the aforementioned A3 component or diol compound. Among these, as diisocyanate compound, aliphatic diisocyanate such as tetramethylene-1,4-diisocyanate, hexamethylene-1,6-diisocyanate, octamethylene-1,8-diisocyanate, 2,2,4-trimethylhexane-1,6-diisocyanate or so; the isomer mixtures such as cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, 4,4'-methylenebis(cyclohexylisocyanate) or so; alicyclic isocyanate such as hexahydrotoluene-2,4-diisocyanate, hexahydrotoluene-2,6-diisocyanate, hexahydrophenylene-1,3-diisocyanate, hexahydrophenylene-1,4-diisocyanate or so are preferably used.

On the other hand, as amino alcohol compound, 2-aminoethanol, 3-aminopropanol, 4-aminobutanol, 5-aminopentanol, 6-aminohexanol, 2-piperidinemethanol, 3-piperidinemethanol, 4-piperidinemethanol, 2-piperidineethanol, 4-piperidineethanol or so are preferably used.

Also, as diol compound, ethyleneglycol, 1,2-propanediol, 1,3-propanediol, 1,2-butanediol, 1,3-butanediol, 1,4-butanediol, 1,3-pentanediol, 2,4-pentanediol, 1,5-pentanediol, 2,2, 4-trimethyl-1,3-pentanediol, 2-methyl-1,3-pentanediol, 2,5-hexanediol, 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanediol, 1,4-cyclohexanedimethanol, 1,2-bis(hydroxyethyl)-cyclohexane, diethyleneglycol, triethyleneglycol, tetraethyleneglycol, dipropyleneglycol, tripropyleneglycol, neopentylglycol are preferably used.

Said D' component must be present with one or more isocyanate groups in the molecule. Therefore, when preparing said D' component, the total mol number of the isocyanate group of A2 component must be larger than the total mol number of the groups capable of reacting with the isocyanate group of A3 component.

The isocyanate group included in said D component can be used in the condition being protected by the blocking agent. As for the blocking agent, for example, acid amides, lactams, acid imides, imidazols, ureas, oxime compounds or so may be used. Specifically, acetanilide, acetic acid amide, $\epsilon$-caprolactam, succinic imides, maleic imides, dimethylpyrazole, thiourea, acetaldoxime, acetoneoxime, methylethylketoxime or so may be mentioned.

The number of the isocyanate group included in D component (D' component) may be one, however it is preferably two or more. By having two or more isocyanate groups in the molecule of D component, when forming the photochromic adhesive agent layer, the urea resin (the reaction product of D component) having large molecular weight can be formed. As a result, the aggregation force between the reaction product of D component and A component is improved, thus it is thought that the effect of the improved adhesion is further enhanced. On the other hand, in case four or more isocyanate groups are present (in the molecule of D component), the urea resin crosslinked in a mesh form is formed, thus the phase separation tends to occur between A component which tends to cause the opaque photochromic adhesive layer of the present invention. Therefore, D component (including D' component) is a compound preferably comprising two or three isocyanate groups in the molecule, and more preferably it is a compound comprising two isocyanate groups.

Also, D component is preferably the isocyanate compound selected from the aliphatic isocyanate compounds and alicyclic isocyanate compound from the point of the weather resistance. The aromatic isocyanate compound easily causes the phase separation between A component, and tends to cause the opaque photochromic adhesive layer of the present invention. This is thought to be caused since the aromatic isocyanate compound has faster reaction and higher aggregation force than the aliphatic isocyanate compound and the alicyclic isocyanate compound. From the point of this opaqueness, D component is preferably the isocyanate compound selected from the aliphatic isocyanate compound and the alicyclic isocyanate compound.

In the present invention, the molecular weight of said D component (including said D' component) is not particularly limited, however it is preferably less than 1000. In case the molecular weight of said D component is 1000 or larger, the heat resistance and film strength of the obtained photochromic adhesive layer tends to decline. It is thought that when the isocyanate compound having high molecular weight is blended, it affects the structural part other than the urea bond in the reaction product of D component. Also, if the mol number of the isocyanate group is present more than a specific amount in order to improve the adhesion, the blending amount against A component increases for the isocyanate compound having large molecular weight. As a result, the structural part other than the urea bond of said reaction product is thought to be influenced easily. From this point of view, the molecular weight of D component is preferably less than 1000. As described in above, the molecular weight of D component is further preferably 750 or less, and most preferably 600 or less. Obviously, the molecular weight of said D' component is less than 1000 from the same reason. This D component (D' component) is preferably not a polymer as mentioned in above. Therefore, the molecular weight of said D component (D' component) refers the molecular weight of D component (D' component) itself. The lower limit of the molecular weight of D component is the molecular weight of the monomeric compound, and it is 100 though it not particularly limited.

The Blending Amount of D Component

The blending amount of D component in the photochromic composition in the present invention is suitably 0.01 to 20 parts by weight with respect to 100 parts by weight of A component from the point of the adhesion, the heat resistance and the photochromic characteristics. In case the above blending amount is too little, the effect of improved adhesion and the heat resistance can be obtained sufficiently, and in case it is too much, the adhesive layer obtained from said photochromic composition tends to change opaque, lower the adhesion, and lowers the durability of the photochromic compound. In order to improve the adhesion between the optical base material such as plastic film or so while maintaining the photochromic characteristics such as the color optical density or the durability, the blending amount of D component is 0.1 to 10 parts by weight, more preferably 0.5 to 5 parts by weight with respect to 100 parts by weight of A component. Here, the ratio of the isocyanate group of D component is 0.01 to 10 parts by weight, preferably 0.02 to 5.0 parts by weight, and further preferably 0.1 to 3.0 parts by weight with respect to 100 parts by weight of A component. Here, the amount of the isocyanate group can be obtained from the molecular weight of B component and the number of the isocyanate group per one molecule.

Water

The photochromic composition of the present invention can blend the water. Particularly, by blending the water when adding D component as the isocyanate compound, the isocyanate group included in D component of the present invention can be hydrolyzed efficiently. This water can be blended to the photochromic composition of the present invention from the beginning. Note that, considering the storage stability of the photochromic composition, it is preferable to blend during the use of the photochromic composition, that is, when the optical sheet are being adhered against each other by forming the coated film by said compositions. Also, this water can be substituted by the moist present under the atmosphere when forming the photochromic composition, which will be described in the following. The hydrolysis of the isocyanate group included in D component proceeds by contacting with the water (the most) in the environment after the film is formed by coating the photochromic composition to the optical sheet.

The blending amount of water is not particularly limited, and the moist in the environment can be used which will be described in the following. As for the preferable blending amount, it is within the range of 0.01 times to 5 times mol, preferably 0.05 times to 3 times mol and more preferably 0.1 time to 2 times mol with respect to the mol number of the isocyanate group included in D component.

Other Component

Further, in the photochromic composition used for the present invention, for the improvement of the durability of the photochromic compound, the improvement of the color optical density, the improvement of the color fading speed or the film forming property; the surfactant, the antioxidant, the radical capturing agent, the ultraviolet stabilizer, the ultraviolet absorbing agent, the releasing agent, the coloration inhibitor, the anti-static agent, the fluorescent die, the coloring dye, the pigment, the aromatic agent, the plasticizer or so may be added. As for these additives which are added, the known compounds are used without any limitations.

For example, as the surfactant, any of nonionic, anionic, cationic can be used, however it is preferable to use nonionic surfactants from the point of the solubility to the photochromic compositions. As the specific nonionic surfactant able to be used suitably, sorbitan fatty acid ester, glycerin fatty acid ester, decaglycerin fatty acid ester, propylene glycol/pentaerythritol fatty acid ester, polyoxyethylene sorbitan fatty acid ester, polyoxyethylenesorbitan fatty acid ester, polyoxyethyleneglycerin fatty acid ester, polyethyleneglycol fatty acid ester, polyoxyethylenealkylether, polyoxyethylenephytosterol/phytostanol, polyoxyethylenepolyoxypropylenealkylether, polyoxyethylenealkylphenylether, polyoxyethylene caster oil/curable caster oil, polyoxyethylenelanoline/lanorine alcohol/beeswax derivatives, polyoxyethylenealkylamine/fatty acid amine, polyoxyethylenealkylphenylformaldehyde condensation product, single chain polyoxyethylenealkylether, and further the surfactant of silicones or fluorine can be mentioned.

For the use of the surfactant, it may be used by mixing two or more thereof. The added amount of the surfactant is preferably within the range of 0.001 to 5 parts by weight with respect to 100 parts by weight of the polyurethane-urea resin (A component).

Also, as the antioxidant, the radical capturing agent, the ultraviolet stabilizer, and the ultraviolet absorbing agent, the hindered amine photo stabilizer, the hindered phenol antioxidant, the phenol radical capturing agent, the sulfur antioxidant, the phosphorous antioxidant, the triazine compounds, the benzotriazol compounds, the benzophenone compounds or so can be suitably used. These antioxidant, radical capturing agent, ultraviolet stabilizer, ultraviolet absorbing agent may be used by combining two or more thereof. Further, for the use of these additives, the antioxidant, the radical capturing agent, the ultraviolet stabilizer and the ultraviolet absorbing agent, and the surfactant may be used together. The added amount of these antioxidant, radical capturing agent, ultraviolet stabilizer, ultraviolet absorbing agent is preferably within the range of 0.001 to 20 parts by weight with respect to 100 parts by weight of the polyurethane-urea resin (A component). Note that, if these additives are used too much, the adhesion of the photochromic composition to the optical sheet or film made of polycarbonate resin declines, thus the added amount is preferably 7 parts by weight or less, more preferably 3 parts by weight or less, and most preferably 1 part by weight or less.

The Production Method of Photochromic Composition

The photochromic composition of the present invention can be produced by mixing above mentioned A component and B component, and C component, D component (D' component) which are added if needed, and other component. The order of mixing of each component is not particularly limited.

For example, in case of not using the organic solvent, each component can be melt kneaded and the photochromic composition can be made into a pellet, and also it can be sheet molded. Also, in case of using the organic solvent, the photochromic composition can be obtained by dissolving each component to the organic solvent.

The photochromic composition of the present invention obtained as such can be suitably used as the photochromic adhesive agent for adhering the optical sheet or film made of photochromic adhesive agent, particularly made of polycarbonate resin. Further, by binding the optical sheets or films with each other via the adhesive layer consisting of the photochromic composition of the present invention, the optical article can be obtained. Hereinafter, the optical article and the production method thereof will be described.

Optical Article

The optical article has the multilayer structure wherein two optical sheets or films opposing each other are bound via the adhesive layer consisting of the photochromic composition of the present invention. As for such optical article; the multilayer sheet or film formed only by the above mentioned multilayer structure (hereinafter, it may be simply referred as the multilayer sheet); the multilayer sheet or film wherein two optical sheets or films are bound via other adhesive sheet at both sides of the adhesive layer consisting of the photochromic composition when forming the above mentioned multilayer structure; the multilayer sheet or film in which the optical sheet or film is further laminated or the coating layer such as hard coat layer or so are formed on the above mentioned multilayer sheet or film; the optical article wherein the optical base material such as plastic lens body or so are made one body with the above mentioned multilayer sheet or film, or the complex multilayer sheet (hereinafter, it may be simply referred, as a whole, the multilayer sheet or so of the present invention.) or so may be mentioned.

In the multilayer sheet of the present invention, it is possible to produce the multilayer sheet or film by laminating other adhesive layer (hereinafter, it may be referred as the second adhesive layer) at both sides of the adhesive layer (hereinafter, it may be referred as the first adhesive layer) consisting of the photochromic composition as mentioned in above; then binding two optical sheets or films via said second adhesive layer.

By laminating the second adhesive layer, the adhesion of the multilayer sheet of the present invention can be further improved. As for the reason of the improvement of the adhesion of the multilayer sheet of the present invention by laminating the second adhesive layer, the following two points can be mentioned.

First, the layer comprising the compound of which easily under goes photooxidative degradation such as the photochromic composition is prevented from directly contacting with the optical sheet or film. The reason for this is not necessarily clear, however it is thought that the photochromic composition which was made to low molecular weight by being degraded from the photooxidative degradation enters to the interface between the adhesive layer and the optical sheet or film; thereby the adhesion of the both are thought to be lowered.

Second, although it exhibits the effect particularly against the optical sheet or film consisting of thermoplastic resin, by directly coating the adhesive agent having a fluidity at the liquid condition such as before curing or being dissolved in the organic solvent, to the optical sheet or the optical film; the optical sheet or the optical film can be immersed in the adhesive agent and permeate again; thus the adhesive strength is thought to be improved.

Therefore, the second adhesive layer used in the present invention preferably does not have the photochromic compound, and further preferably it is directly coated to the optical sheet or the optical film in the condition of the adhesive agent having fluidity under the liquid status.

As for the component used for the second adhesive layer of the present invention, it preferably includes the compound comprising urethane bond or urea bond in the material used (hereinafter, it may be simply referred as urethane compound). By using said urethane compound, further strong adhesive strength between the first adhesive layers having the photochromic compound of the present invention can be obtained. This is thought because an intermolecular force is generated between the polyurethane-urea resin included in the first adhesive layer of the present invention and said urethane compound.

As for said urethane compound used in the present invention, urethane(meth)acrylate, 2 liquid type urethane, moisture curable urethane, urethane dead polymer or so may be mentioned.

As for urethane(meth)acrylate, the reaction product formed by reacting the isocyanate compound described as the component of the first adhesive layer of the present invention, the isocyanate compound obtained by reacting the polyol compounds such as diol or triol or so, and the compound comprising (meth)acrylate group and the hydroxyl group in the molecule such as hydroxyethyl(meth)acrylate or so may be mentioned.

As for 2 liquid type urethane, the known 2 liquid type urethane resin can be used, and the mixture of the compound comprising the isocyanate group at the molecular terminal end, and the compound comprising the hydroxyl group and/or the amino group at the molecular chain terminal end can be mentioned.

As for the moisture curable urethane, known moisture curable urethane resin can be used, and the urethane prepolymer comprising the isocyanate group at the terminal end obtained by reacting polyol having two or more hydroxyl group in the molecule and excessive polyisocyanate compound can be mentioned. A part of the polyurethane-urea resin used for the first adhesive layer of the present invention can be used as the moisture cured urethane resin.

The urethane dead polymer is different from the above mentioned urethane compound and does not have the reactive group at the terminal end, and the urethane compound obtained by reacting the polyurethane-urea resin terminal end which is used for the first adhesive layer of the present invention with the terminator or so can be mentioned.

As mentioned in above, from the point of the adhesion, the second adhesive layer of the present invention is preferably coated directly to the optical sheet or the optical film in the adhesive agent condition having fluidity in a liquid status such that it includes the organic solvent or so. However, in case of coating to the optical sheet or the optical film having low solvent resistance, said optical sheet or the optical film is too eroded; hence the adhesion thereof will rather decline.

Thus, from the point of the solubility of the optical sheet or the optical film of the organic solvent included in the adhesive agent forming the second adhesive layer, the solid portion concentration of the adhesive agent forming the second adhesive layer is preferably within the range of 20 to 100 wt %, and the thickness of the second adhesive layer is thinner than first adhesive layer, and preferably it is within the range of 1 to 40 µm, further preferably it is 2 to 20 µm.

The adhesive agent forming the second adhesive layer may include, if needed, the organic solvent which is used for the first adhesive layer.

Furthermore, for the improvement of the film forming property or the weather resistance, the surfactant, the antioxidant, the radical capturing agent, the ultraviolet stabilizer, the ultraviolet absorbing agent, the coloring or so which are used in the first adhesive agent may be included. Also, in case of urethane(meth)acrylate, it is preferable to add the photoradical polymerization initiator.

Also, as for the method for making as one body with the optical base material such as the plastic lens or so, for example, the method of injection molding the thermoplastic resin for constituting the optical base material (for example, the lens body) such as polycarbonate resin or so after installing the multilayer sheet or so of the present invention in the metal mold (hereinafter it may be simply referred as the injection molding method), or the method of pasting the multilayer sheet or so of the above mentioned present invention by the adhesive agent to the surface of the optical base material may be mentioned. Also, after immersing the above mentioned multilayer sheet (it may be the complex multilayer sheet) in the polymerizable monomer capable of forming the optical base material, curing said polymerizable monomer, and embedding said multilayer sheet in the optical base material thereby making as one body. Therefore, said optical article may be those laminating the above mentioned multilayer sheet (it may be the complex multilayer sheet) on thermoplastic optical base material consisting of the thermoplastic resin or the thermosetting resin; or it may be those embedding the above mentioned multilayer sheet (it may be the complex multilayer sheet) in said plastic optical base material.

Hereinbelow, these material or the parts consisting the optical article of the present invention will be explained.

The Optical Sheet or Film, and the Optical Base Material

In the present invention, as the optical sheet or film, and the optical base material, the sheet or the film, and the optical base material having the optical transparency can be used without particular limitation; however, it is suitable to use those made of resin as it is easy to obtain and easy to process. As examples of the resins as the material of the optical sheet or film, and the optical base material, polycarbonate resin, polyethylenetelephthalate resin, nylon resin, triacetylcellulose resin, acrylic resin, urethane resin, allyl resin, epoxy resin, polyvinyl resin or so may be mentioned. Among these, polycarbonate resin is particularly preferable since it has good adhesion and high applicability against the injection molding. Also, the polarizing film (those which the polyvinyl alcohol polarizing film being sandwiched between the triacetylcellulose resin film) can be used as the optical film of the present invention.

The Production Method of the Multilayer Sheet of the Present Invention

The multilayer sheet of the present invention is produced by binding two optical sheets or films facing each other via the adhesive layer consisting of the photochromic composition of the present invention. Note that, the thickness of the above mentioned first adhesive layer is 5 to 100 µm; more preferably it is 10 to 50 µm from the point of the color optical density, the weather resistance and the adhesive strength of the photochromic compound. Also, in case of using the second adhesive layer, the thickness thereof is preferably within the range of 1 to 40 µm, and more preferably 2 to 20 µm as mentioned in the above.

The above mentioned adhesive layer can be obtained from the following method depending on the property of the photochromic composition used. That is, in case the photochromic composition of the present invention is controlled to a suitable viscosity by adding the solvent or so, to the one of the optical sheet or film the photochromic composition of the present invention is coated, and after carrying out the drying (heating) if needed, other optical sheet or film may be (heat) pressure adhered.

Here, as for the coating method of the photochromic composition, the known methods such as a spin coat method, a spray coat method, a dip coat method, a dip spin coat method, a dry lamination method or so can be used without any limitation. Also, the optical sheet or film used in the present invention may be washed/degreased by the organic solvent such as methanol or so in advance. Further, a corona discharge treatment, a plasma discharge treatment, a UV ozone treatment or so can be carried out as well. In case of using such method, the laminated article can be produced continuously using the device described in the Patent 3.

Also, in case of using the photochromic composition of the present invention including the organic solvent, the (C) organic solvent is removed by (I) drying after extending the photochromic composition of the present invention on the flat and smooth base material, then the photochromic adhesive sheet including A component and B component dispersed in said A component is formed by removing the base material, followed by (II) adhering two optical sheets or films by placing the above mentioned photochromic adhesive sheet in between two optical sheets or films facing each other; thereby the laminated article of the present invention can be produced.

As for the material of the flat and smooth base material, those having the resistance to the solvent used in the present invention, or those which the polyurethane-urea resin of the present invention can be released easily are preferable, and for specific example, glass, stainless, Teflon™, polyethylenetelephthalate, polypropylene, and the plastic film laminated with the coat layer which improves the releasability such as silicones or fluorines may be mentioned.

In case of employing such method, regardless of the type of the solvent and the type of the optical sheet or film, the adverse effect caused by the use of the solvent can be eliminated.

The coating and the drying of the above mentioned photochromic composition is preferably carried out at the temperature of the room temperature to 100° C., the humidity of 10 to 100% RH. Particularly, in case of using the photochromic composition blended with D component, it is preferable to work under the presence of the humidity. That is, in case D component is present, by carrying out the coating and the drying under this condition, the hydrolysis of D component is promoted, and further strong adhesive force can be obtained. By carrying out the drying under the above mentioned humidity (under the presence of the moisture), the photochromic adhesive layer (sheet) exhibiting an excellent property can be obtained without blending the water in the photochromic composition. Also, in case of blending the water, said sheet can be formed under the drying condition.

The photochromic multilayer sheet obtained at the step of binding said optical sheets or optical films, it may be used as it is, however it can be used by stabilizing the condition thereof by the following method. Specifically, it is preferable to leave the laminated article just bound at the temperature of 20° C. or higher and 60° C. or less for 4 hours or longer. The upper limit for the time for leaving is not particularly limited, however, 50 hours or so is sufficient. Also it can be left at normal pressure, or it can be left under vacuumed condition. Further, this multilayer sheet being left is preferably left at the temperature of 80° C. or higher and 130° C. or less for 30 minutes to 3 hours (hereinafter, it will be considered as the heat treatment). The multilayer sheet obtained by this heat treatment will have a very stable condition. Also, in case of using this photochromic composition blended with D component, it is preferably treated at room temperature to 100° C. and under the humidity of 30 to 100% RH. By carrying out this humidify treatment, the isocyanate group of D component origin present in the multilayer sheet can be eliminated, thus the photochromic characteristic and the adhesion can be further stabilized. Further, after the humidify treatment, by leaving under normal pressure or under vacuumed condition at 40 to 130° C., the excessive water present in the multilayer sheet can be removed.

Also, as the method for producing the multilayer sheet comprising the aforementioned second adhesive layer, the production method thereof is not particularly limited as long as the embodiment has the lamination of the second adhesive layer between the first adhesive layer and the optical sheet or the optical film.

As for the production method, 1) the method of laminating the second adhesive layer on the optical sheet or the optical film in advance and sandwiching the first adhesive layer with two optical sheets or the optical films having this second adhesive layer;

2) the method of coating the second adhesive layers at both sides of the first adhesive layer then binding the optical sheet or the optical film at both sides thereof;

3) the method of sequentially laminating on the optical sheet or the optical film, so that it is in the order of the first adhesive layer, the second adhesive layer, the first adhesive layer and then optical sheet or the optical film; or so may be mentioned; however from the point of the production efficiency, it is most preferable to use the method 1).

As for the coating method and the drying method of the second adhesive layer of the present invention, it can be carried out as the same method as the first adhesive layer. Also, for urethane(meth)acrylate adhesive agent, in case of using the photopolymerization initiator together, it is possible to carry out the photo-curing as well.

Further, in case of using the photochromic composition of the present invention including the solvent, the photochromic sheet can be produced by co-extrusion molding or so.

EXAMPLE

Hereinafter, the present invention will be described in further detail, by using the examples. These examples are to simply describe the present invention, and the scope and the spirit of the present invention is not to be limited to these examples.

Hereinafter, the abbreviation of the compounds or so used as each component in the examples and the comparative examples are listed.

A1 Component: Polyol Compound

PL1: EXCENOL made by ASAHI GLASS CO., LTD (polypropyleneglycol, the number average molecular weight 400).

PL2: EXCENOL made by ASAHI GLASS CO., LTD (polypropyleneglycol, the number average molecular weight 1000).

PL3: EXCENOL made by ASAHI GLASS CO., LTD (polypropyleneglycol, the number average molecular weight 2000).

PL4: DURANOL made by Asahi Kasei Chemicals Corporation (polycarbonate diol having 1,5-pentane diol and hexane diol as the material, the number average molecular weight 500).

PL5: DURANOL made by Asahi Kasei Chemicals Corporation (polycarbonate diol having 1,5-pentane diol and hexane diol as the material, the number average molecular weight 800).

PL6: DURANOL made by Asahi Kasei Chemicals Corporation (polycarbonate diol having 1,5-pentane diol and hexane diol as the material, the number average molecular weight 1000).

PL7: DURANOL made by Asahi Kasei Chemicals Corporation (polycarbonate diol having 1,5-pentanediol and hexanediol as the material, the number average molecular weight 3000).

PL8: PRACCEL made by DAICEL CORPORATION (polycaprolactonediol, the number average molecular weight 500).

PL9: POLYLITE made by DIC Corporation (polyester diol consisting of adipic acid and 1,4-butane diol, the number average molecular weight 1000).

PL10: ETERNACOLL made by UBE INDUSTRIES. LTD (polycarbonatediol having 1,4-cyclohexanedimethanol as the material, the number average molecular weight 1000).

PL11: EXCENOL made by ASAHI GLASS CO., LTD (polypropyleneglycol, the number average molecular weight 4000).

PL12: 1,10-decandiol.

A2 Component: Polyisocyanate Compound

NCO1: isophorone diisocyanate.
NCO2: 4,4'-methylenebis(cyclohexylisocyanate).
NCO3: hexamethylene-1,6-diisocyanate.
NCO4: toluene-2,4-diisocyanate.
NCO5: norbornane diisocyanate.
NCO6: 1,3,6-hexamethylene triisocyanate.
NCO7: the reaction product of 1,2,2,6,6-pentamethyl-4-hydroxypiperidine and 1-methylbenzene-2,4,6-triisocyanate.
NCO8: the reaction product of 1,2,2,6,6-pentamethyl-4-hydroxypiperidine and 1,6,11-undecatriisocyanate.

A3 Component: The Amino Group Containing Compound (the Chain Extender)
  CE1: isophorone diamine.
  CE2: ethylene diamine.
  CE3: 1,6-diaminohexane.
  CE4: 2-aminoethanol.
  CE5: 6-aminohexanol.
  CE6: glycine.
  CE7: 2-aminoethanethiol.
  CE8: piperazine.
  CE9: N,N'-diethylethylenediamine.

The Chain Extender Other than the Amino Group Containing Compound
  CE10: 1,4-butane diol.
  CE11: 1,10-decane diol.

A4 Component: The Functionalization Compound
  HA1: 1,2,2,6,6-pentamethyl-4-hydroxypiperidine.
  HA2: 1,2,2,6,6-pentamethyl-4-aminopiperidine.
  HA3: the compound shown by the following formula (TINUVIN 622LD made by Ciba Specialty Chemicals, the average molecular weight 3100 to 4000).

[Chemical formula 3]

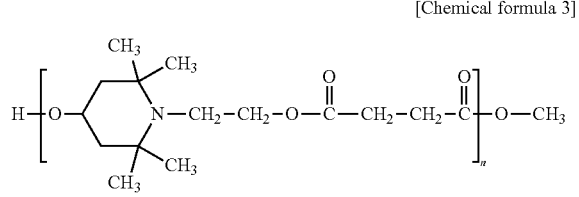

HA4: 4-hydroxy-2,2,6,6-tetramethyl-1-piperidine ethanol.
  HA6: 3-t-butyl-5-methyl-4-hydroxy benzoate.
  HA7: 3-[3'-(2"H-benzotriazol-2"-yl)-4'-hydroxyphenyl] propionate.

A5 Component: The Terminator
  HA8: normal butylamine.

B Component: The Photochromic Compound
  PC1: the compound shown in the following formula.

[Chemical formula 19]

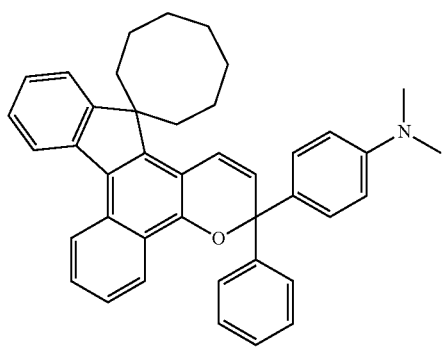

PC2: the compound shown by the following formula.

[Chemical formula 22]

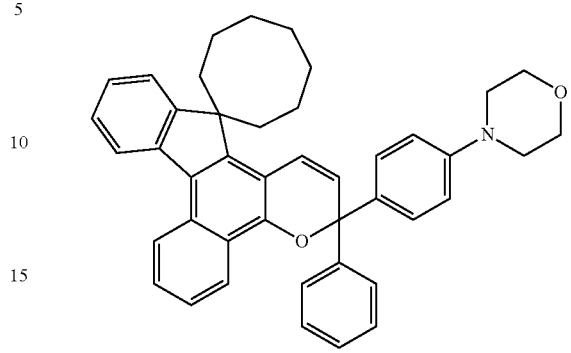

PC3: the compound shown by the following formula.

[Chemical formula 18]

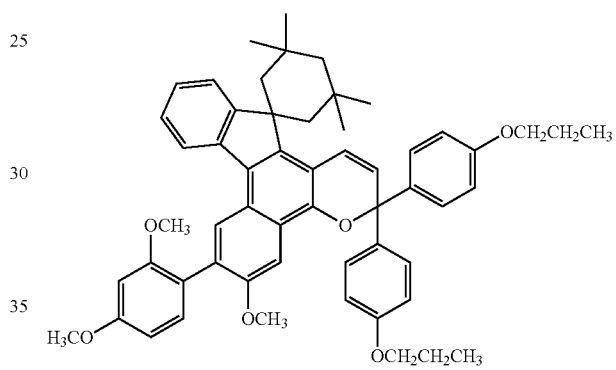

C Component: The Organic Solvent
  C1: isopropyl alcohol.
  C2: propyleneglycol-monomethylether.
  C3: toluene.
  C4: ethyl acetate.
  C5: cyclohexanone.
  C6: THF (tetrahydrofurane).
  C7: diethyl ketone.

D Component: The Isocyanate Compound
  D1: isophorone diisocyanate (the molecular weight 222).
  D2: 4,4'-methylenebis(cyclohexylisocyanate) (the molecular weight 262).
  D3: hexamethylene-1,6-diisocyanate (the molecular weight 168).
  D4: xylylenediisocyanate (the molecular weight 188).

The Preparation (D5' Component) of the Isocyanate Compound (D5)
  31 g of ethylene glycol and 222 g of isophorone diisocyanate were added into the three-necked flask having a stirring blade, a cooling pipe, a thermometer, and nitrogen gas introducing pipe; and the isocyanate compound (D5) was obtained by reacting under the nitrogen atmosphere at 70° C. for 6 hours.
  D5: the reaction product (the molecular weight 506) of isophorone diisocyanate (2 mol) and ethyleneglycol (1 mol).

The Preparation of (D' Component) of the Isocyanate Compound (D6)
  41.3 g of ethylene glycol and 222 g of isophorone diisocyanate were added into the three-necked flask having a stirring blade, a cooling pipe, a thermometer, and nitrogen gas introducing pipe; and the isocyanate compound (D6) was obtained by reacting under the nitrogen atmosphere at 70° C. for 6 hours.

D6: the reaction product (the molecular weight 790) of isophorone diisocyanate (3 mol) and ethyleneglycol (2 mol).
The Preparation (D' Component) of the Isocyanate Compound (D7)

533 g of polycarbonate diol having the average molecular weight of 800 and 222 g of isophorone diisocyanate were added into the three-necked flask having a stirring blade, a cooling pipe, a thermometer, and nitrogen gas introducing pipe; and the isocyanate compound (D7) was obtained by reacting under the nitrogen atmosphere at 70° C. for 6 hours.

D7: the reaction product (the number average molecular weight 2266) of isophorone diisocyanate (3 mol) and the polycarbonate diol (2 mol) having the number average molecular weight of 800.
Other Component TINUVIN 765: bis(1,2,2,6,6-pentamethyl-4-piperidyl)sebacate (made by Ciba Speciality Chemicals.)

Irganox 245: (ethylenebis(oxyethylene)bis[3-(5-tert-butyl-4-hydroxy-m-tolyl)propionate](made by Ciba Speciality Chemicals.).
The Preparation of Polyurethane-Urea Resin (U1)

9.0 g of polyether diol having the number average molecular weight of 400 and 10.0 g of isophorone diisocyanate and 80 ml of DMF were added into the three-necked flask having a stirring blade, a cooling pipe, a thermometer, and nitrogen gas introducing pipe; and reacted under nitrogen atmosphere at 120° C. for 5 hours, then cooled to 25° C. Then, 3.4 g of isophorone diamine as the chain extender was dropped and reacted for 1 hour at 25° C., followed by removing the solvent under the reduced pressure; thereby the polyurethane-urea resin (U1) was obtained. The molecular weight of the obtained polyurethane-urea resin was 150000 in terms of polystyrene, and 10000 in terms of polyoxyethylene (the theoretical value: 10000), and the heat resistance was 140° C. The theoretical value of the number average molecular weight mentioned here refers to the molecular weight in case A1 component, A2 component, A3 component which were used as the source material theoretically forms the straight polyurethane-urea resin without making crosslink.
The Preparation of Polyurethane-Urea Resin (U2) to (U10), (U1) to (U41)

U2 to U10 and U21 to U41 were prepared by the same method as the preparation method of U1, except for using the polyol compound (A1 component), polyisocyanate compound (A2 component), the amino group containing compound (A3 component) and the reaction solvent shown in Table 1 and Table 2; and the reaction condition shown in Table 1 and Table 2. Note that, in regards with polyurethane-urea resin U1 to U10 and U21 to U41, when the infrared absorption spectrum was measured, the absorption originating from the isocyanate group at the molecular terminal end was verified near 2250 $cm^{-1}$.
The Preparation of Polyurethane-Urea Resin (U11)

9.0 g of polyether diol having the number average molecular weight of 400 and 10.0 g of isophorone diisocyanate and 80 ml of DMF were added into the three-necked flask having a stirring blade, a cooling pipe, a thermometer, and nitrogen gas introducing pipe; and reacted under nitrogen atmosphere at 120° C. for 5 hours, then cooled to 25° C. Then, 3.4 g of isophorone diamine as the chain extender was dropped and reacted for 1 hour at 25° C. Then, 0.35 g of normal butylamine was added and reacted for 1 hour at 25° C., followed by removing the solvent under the reduced pressure; thereby the polyurethane-urea resin (U11) was obtained. When the infrared absorption spectrum was measured regarding the obtained polyurethane-urea resin, the absorption originating from the isocyanate group at the molecular terminal end was not confirmed; and thereby it was confirmed that the isocyanate group was not remaining at the molecular terminal end. The molecular weight of the obtained polyurethane-urea resin was 150000 in terms of polystyrene, and 10000 in terms of polyoxyethylene (the theoretical value: 10000), and the heat resistance was 140° C. The theoretical value of the number average molecular weight mentioned here refers to the molecular weight in case A1 component, A2 component, A3 component which were used as the source material theoretically forms the straight line polyurethane-urea resin without making crosslink.
The Preparation of Polyurethane-Urea Resin (U12) to (U20)

By using the polyol compound (A1 component), the polyisocyanate compound (A2 component), the amino group containing compound (A3 component) and the reaction solvent as shown in Table 1 under the reaction condition shown in Table 1, the preparation of U12 to U20 was carried out the same as the preparation method of U11. When the infrared absorption spectrum was measured regarding the obtained polyurethane-urea resin, the absorption originating from the isocyanate group at the molecular terminal end of neither resin were confirmed.
The Preparation of Polyurethane Resin (U42) to (U46) which does not Comprise the Urea Bond Except for using the polyol compound (A1 component), the polyisocyanate compound (A2 component) and the reaction solvent shown in Table 3, and using the diol compound (the chain extender) shown in Table 3 instead of A3 component, U42 to U46 were prepared under the condition shown in Table 3 by the same method as the preparation method of said U1. Note that, the polyurethane resin U42 to U46 does not have the urea bond in the molecule since the diol compound shown in Table 3 was used as the chain extender.
The Preparation of Polyurethane-Urea Resin (Z1) to (Z28), (Z31) to (Z40), and (W1 to W31)

Except for using the polyol compound (A1 component), the polyisocyanate compound (A2 component), the amino group containing compound (A3 component), the functionalization compound (A4 component) and the reaction solvent shown in Table 4, Table 5, Table 6, and Table 7 under the reaction condition shown in Table 4, Table 5, Table 6, and Table 7; the preparation of Z1 to Z28, Z31 to Z40, and W1 to W31 were carried out as same as the preparation method of said U11.
The Preparation of Polyurethane-Urea Resin (Z29)

180 g of polycarbonate diol having the average molecular weight of 800, 100 g of isophorone diisocyanate and 1200 ml of DMF were added into the three-necked flask having a stirring blade, a cooling pipe, a thermometer, and nitrogen gas introducing pipe; and reacted for 5 hours at 100° C. under the nitrogen atmosphere. Next, to this reaction solution, 9 g of 4-hydroxy-2,2,6,6-tetramethyl-1-piperidine ethanol was added, and further reacted for 5 hours at 100° C. under the nitrogen atmosphere. Then, it was cooled down to 25° C., and 30.4 g of isophorone diamine which is the amino group containing compound was dropped, then reacted for one hour at 25° C. followed by removing the solvent under reduced pressure to obtain the polyurethane-urea resin (Z29) having the piperidine ring in the main chain of the polyurethane urea resin. The number average molecular weight of the obtained polyurethane-urea resin is 270000 in terms of polystyrene, and 9000 in terms of polyoxyethylene (the theoretical value: 7000), and the heat resistance was 130° C.

The Preparation of Polyurethane-Urea Resin (Z30)

a) 6.5 g of 1,6,11-unedecanetriisocyanate and 4 g of 1,2,2,6,6-pentamethyl-4-hydroxypiperidine were added into the three-necked flask having a stirring blade, a cooling pipe, a thermometer, and nitrogen gas introducing pipe; and reacted for 5 hours at 120° C. Thereby, the diisocyanate compound wherein 1,2,2,6,6-pentamethyl-4-hydroxypiperidine and 1,6,11-unedecanetriisocyanate being reacted were obtained.

b) 180 g of polycarbonate diol having the average molecular weight of 800, 100 g of isophorone diisocyanate, the compound obtained by the reaction a), and further 1200 ml of DMF were added into the three-necked flask having a stirring blade, a cooling pipe, a thermometer, and nitrogen gas introducing pipe and reacted for 5 hours at 80° C. under the nitrogen atmosphere.

c) Next, to the reaction product obtained at b), 30.7 g of isophorone diamine which is the amino group containing compound was dropped, and reacted for 1 hour at 25° C., followed by removing the solvent under reduced pressure to obtain the polyurethane-urea resin (Z30) having the piperidine ring in the side chain of the polyurethane urea resin. The number average molecular weight of the obtained polyurethane-urea resin was 320000 in terms of polystyrene, and 9000 (the theoretical value: 7000) in terms of polyoxyethylene, and the heat resistance was 150° C.

TABLE 1

| Polyurethane-urea resin | The preparation condition of urethane prepolymer ||||||| The preparation condition of polyurethane-urea resin ||||| Butylamine |
| | A1 || A2 || The reaction solvent || The reaction condition || A3 || The reaction condition || |
| | Compound | The added amount (g) | Compound | The added amount (g) | Compound | The added amount (ml) | Temperature (° C.) | Time (hour) | Compound | The added amount (g) | Temperature (° C.) | Time (hour) | The added amount (g) |
|---|---|---|---|---|---|---|---|---|---|---|---|---|---|
| U1  | PL1  | 9    | NCO1 | 10 | DMF | 80  | 120 | 5 | CE1 | 3.4 | 25 | 1 | — |
| U2  | PL2  | 22.5 | NCO1 | 10 | DMF | 130 | 120 | 5 | CE1 | 3.4 | 25 | 1 | — |
| U3  | PL3  | 45   | NCO1 | 10 | DMF | 200 | 120 | 5 | CE1 | 3.4 | 25 | 1 | — |
| U4  | PL4  | 11.3 | NCO1 | 10 | DMF | 80  | 80  | 5 | CE1 | 3.4 | 25 | 1 | — |
| U5  | PL5  | 18   | NCO1 | 10 | DMF | 120 | 80  | 5 | CE1 | 3.4 | 25 | 1 | — |
| U6  | PL6  | 22.5 | NCO1 | 10 | DMF | 130 | 80  | 5 | CE1 | 3.4 | 25 | 1 | — |
| U7  | PL7  | 67.5 | NCO1 | 10 | DMF | 300 | 80  | 5 | CE1 | 3.4 | 25 | 1 | — |
| U8  | PL8  | 11.3 | NCO1 | 10 | DMF | 80  | 80  | 5 | CE1 | 3.4 | 25 | 1 | — |
| U9  | PL9  | 22.5 | NCO1 | 10 | DMF | 130 | 80  | 5 | CE1 | 3.4 | 25 | 1 | — |
| U10 | PL10 | 22.5 | NCO1 | 10 | DMF | 130 | 80  | 5 | CE1 | 3.4 | 25 | 1 | — |
| U11 | PL1  | 9    | NCO1 | 10 | DMF | 80  | 120 | 5 | CE1 | 3.4 | 25 | 1 | 0.35 |
| U12 | PL2  | 22.5 | NCO1 | 10 | DMF | 130 | 120 | 5 | CE1 | 3.4 | 25 | 1 | 0.35 |
| U13 | PL3  | 45   | NCO1 | 10 | DMF | 200 | 120 | 5 | CE1 | 3.4 | 25 | 1 | 0.35 |
| U14 | PL4  | 11.3 | NCO1 | 10 | DMF | 80  | 80  | 5 | CE1 | 3.4 | 25 | 1 | 0.35 |
| U15 | PL5  | 18   | NCO1 | 10 | DMF | 120 | 80  | 5 | CE1 | 3.4 | 25 | 1 | 0.35 |
| U16 | PL6  | 22.5 | NCO1 | 10 | DMF | 130 | 80  | 5 | CE1 | 3.4 | 25 | 1 | 0.35 |
| U17 | PL7  | 67.5 | NCO1 | 10 | DMF | 300 | 80  | 5 | CE1 | 3.4 | 25 | 1 | 0.35 |
| U18 | PL8  | 11.3 | NCO1 | 10 | DMF | 80  | 80  | 5 | CE1 | 3.4 | 25 | 1 | 0.35 |
| U19 | PL9  | 22.5 | NCO1 | 10 | DMF | 130 | 80  | 5 | CE1 | 3.4 | 25 | 1 | 0.35 |
| U20 | PL10 | 22.5 | NCO1 | 10 | DMF | 130 | 80  | 5 | CE1 | 3.4 | 25 | 1 | 0.35 |

TABLE 2

| Polyurethane-urea resin | The preparation condition of urethane prepolymer ||||||| The preparation condition of polyurethane-urea resin ||||| Butylamine |
| | A1 || A2 || The reaction solvent || The reaction condition || A3 || The reaction condition || |
| | Compound | The added amount (g) | Compound | The added amount (g) | Compound | The added amount (ml) | Temperature (° C.) | Time (hour) | Compound | The added amount (g) | Temperature (° C.) | Time (hour) | The added amount (g) |
|---|---|---|---|---|---|---|---|---|---|---|---|---|---|
| U21 | PL5 | 20   | NCO2 | 13.1 | DMF | 100 | 80  | 5  | CE1 | 3.8 | 25 | 1 | — |
| U22 | PL5 | 20   | NCO3 | 8.4  | DMF | 100 | 80  | 5  | CE1 | 3.8 | 25 | 1 | — |
| U23 | PL5 | 20   | NCO4 | 8.7  | DMF | 100 | 80  | 5  | CE1 | 3.8 | 25 | 1 | — |
| U24 | PL5 | 20   | NCO5 | 9.3  | DMF | 100 | 80  | 5  | CE1 | 3.8 | 25 | 1 | — |
| U25 | PL5 | 10.8 | NCO1 | 10   | DMF | 80  | 80  | 2  | CE1 | 5   | 25 | 1 | — |
| U26 | PL5 | 13.3 | NCO1 | 10   | DMF | 80  | 80  | 2  | CE1 | 4.4 | 25 | 1 | — |
| U27 | PL5 | 25.2 | NCO1 | 10   | DMF | 140 | 80  | 6  | CE1 | 2.1 | 25 | 1 | — |
| U28 | PL5 | 29.5 | NCO1 | 10   | DMF | 160 | 100 | 10 | CE1 | 1.2 | 25 | 1 | — |
| U29 | PL5 | 31.3 | NCO1 | 10   | DMF | 160 | 100 | 10 | CE1 | 0.8 | 25 | 1 | — |
| U30 | PL5 | 18   | NCO1 | 10   | DMF | 120 | 80  | 5  | CE2 | 1.2 | 25 | 1 | — |
| U31 | PL5 | 18   | NCO1 | 10   | DMF | 120 | 80  | 5  | CE3 | 2.4 | 25 | 1 | — |
| U32 | PL5 | 18   | NCO1 | 10   | DMF | 120 | 80  | 5  | CE4 | 1.2 | 80 | 3 | — |
| U33 | PL5 | 18   | NCO1 | 10   | DMF | 120 | 80  | 5  | CE5 | 2.4 | 80 | 3 | — |
| U34 | PL5 | 18   | NCO1 | 10   | DMF | 120 | 80  | 5  | CE6 | 1.5 | 80 | 3 | — |
| U35 | PL5 | 18   | NCO1 | 10   | DMF | 120 | 80  | 5  | CE7 | 1.6 | 80 | 3 | — |
| U36 | PL5 | 18   | NCO1 | 10   | DMF | 120 | 80  | 5  | CE8 | 1.5 | 80 | 3 | — |
| U37 | PL5 | 18   | NCO1 | 10   | DMF | 120 | 80  | 5  | CE9 | 1.5 | 80 | 3 | — |
| U38 | PL5 | 7.2  | NCO1 | 10   | DMF | 200 | 80  | 2  | CE1 | 5.7 | 25 | 1 | — |

TABLE 2-continued

| | The preparation condition of urethane prepolymer | | | | | | | The preparation condition of polyurethane-urea resin | | | | Butyl-amine |
|---|---|---|---|---|---|---|---|---|---|---|---|---|
| Poly- | A1 | | A2 | | The reaction solvent | | The reaction conditon | | A3 | | The reaction conditon | | |
| urethane-urea resin | Com-pound | The added amount (g) | Com-pound | The added amount (g) | Com-pound | The added amount (ml) | Tem-perature (°C.) | Time (hour) | Com-pound | The added amount (g) | Tem-perature (°C.) | Time (hour) | The added amount (g) |
| U39 | PL5 | 33.1 | NCO1 | 10 | DMF | 150 | 100 | 12 | CE1 | 0.2 | 25 | 1 | — |
| U40 | PL11 | 54 | NCO1 | 10 | DMF | 280 | 120 | 5 | CE1 | 5 | 25 | 1 | — |
| U41 | PL12 | 6.8 | NCO1 | 10 | DMF | 150 | 120 | 5 | CE1 | 0.8 | 25 | 1 | — |

TABLE 3

| | The preparation condition of urethane prepolymer | | | | | | | The preparation condition of polyurethane-urea resin | | | | Butyl-amine |
|---|---|---|---|---|---|---|---|---|---|---|---|---|
| | A1 | | A2 | | The reaction solvent | | The reaction conditon | | A3 | | The reaction conditon | | |
| Urethane resin | Com-pound | The added amount (g) | Com-pound | The added amount (g) | Com-pound | The added amount (ml) | Tem-perature (°C.) | Time (hour) | Com-pound | The added amount (g) | Tem-perature (°C.) | Time (hour) | The added amount (g) |
| U42 | PL5 | 18 | NCO1 | 10 | DMF | 120 | 80 | 5 | CE10 | 1.8 | 80 | 3 | — |
| U43 | PL5 | 10.8 | NCO1 | 10 | DMF | 95 | 80 | 5 | CE10 | 2.6 | 80 | 3 | — |
| U44 | PL5 | 25.2 | NCO1 | 10 | DMF | 140 | 80 | 5 | CE10 | 1.1 | 80 | 3 | — |
| U45 | PL5 | 18 | NCO1 | 10 | DMF | 120 | 80 | 5 | 1,6-hexane diol | 2.4 | 80 | 3 | — |
| U46 | PL5 | 10.8 | NCO1 | 10 | DMF | 100 | 80 | 5 | 1,6-hexane diol | 3.5 | 80 | 3 | — |

*Note that, U42 to U46 does not include urea bond.

TABLE 4

| | The preparation condition of urethane prepolymer | | | | | | | |
|---|---|---|---|---|---|---|---|---|
| Poly- | A1 | | A2 | | The reaction solvent | | The reaction conditon | |
| urethane-urea resin | Compound | The added amount (g) | Compound | The added amount (g) | Compound | The added amount (ml) | Temperature (°C.) | Time (hour) |
| Z1 | PL1 | 90 | NCO1 | 100 | DMF | 800 | 120 | 5 |
| Z2 | PL2 | 225 | NCO1 | 100 | DMF | 1300 | 120 | 5 |
| Z3 | PL3 | 450 | NCO1 | 100 | DMF | 2000 | 120 | 5 |
| Z4 | PL4 | 113 | NCO1 | 100 | DMF | 800 | 80 | 5 |
| Z5 | PL5 | 180 | NCO1 | 100 | DMF | 1200 | 80 | 5 |
| Z6 | PL6 | 225 | NCO1 | 100 | DMF | 1300 | 80 | 5 |
| Z7 | PL7 | 675 | NCO1 | 100 | DMF | 300 | 80 | 5 |
| Z8 | PL8 | 113 | NCO1 | 100 | DMF | 800 | 80 | 5 |
| Z9 | PL9 | 225 | NCO1 | 100 | DMF | 1300 | 80 | 5 |
| Z10 | PL5 | 200 | NCO2 | 131 | DMF | 1000 | 80 | 5 |
| Z11 | PL5 | 200 | NCO3 | 84 | DMF | 1000 | 80 | 5 |
| Z12 | PL5 | 200 | NCO4 | 87 | DMF | 1000 | 80 | 5 |
| Z13 | PL5 | 108 | NCO1 | 100 | DMF | 800 | 80 | 2 |
| Z14 | PL5 | 133 | NCO1 | 100 | DMF | 800 | 80 | 2 |
| Z15 | PL5 | 252 | NCO1 | 100 | DMF | 1400 | 80 | 6 |
| Z16 | PL5 | 295 | NCO1 | 100 | DMF | 1600 | 100 | 10 |
| Z17 | PL5 | 313 | NCO1 | 100 | DMF | 1600 | 100 | 10 |
| Z18 | PL5 | 180 | NCO1 | 100 | DMF | 1200 | 80 | 5 |
| Z19 | PL5 | 180 | NCO1 | 100 | DMF | 1200 | 80 | 5 |
| Z20 | PL5 | 180 | NCO1 | 100 | DMF | 1200 | 80 | 5 |
| Z21 | PL5 | 180 | NCO1 | 100 | DMF | 1200 | 80 | 5 |
| Z22 | PL5 | 180 | NCO1 | 100 | DMF | 1200 | 80 | 5 |
| Z23 | PL5 | 180 | NCO1 | 100 | DMF | 1200 | 80 | 5 |
| Z24 | PL5 | 180 | NCO1 | 100 | DMF | 1200 | 80 | 5 |
| Z25 | PL5 | 180 | NCO1 | 100 | DMF | 1200 | 80 | 5 |
| Z26 | PL5 | 180 | NCO1 | 100 | DMF | 1200 | 80 | 5 |

TABLE 4-continued

| | | | | | | | | |
|---|---|---|---|---|---|---|---|---|
| Z27 | PL5 | 180 | NCO1 | 100 | DMF | 1200 | 80 | 5 |
| Z28 | PL5 | 180 | NCO1 | 100 | DMF | 1200 | 80 | 5 |

| | The reaction condition of the amino group containing compound | | | | The reaction condition of the functionalization compound | | | |
|---|---|---|---|---|---|---|---|---|
| | A3 | | The reaction conditon | | A4 | | The reaction conditon | |
| Poly-urethane-urea resin | Compound | The added amount (g) | Temperature (°C.) | Time (hour) | Compound | The added amount (g) | Temperature (°C.) | Time (hour) |
| Z1 | CE1 | 34 | 25 | 1 | HA1 | 8 | 120 | 5 |
| Z2 | CE1 | 34 | 25 | 1 | HA1 | 8 | 120 | 5 |
| Z3 | CE1 | 34 | 25 | 1 | HA1 | 8 | 120 | 5 |
| Z4 | CE1 | 34 | 25 | 1 | HA1 | 8 | 120 | 5 |
| Z5 | CE1 | 34 | 25 | 1 | HA1 | 8 | 120 | 5 |
| Z6 | CE1 | 34 | 25 | 1 | HA1 | 8 | 120 | 5 |
| Z7 | CE1 | 34 | 25 | 1 | HA1 | 8 | 120 | 5 |
| Z8 | CE1 | 34 | 25 | 1 | HA1 | 8 | 120 | 5 |
| Z9 | CE1 | 34 | 25 | 1 | HA1 | 8 | 120 | 5 |
| Z10 | CE1 | 38 | 25 | 1 | HA1 | 8.6 | 120 | 5 |
| Z11 | CE1 | 38 | 25 | 1 | HA1 | 8.6 | 120 | 5 |
| Z12 | CE1 | 38 | 25 | 1 | HA1 | 8.6 | 120 | 5 |
| Z13 | CE1 | 50 | 25 | 1 | HA1 | 8 | 120 | 5 |
| Z14 | CE1 | 44 | 25 | 1 | HA1 | 8 | 120 | 5 |
| Z15 | CE1 | 21 | 25 | 1 | HA1 | 8 | 120 | 5 |
| Z16 | CE1 | 12 | 25 | 1 | HA1 | 8 | 120 | 5 |
| Z17 | CE1 | 8 | 25 | 1 | HA1 | 8 | 120 | 5 |
| Z18 | CE2 | 12 | 25 | 1 | HA1 | 8 | 120 | 5 |
| Z19 | CE3 | 24 | 25 | 1 | HA1 | 8 | 120 | 5 |
| Z20 | CE4 | 12 | 80 | 3 | HA1 | 8 | 120 | 5 |
| Z21 | CE5 | 24 | 80 | 3 | HA1 | 8 | 120 | 5 |
| Z22 | CE7 | 16 | 80 | 3 | HA1 | 8 | 120 | 5 |
| Z23 | CE1 | 34 | 25 | 1 | HA2 | 8 | 25 | 1 |
| Z24 | CE1 | 34 | 25 | 1 | HA3 | 180 | 120 | 10 |
| Z25 | CE1 | 37 | 25 | 1 | HA1 | 3.2 | 120 | 5 |
| Z26 | CE1 | 30.6 | 25 | 1 | HA1 | 15.4 | 120 | 5 |
| Z27 | CE1 | 34 | 25 | 1 | HA1 | 0.8 | 120 | 5 |
| Z28 | CE1 | 15 | 25 | 1 | HA1 | 48 | 120 | 5 |

TABLE 5

The preparation condition of urethane prepolymer

| | A1 | | A2 | | The reaction solvent | | The reaction conditon | |
|---|---|---|---|---|---|---|---|---|
| Urethane resin | Compound | The added amount (g) | Compound | The added amount (g) | Compound | The added amount (ml) | Temperature (°C.) | Time (hour) |
| Z37 | PL1 | 90 | NCO1 | 100 | DMF | 800 | 120 | 5 |
| Z38 | PL1 | 171 | NCO1 | 100 | DMF | 800 | 120 | 10 |

| | The reaction condition of the chain extender | | | | The reaction condition of the functionalization compound | | | |
|---|---|---|---|---|---|---|---|---|
| | A3 | | The reaction conditon | | A4 | | The reaction conditon | |
| Urethane resin | Compound | The added amount (g) | Temperature (°C.) | Time (hour) | Compound | The added amount (g) | Temperature (°C.) | Time (hour) |
| Z37 | PL1* | 80 | 25 | 1 | HA1 | 8 | 120 | 5 |
| Z38 | — | — | — | — | HA1 | 8 | 120 | 5 |

*PL1: Polypropyreneglycol of the chain extender (The average molecular weight 400)

TABLE 6

| Poly-urethane-urea resin | The preparation condition of urethane prepolymer ||||| The reaction solvent || The reaction condition ||
|---|---|---|---|---|---|---|---|---|
| | A1 || A2 || | | | |
| | Compound | The added amount (g) | Compound | The added amount (g) | Compound | The added amount (ml) | Temperature (° C.) | Time (hour) |
| Z29 | PL5 | 180 | NCO1 | 100 | DMF | 1200 | 100 | 5 |
| Z30 | PL5 | 180 | NCO8 | 10.5 | DMF | 1200 | 80 | 5 |
| | | | NCO1 | 100 | | | | |
| Z31 | PL10 | 225 | NCO1 | 100 | DMF | 1300 | 80 | 5 |
| Z32 | PL5 | 200 | NCO5 | 103 | DMF | 1000 | 80 | 5 |
| Z33 | PL5 | 108 | NCO1 | 100 | DMF | 800 | 80 | 2 |
| Z34 | PL5 | 108 | NCO1 | 100 | DMF | 800 | 80 | 2 |
| Z35 | PL5 | 180 | NCO1 | 100 | DMF | 1200 | 80 | 5 |
| Z36 | PL5 | 180 | NCO1 | 100 | DMF | 1200 | 80 | 5 |
| Z39 | PL5 | 252 | NCO1 | 100 | THF | 1200 | 90 | 1 |
| Z40 | PL5 | 216 | NCO1 | 100 | THF | 1200 | 90 | 1 |

| Poly-urethane-urea resin | The reaction condition of the amino group containing compound |||| The reaction condition of the functionalization compound ||||
|---|---|---|---|---|---|---|---|---|
| | A3 || The reaction condition || A4 || The reaction condition ||
| | Compound | The added amount (g) | Temperature (° C.) | Time (hour) | Compound | The added amount (g) | Temperature (° C.) | Time (hour) |
| Z29 | CE1 | 30.4 | 25 | 1 | HA4 | 9 | 100 | 5 |
| Z30 | CE1 | 30.7 | 25 | 1 | The functionalization compound was introduced to A2 component ||||
| Z31 | CE1 | 34 | 25 | 1 | HA1 | 8 | 120 | 5 |
| Z32 | CE1 | 38 | 25 | 1 | HA1 | 8.6 | 120 | 5 |
| Z33 | CE8 | 25.3 | 25 | 1 | HA2 | 8 | 120 | 5 |
| Z34 | CE9 | 34.1 | 25 | 1 | HA2 | 8 | 25 | 1 |
| Z35 | CE1 | 34 | 25 | 1 | HA6 | 10 | 120 | 5 |
| Z36 | CE1 | 34 | 25 | 1 | HA7 | 13.4 | 120 | 5 |
| Z39 | CE1 | 18.9 | 25 | 1 | HA2 | 8 | 25 | 1 |
| Z40 | CE1 | 26.4 | 25 | 1 | HA2 | 8 | 25 | 1 |

TABLE 7

| Poly-urethane-urea resin | The preparation condition of urethane prepolymer |||||| The dilution solvent ||
|---|---|---|---|---|---|---|---|---|
| | A1 || A2 || The reaction condition || | |
| | Compound | The added amount (g) | Compound | The added amount (g) | Temperature (° C.) | Time (hour) | Compound | The added amount (ml) |
| W1 | PL1 | 90 | NCO1 | 100 | 70 | 6 | DMF | 800 |
| W2 | PL2 | 225 | NCO1 | 100 | 120 | 5 | DMF | 1300 |
| W3 | PL4 | 113 | NCO1 | 100 | 80 | 5 | THF | 800 |
| W4 | PL5 | 180 | NCO1 | 100 | 80 | 5 | THF | 1200 |
| W5 | PL6 | 225 | NCO1 | 100 | 80 | 5 | THF | 1300 |
| W6 | PL7 | 675 | NCO1 | 100 | 80 | 5 | THF | 1000 |
| W7 | PL8 | 113 | NCO1 | 100 | 80 | 5 | THF | 800 |
| W8 | PL9 | 225 | NCO1 | 100 | 80 | 5 | DMF | 1300 |
| W9 | PL10 | 225 | NCO1 | 100 | 80 | 5 | DMF | 1300 |
| W10 | PL5 | 200 | NCO2 | 131 | 80 | 5 | THF | 1000 |
| W11 | PL5 | 200 | NCO3 | 84 | 80 | 5 | THF | 1000 |
| W12 | PL5 | 200 | NCO4 | 87 | 80 | 5 | THF | 1000 |
| W13 | PL5 | 200 | NCO5 | 103 | 80 | 5 | THF | 1000 |
| W14 | PL5 | 108 | NCO1 | 100 | 80 | 2 | THF | 800 |
| W15 | PL5 | 133 | NCO1 | 100 | 80 | 2 | THF | 800 |
| W16 | PL5 | 252 | NCO1 | 100 | 80 | 6 | THF | 1400 |
| W17 | PL5 | 295 | NCO1 | 100 | 100 | 10 | THF | 1600 |
| W18 | PL5 | 313 | NCO1 | 100 | 100 | 10 | THF | 1600 |
| W19 | PL5 | 180 | NCO1 | 100 | 80 | 5 | THF | 1200 |
| W20 | PL5 | 180 | NCO1 | 100 | 80 | 5 | THF | 1200 |
| W21 | PL5 | 180 | NCO1 | 100 | 80 | 5 | THF | 1200 |
| W22 | PL5 | 180 | NCO1 | 100 | 80 | 5 | THF | 1200 |
| W23 | PL5 | 180 | NCO1 | 100 | 80 | 5 | THF | 1200 |
| W24 | PL5 | 108 | NCO1 | 100 | 80 | 2 | THF | 800 |
| W25 | PL5 | 108 | NCO1 | 100 | 80 | 2 | THF | 800 |
| W26 | PL5 | 180 | NCO1 | 100 | 80 | 2 | THF | 1200 |

TABLE 7-continued

| | | | | | | | | |
|---|---|---|---|---|---|---|---|---|
| W27 | PL5 | 180 | NCO1 | 100 | 80 | 2 | THF | 1200 |
| W28 | PL5 | 180 | NCO1 | 100 | 80 | 2 | THF | 1200 |
| W29 | PL5 | 252 | NCO1 | 100 | 90 | 2 | THF | 1200 |
| W30 | PL5 | 216 | NCO1 | 100 | 90 | 2 | THF | 1200 |
| W31 | PL5 | 288 | NCO1 | 100 | 90 | 2 | THF | 1200 |

| | The reaction condition of the amino group containing compound | | | | The reaction condition of the functionalization compound | | | |
|---|---|---|---|---|---|---|---|---|
| Poly- | A3 | | The reaction conditon | | A4 | | The reaction conditon | |
| urethane-urea resin | Compound | The added amount (g) | Temperature (°C.) | Time (hour) | Compound | The added amount (g) | Temperature (°C.) | Time (hour) |
| W1 | CE1 | 34 | 25 | 1 | HA1 | 8 | 110 | 5 |
| W2 | CE1 | 34 | 25 | 1 | HA1 | 8 | 120 | 5 |
| W3 | CE1 | 34 | 25 | 1 | HA2 | 8 | 30 | 1 |
| W4 | CE1 | 34 | 25 | 1 | HA2 | 8 | 25 | 1 |
| W5 | CE1 | 34 | 25 | 1 | HA2 | 8 | 25 | 1 |
| W6 | CE1 | 34 | 25 | 1 | HA2 | 8 | 30 | 1 |
| W7 | CE1 | 34 | 25 | 1 | HA2 | 8 | 30 | 0.5 |
| W8 | CE1 | 34 | 25 | 1 | HA1 | 8 | 120 | 5 |
| W9 | CE1 | 34 | 25 | 1 | HA1 | 8 | 120 | 5 |
| W10 | CE1 | 38 | 25 | 1 | HA2 | 8 | 25 | 1 |
| W11 | CE1 | 38 | 25 | 1 | HA2 | 8 | 25 | 1 |
| W12 | CE1 | 38 | 25 | 1 | HA2 | 8 | 25 | 1 |
| W13 | CE1 | 38 | 25 | 1 | HA2 | 8 | 25 | 1 |
| W14 | CE1 | 50 | 25 | 1 | HA2 | 8 | 25 | 1 |
| W15 | CE1 | 44 | 25 | 1 | HA2 | 8 | 25 | 1 |
| W16 | CE1 | 21 | 25 | 1 | HA2 | 8 | 25 | 1 |
| W17 | CE1 | 12 | 25 | 1 | HA2 | 8 | 25 | 1 |
| W18 | CE1 | 8 | 25 | 1 | HA2 | 8 | 25 | 1 |
| W19 | CE2 | 12 | 25 | 1 | HA2 | 8 | 25 | 1 |
| W20 | CE3 | 24 | 25 | 1 | HA2 | 8 | 25 | 1 |
| W21 | CE4 | 12 | 80 | 3 | HA2 | 8 | 25 | 1 |
| W22 | CE5 | 24 | 80 | 3 | HA2 | 8 | 25 | 1 |
| W23 | CE7 | 16 | 80 | 3 | HA2 | 8 | 25 | 1 |
| W24 | CE8 | 25.3 | 25 | 1 | HA2 | 8 | 25 | 1 |
| W25 | CE9 | 34.1 | 25 | 1 | HA2 | 8 | 25 | 1 |
| W26 | CE1 | 37 | 25 | 1 | HA2 | 3.2 | 30 | 1 |
| W27 | CE1 | 30.6 | 25 | 1 | HA2 | 16 | 25 | 1 |
| W28 | CE1 | 34 | 25 | 1 | HA8 | 3.6 | 30 | 1 |
| W29 | CE1 | 18.9 | 25 | 1 | HA2 | 8 | 25 | 1 |
| W30 | CE1 | 26.4 | 25 | 1 | HA2 | 8 | 25 | 1 |
| W31 | CE1 | 11.4 | 25 | 1 | HA2 | 8 | 25 | 1 |

The above mentioned results of the mol blending ratio, the number average molecular weight, the heat resistance of A1, A2, A3, A4, and A5 components of the polyurethane-urea resin U1 to U46, Z1 to Z40, and W1 to W31 are listed in Table 8 to 10.

TABLE 8

| | The mol blending ratio of A1, A2, A3 (n1/n2/n3) | The number average molecular weight | | | The heat resistance (°C.) |
|---|---|---|---|---|---|
| Uretae-urea resin | | in terms of polystyrene | in terms of polyoxyethylene | The theoretical value | |
| U1 | 0.5/1/0.45 | 150000 | 10000 | 10000 | 140 |
| U2 | 0.5/1/0.45 | 200000 | 16000 | 16000 | 140 |
| U3 | 0.5/1/0.45 | 300000 | 25000 | 26000 | 130 |
| U4 | 0.5/1/0.45 | 280000 | 13000 | 11000 | 145 |
| U5 | 0.5/1/0.45 | 300000 | 15000 | 14000 | 140 |
| U6 | 0.5/1/0.45 | 200000 | 16000 | 16000 | 140 |
| U7 | 0.5/1/0.45 | 600000 | 40000 | 36000 | 125 |
| U8 | 0.5/1/0.45 | 300000 | 12000 | 11000 | 140 |
| U9 | 0.5/1/0.45 | 430000 | 17000 | 16000 | 130 |
| U10 | 0.5/1/0.45 | 220000 | 15000 | 16000 | 150 |
| U11 | 0.5/1/0.45 | 150000 | 10000 | 10000 | 130 |
| U12 | 0.5/1/0.45 | 200000 | 16000 | 16000 | 135 |
| U13 | 0.5/1/0.45 | 300000 | 25000 | 26000 | 120 |
| U14 | 0.5/1/0.45 | 280000 | 13000 | 11000 | 140 |
| U15 | 0.5/1/0.45 | 300000 | 15000 | 14000 | 130 |
| U16 | 0.5/1/0.45 | 200000 | 16000 | 16000 | 135 |

TABLE 8-continued

| Uretae-urea resin | The mol blending ratio of A1, A2, A3 (n1/n2/n3) | The number average molecular weight | | | The heat resistance (° C.) |
|---|---|---|---|---|---|
| | | in terms of polystyrene | in terms of polyoxyethylene | The theoretical value | |
| U17 | 0.5/1/0.45 | 600000 | 40000 | 36000 | 115 |
| U18 | 0.5/1/0.45 | 300000 | 12000 | 11000 | 130 |
| U19 | 0.5/1/0.45 | 430000 | 17000 | 16000 | 125 |
| U20 | 0.5/1/0.45 | 220000 | 15000 | 16000 | 140 |
| U21 | 0.5/1/0.45 | 370000 | 16000 | 15000 | 130 |
| U22 | 0.5/1/0.45 | 300000 | 14000 | 13000 | 110 |
| U23 | 0.5/1/0.45 | 300000 | 15000 | 13000 | 140 |
| U24 | 0.5/1/0.45 | 320000 | 17000 | 14000 | 150 |
| U25 | 0.3/1/0.65 | 200000 | 12000 | 11000 | 150 |
| U26 | 0.37/1/0.58 | 230000 | 12000 | 12000 | 145 |
| U27 | 0.7/1/0.28 | 420000 | 44000 | 41000 | 105 |
| U28 | 0.82/1/0.16 | 460000 | 48000 | 45000 | 90 |
| U29 | 0.87/1/0.11 | 460000 | 50000 | 47000 | 80 |
| U30 | 0.5/1/0.45 | 260000 | 13000 | 13000 | 140 |
| U31 | 0.5/1/0.45 | 280000 | 15000 | 13000 | 130 |
| U32 | 0.5/1/0.45 | 250000 | 14000 | 13000 | 135 |
| U33 | 0.5/1/0.45 | 260000 | 14000 | 13000 | 120 |
| U34 | 0.5/1/0.45 | 240000 | 15000 | 13000 | 145 |
| U35 | 0.5/1/0.45 | 300000 | 15000 | 13000 | 145 |
| U36 | 0.5/1/0.45 | 240000 | 15000 | 13000 | 120 |
| U37 | 0.5/1/0.45 | 240000 | 15000 | 13000 | 100 |
| U38 | 0.2/1/0.75 | 200000 | 13000 | 10000 | 165 |
| U39 | 0.92/1/0.03 | 520000 | 22000 | 19000 | 50 |
| U40 | 0.3/1/0.65 | 420000 | 33000 | 31000 | 105 |
| U41 | 0.87/1/0.11 | 340000 | 18000 | 20000 | 140 |
| U42 | 0.5/1/0.45 | 310000 | 15000 | 13000 | 75 |
| U43 | 0.3/1/0.65 | 200000 | 12000 | 10000 | 90 |
| U44 | 0.7/1/0.28 | 520000 | 43000 | 40000 | 55 |
| U45 | 0.5/1/0.45 | 280000 | 15000 | 14000 | 65 |
| U46 | 0.3/1/0.65 | 190000 | 11000 | 11000 | 85 |

*Note that, U42 to U46 does not include the urea bond

TABLE 9

| | The polyurethane-urea resin | The mol blending ratio of A1, A2, A3 (n1/n2/n3) | The number average molecular weight | | | The heat resistance (° C.) |
|---|---|---|---|---|---|---|
| | | | in terms of polystyrene | in terms of polyoxyethylene | The theoretical value | |
| The resins for the examples | Z1 | 0.5/1/0.45/0.05 | 150,000 | 10,000 | 10,000 | 120 |
| | Z2 | 0.5/1/0.45/0.05 | 220,000 | 16,000 | 16,000 | 130 |
| | Z3 | 0.5/1/0.45/0.05 | 400,000 | 25,000 | 26,000 | 125 |
| | Z4 | 0.5/1/0.45/0.05 | 180,000 | 13,000 | 11,000 | 140 |
| | Z5 | 0.5/1/0.45/0.05 | 250,000 | 15,000 | 14,000 | 130 |
| | Z6 | 0.5/1/0.45/0.05 | 300,000 | 16,000 | 16,000 | 130 |
| | Z7 | 0.5/1/0.45/0.05 | 600,000 | 40,000 | 36,000 | 120 |
| | Z8 | 0.5/1/0.45/0.05 | 300,000 | 12,000 | 11,000 | 135 |
| | Z9 | 0.5/1/0.45/0.05 | 430,000 | 17,000 | 16,000 | 120 |
| | Z10 | 0.5/1/0.45/0.05 | 370,000 | 16,000 | 15,000 | 125 |
| | Z11 | 0.5/1/0.45/0.05 | 300,000 | 14,000 | 13,000 | 105 |
| | Z12 | 0.5/1/0.45/0.05 | 300,000 | 15,000 | 13,000 | 125 |
| | Z13 | 0.3/1/0.65/0.05 | 200,000 | 12,000 | 11,000 | 145 |
| | Z14 | 0.37/1/0.58/0.05 | 230,000 | 12,000 | 12,000 | 140 |
| | Z15 | 0.7/1/0.28/0.02 | 420,000 | 44,000 | 41,000 | 100 |
| | Z16 | 0.82/1/0.16/0.02 | 460,000 | 48,000 | 45,000 | 85 |
| | Z17 | 0.87/1/0.11/0.02 | 460,000 | 50,000 | 47,000 | 80 |
| | Z18 | 0.5/1/0.45/0.05 | 260,000 | 15,000 | 13,000 | 130 |
| | Z19 | 0.5/1/0.45/0.05 | 280,000 | 15,000 | 13,000 | 120 |
| | Z20 | 0.5/1/0.45/0.05 | 250,000 | 14,000 | 13,000 | 130 |
| | Z21 | 0.5/1/0.45/0.05 | 260,000 | 15,000 | 13,000 | 115 |
| | Z22 | 0.5/1/0.45/0.05 | 300,000 | 16,000 | 13,000 | 135 |
| | Z23 | 0.5/1/0.45/0.05 | 300,000 | 16,000 | 14,000 | 125 |
| | Z24 | 0.5/1/0.45/0.05 | 300,000 | 25,000 | 20,000 | 115 |
| | Z25 | 0.5/1/0.48/0.02 | 550,000 | 38,000 | 35,000 | 130 |
| | Z26 | 0.5/1/0.4/0.1 | 120,000 | 10,000 | 7,000 | 115 |
| | Z27 | 0.5/1/0.45/0.005 | 250,000 | 16,000 | 14,000 | 130 |
| | Z28 | 0.5/1/0.2/0.3 | 90,000 | 5,000 | 2,000 | 80 |
| | Z29 | 0.5/1/0.4/0.1 | 270,000 | 9,000 | 7,000 | 130 |
| | Z30 | 0.5/1/0.4/0.1 | 320,000 | 9,000 | 7,000 | 150 |
| | Z31 | 0.5/1/0.45/0.05 | 230,000 | 18,000 | 16,000 | 135 |

TABLE 9-continued

|  | The polyurethane-urea resin | The mol blending ratio of A1, A2, A3 (n1/n2/n3) | The number average molecular weight in terms of polystyrene | The number average molecular weight in terms of polyoxyethylene | The theoretical value | The heat resistance (° C.) |
|---|---|---|---|---|---|---|
|  | Z32 | 0.5/1/0.45/0.05 | 240,000 | 24,000 | 14,000 | 140 |
|  | Z33 | 0.3/1/0.65/0.05 | 200,000 | 12,000 | 10,000 | 120 |
|  | Z34 | 0.3/1/0.65/0.05 | 200,000 | 12,000 | 11,000 | 115 |
|  | Z35 | 0.5/1/0.45/0.05 | 250,000 | 17,000 | 14,000 | 120 |
|  | Z36 | 0.5/1/0.45/0.05 | 250,000 | 16,000 | 14,000 | 120 |
|  | Z39 | 0.7/1/0.25/0.05 | 280,000 | 22,000 | 18,000 | 100 |
|  | Z40 | 0.6/1/0.35/0.05 | 260,000 | 20,000 | 16,000 | 120 |
| The resins for the comparative examples | Z37 | 0.5/1/0.45/0.05 | 160,000 | 12,000 | 11,000 | 75 |
|  | Z38 | 0.95/1/0/0.05 | 280,000 | 14,000 | 13,000 | <40 |

TABLE 10

| The polyurethane-urea resin | The mol blending ratio of A1, A2, A3 (n1/n2/n3) | The number average molecular weight in terms of polyoxyethylene | The theoretical value | The heat resistance (° C.) |
|---|---|---|---|---|
| W1 | 0.5/1/0.45/0.05 | 10,000 | 10,000 | 120 |
| W2 | 0.5/1/0.45/0.05 | 16,000 | 16,000 | 130 |
| W3 | 0.5/1/0.45/0.05 | 13,000 | 11,000 | 140 |
| W4 | 0.5/1/0.45/0.05 | 15,000 | 14,000 | 130 |
| W5 | 0.5/1/0.45/0.05 | 16,000 | 16,000 | 130 |
| W6 | 0.5/1/0.45/0.05 | 40,000 | 36,000 | 120 |
| W7 | 0.5/1/0.45/0.05 | 12,000 | 11,000 | 135 |
| W8 | 0.5/1/0.45/0.05 | 17,000 | 16,000 | 120 |
| W9 | 0.5/1/0.45/0.05 | 18,000 | 16,000 | 135 |
| W10 | 0.5/1/0.45/0.05 | 16,000 | 15,000 | 125 |
| W11 | 0.5/1/0.45/0.05 | 14,000 | 13,000 | 105 |
| W12 | 0.5/1/0.45/0.05 | 15,000 | 13,000 | 125 |
| W13 | 0.5/1/0.45/0.05 | 24,000 | 14,000 | 140 |
| W14 | 0.3/1/0.65/0.05 | 12,000 | 11,000 | 145 |
| W15 | 0.37/1/0.58/0.05 | 12,000 | 12,000 | 140 |
| W16 | 0.7/1/0.28/0.02 | 44,000 | 41,000 | 100 |
| W17 | 0.82/1/0.16/0.02 | 48,000 | 45,000 | 85 |
| W18 | 0.87/1/0.11/0.02 | 50,000 | 47,000 | 80 |
| W19 | 0.5/1/0.45/0.05 | 15,000 | 13,000 | 130 |
| W20 | 0.5/1/0.45/0.05 | 15,000 | 13,000 | 120 |
| W21 | 0.5/1/0.45/0.05 | 14,000 | 13,000 | 130 |
| W22 | 0.5/1/0.45/0.05 | 15,000 | 13,000 | 115 |
| W23 | 0.5/1/0.45/0.05 | 16,000 | 13,000 | 135 |
| W24 | 0.3/1/0.65/0.05 | 12,000 | 10,000 | 120 |
| W25 | 0.3/1/0.65/0.05 | 12,000 | 11,000 | 115 |
| W26 | 0.5/1/0.48/0.02 | 38,000 | 35,000 | 130 |
| W27 | 0.5/1/0.4/0.1 | 10,000 | 7,000 | 115 |
| W28 | 0.5/1/0.45/0.05 | 17,000 | 14,000 | 135 |
| W29 | 0.7/1/0.25/0.05 | 22,000 | 18,000 | 100 |
| W30 | 0.6/1/0.35/0.05 | 20,000 | 16,000 | 120 |
| W31 | 0.8/1/0.15/0.05 | 25,000 | 20,000 | 80 |

Example 1

The Preparation of the Photochromic Composition

To 5 g of the polyurethane-urea resin (U1) and 0.25 g of the photochromic compound (PC1), 20 g of isopropyl alcohol as the organic solvent and 0.25 g of bis(1,2,2,6,6,-pentamethyl-4-piperidyl) sebacate as the photooxidation preventing agent were added; then stirred at 80° C., and dissolved by ultrasonic wave to obtain the photochromic composition.

The Production of the Photochromic Laminated Article

The obtained photochromic composition was coated to the PET film (Purex film with silicone coating film made by Teijin DuPont Films Japan Limited.) and dried for 1 hour at 80° C., then the obtained photochromic sheet having the thickness of 30 μm was released from PET film. Then, it was placed between two polycarbonate sheets having the thickness of 400 μm, and further heated for 30 minutes at 100° C. to obtain the laminated article having the photochromic characteristic of subject.

When the obtained photochromic laminated article was evaluated; and the optical color density was 1.0 and the color fading speed was 90 seconds and the durability was 90% as the photochromic characteristic. Also, the adhesive strength of the photochromic laminated article was 30N/25 mm. Note that, these evaluations were carried out as following.

The Photochromic Characteristic

By using the obtained multilayer as the sample, the light was irradiated to said sample for 120 seconds using Xenon Lamp L-2480(300 W) SHL-100 made by Hamamatsu Photonics K.K. via Aeromass filter (made by Corning Incorporated) at 23° C. and the beam intensity of 365 nm=2.4 mW/cm$^2$, 245 nm=24 μW/cm$^2$ at the multilayer surface for 120 seconds for the color development, and measured the photochromic characteristic of the laminated article.

1) The maximum absorption wave length (λmax): it is the maximum absorption wave length obtained from the spectrophotometer (Multichannel Photo Detector-MCPD1000) made by OTSUKA ELECTRONICS CO., LTD. Said maximum absorption wave length relates to the color tone during the color development.

2) The color optical density {ϵ(120)−ϵ(0)}: the difference between the absorbance ϵ(120) after irradiating for 120 seconds at said maximum absorption wave length and the absorbance ϵ(0) at no irradiation at the maximum absorption wave length. As this value is higher, it indicates that the photochromic property is further excellent.

3) The color fading speed {t½(sec.)}: the time required to reduce the absorbance at said maximum absorption wave length of the sample to be ½ when the light irradiation is stopped after 120 seconds irradiation. As this time is shorter, it indicates that the photochromic property is further excellent.

4) The durability (%)={(A48/A0)×100}: the accelerated deterioration test was carried out in order to evaluate the durability of the color development due to the light irradiation. That is, the obtained laminated article was carried out with the accelerated deterioration for 48 hours by Xenon Weather Meter X25 made by Suga Test Instrument Co., Ltd. Then, the evaluation of said color optical density was carried out before and after the test, and measured the color optical density before the test (A0) and the color optical density after the test (A48). The value obtained by {(A48)/A0}×100 was determined as the remaining ratio (%), and defined as the standard of the durability of the color development. As the remaining ratio is higher, it indicates that the durability is higher.

The Adhesive Strength

The obtained laminated article was made into the sample peace having the adhesive portion of 25×100 mm, and installed to the test machine (Autograph AG5000D, made by Shimadzu Corporation). The tensile test was carried out at the cross head speed of 100 mm/min, and measured the adhesive strength.

Examples 2 to 83

The preparation of the photochromic composition and the production of the photochromic laminated article were carried out as same as the method of Example 1 except for using the polyurethane-urea resin, the photochromic compound and the organic solvent shown in Table 11, 12, 13 and 14. The evaluation results of various photochromic laminated article obtained are shown in Table 11, 12, 13 and 14.

Example 84

The Preparation of the Photochromic Composition 20 g of isopropyl alcohol as the organic solvent was added to 5 g of the polyurethane-urea resin (W1), and stirred at 80° C. while dissolving by the ultrasonic waves. After the polyurethane-urea resin was confirmed being dissolved, it was cooled to the room temperature, 0.15 g of isophorone diisocyanate (D component) and 0.25 g of the photochromic compound (PC1) were added and mix stirred to obtain the photochromic composition.

The Production of the Photochromic Laminated Article

The obtained photochromic composition was coated to the PET film (Purex film with silicone coating film made by Teijin DuPont Films Japan Limited.), in the experiment room under the presence of the moist (23° C., relative humidity of 50%), it was dried for 30 minutes at 50° C., and the PET film was removed; thereby obtained the photochromic adhesive sheet having the thickness of 40 μm. Next, the obtained photochromic adhesive sheet was placed between two polycarbonate sheets having a thickness of 400 μm, and in the experiment room under the presence of the moist (23° C., relative humidity of 50%), it was left for 24 hours at 40° C., and further carried out the heat treatment for 60 minutes at 110° C., thereby the laminated article having the photochromic characteristic of the object was obtained. Note that, when the infrared absorption of the photochromic composition and the photochromic adhesive sheet taken out from the laminated article were verified, the peak of the isocyanate group at the photochromic adhesive sheet decreased, and it was verified that the isophorone diisocyanate was reacting. Also, the peak of the isocyanate group in the photochromic adhesive sheet was confirmed to decline along with the time.

When the obtained photochromic multilayer was evaluated, the color optical density was 1.0 and the color fading speed was 90 seconds, and the durability was 94% as the photochromic characteristic. Also, the heat resistance of the photochromic laminated article was 130° C., the initial adhesive strength was 80N/25 mm, and after the boiling test it was 70N/25 mm. Note that, these evaluation was carried out as same as the example 1, and in regards with the adhesive strength, the measurement was carried out for the initial and those after one hour of the boiling test using the distilled water.

Examples 85 to 127

The photochromic composition was prepared by the same method as the example 84, except for using the polyurethane-urea resin, the isocyanate compound and the organic solvent shown in Table 15 and Table 16. Note that, obviously, as same as example 84, the photochromic compound (PC1) was blended so that it is 5 parts by weight (the actual used amount 0.25 g) with respect to polyurethane-urea resin (A component). Also, by using the obtained photochromic composition, the photochromic laminated article was produced as same method as example 84.

The evaluation results of the obtained various photochromic laminated article are shown in Table 15 and Table 16. In these examples, when the infrared absorption spectrum of the photochromic adhesive sheet was verified, the peak of the isocyanate group decreased in all sheets, thus it was confirmed that various isocyanate group used were reacting.

TABLE 11

| | A component | | B component | | C component | | Other | | The film thickness (μm) | λmax | The photochromic charcteristics | | | | The release strength (N/25 mm) |
|---|---|---|---|---|---|---|---|---|---|---|---|---|---|---|---|
| | Type | The added amount (g) | Type | The added amount (g) | Type | The added amount (g) | Type | The added amount (g) | | | The color optical density | The color fading speed | The durability | | |
| Example 1 | U1 | 5 | PC1 | 0.25 | C1 | 20 | TINUVIN765 | 0.25 | 30 | 585 | 1.0 | 90 | 90 | | 30 |
| Example 2 | U2 | 5 | PC1 | 0.25 | C1 | 20 | TINUVIN765 | 0.25 | 30 | 585 | 1.1 | 50 | 90 | | 30 |
| Example 3 | U3 | 5 | PC1 | 0.25 | C1 | 20 | TINUVIN765 | 0.25 | 30 | 585 | 1.1 | 40 | 85 | | 30 |
| Example 4 | U4 | 5 | PC1 | 0.25 | C2 | 20 | TINUVIN765 | 0.25 | 30 | 585 | 1.0 | 80 | 95 | | 60 |
| Example 5 | U5 | 5 | PC1 | 0.25 | C3 | 20 | TINUVIN765 | 0.25 | 30 | 585 | 1.1 | 55 | 96 | | 60 |
| Example 6 | U6 | 5 | PC1 | 0.25 | C4 | 20 | TINUVIN765 | 0.25 | 30 | 585 | 1.1 | 45 | 92 | | 60 |
| Example 7 | U7 | 5 | PC1 | 0.25 | C5 | 20 | TINUVIN765 | 0.25 | 30 | 585 | 1.2 | 40 | 82 | | 50 |
| Example 8 | U8 | 5 | PC1 | 0.25 | C6 | 20 | TINUVIN765 | 0.25 | 30 | 585 | 1.0 | 80 | 95 | | 50 |
| Example 9 | U9 | 5 | PC1 | 0.25 | C7 | 20 | TINUVIN765 | 0.25 | 30 | 585 | 1.1 | 50 | 88 | | 38 |
| Example 10 | U10 | 5 | PC1 | 0.25 | C2 | 20 | TINUVIN765 | 0.25 | 30 | 585 | 1.0 | 55 | 93 | | 50 |
| Example 11 | U11 | 5 | PC1 | 0.25 | C1 | 20 | TINUVIN765 | 0.25 | 30 | 585 | 1.0 | 90 | 93 | | 28 |
| Example 12 | U12 | 5 | PC1 | 0.25 | C1 | 20 | TINUVIN765 | 0.25 | 30 | 585 | 1.1 | 50 | 94 | | 30 |
| Example 13 | U13 | 5 | PC1 | 0.25 | C1 | 20 | TINUVIN765 | 0.25 | 30 | 585 | 1.1 | 40 | 88 | | 30 |
| Example 14 | U14 | 5 | PC1 | 0.25 | C6 | 20 | TINUVIN765 | 0.25 | 30 | 585 | 1.0 | 80 | 98 | | 60 |
| Example 15 | U15 | 5 | PC1 | 0.25 | C6 | 20 | TINUVIN765 | 0.25 | 30 | 585 | 1.1 | 55 | 98 | | 60 |
| Example 16 | U16 | 5 | PC1 | 0.25 | C6 | 20 | TINUVIN765 | 0.25 | 30 | 585 | 1.1 | 45 | 94 | | 60 |
| Example 17 | U17 | 5 | PC1 | 0.25 | C6 | 20 | TINUVIN765 | 0.25 | 30 | 585 | 1.2 | 40 | 85 | | 50 |
| Example 18 | U18 | 5 | PC1 | 0.25 | C6 | 20 | TINUVIN765 | 0.25 | 30 | 585 | 1.0 | 80 | 95 | | 50 |
| Example 19 | U19 | 5 | PC1 | 0.25 | C6 | 20 | TINUVIN765 | 0.25 | 30 | 585 | 1.1 | 50 | 92 | | 40 |
| Example 20 | U20 | 5 | PC1 | 0.25 | C2 | 20 | TINUVIN765 | 0.25 | 30 | 585 | 1.0 | 55 | 94 | | 50 |

TABLE 12

| | A component | | B component | | C component | | Other | | The film thickness (μm) | λmax | The photochromic charcteristics | | | The release strength (N/25 mm) |
|---|---|---|---|---|---|---|---|---|---|---|---|---|---|---|
| | Type | The added amount (g) | Type | The added amount (g) | Type | The added amount (g) | Type | The added amount (g) | | | The color optical density | The color fading speed | The durability | |
| Example 21 | U21 | 5 | PC1 | 0.25 | C6 | 20 | TINUVIN765 | 0.25 | 30 | 585 | 1.0 | 50 | 98 | 60 |
| Example 22 | U22 | 5 | PC1 | 0.25 | C6 | 20 | TINUVIN765 | 0.25 | 30 | 585 | 1.0 | 40 | 92 | 50 |
| Example 23 | U23 | 5 | PC1 | 0.25 | C6 | 20 | TINUVIN765 | 0.25 | 30 | 585 | 0.9 | 60 | 85 | 50 |
| Example 24 | U24 | 5 | PC1 | 0.25 | C6 | 20 | TINUVIN765 | 0.25 | 30 | 585 | 1.0 | 40 | 97 | 55 |
| Example 25 | U25 | 5 | PC1 | 0.25 | C2 | 20 | TINUVIN765 | 0.25 | 30 | 585 | 0.9 | 75 | 98 | 45 |
| Example 26 | U26 | 5 | PC1 | 0.25 | C2 | 20 | TINUVIN765 | 0.25 | 30 | 585 | 0.9 | 65 | 98 | 50 |
| Example 27 | U27 | 5 | PC1 | 0.25 | C2 | 20 | TINUVIN765 | 0.25 | 30 | 585 | 1.2 | 40 | 95 | 50 |
| Example 28 | U28 | 5 | PC1 | 0.25 | C2 | 20 | TINUVIN765 | 0.25 | 30 | 585 | 1.2 | 35 | 90 | 45 |
| Example 29 | U29 | 5 | PC1 | 0.25 | C2 | 20 | TINUVIN765 | 0.25 | 30 | 585 | 1.2 | 35 | 85 | 40 |
| Example 30 | U30 | 5 | PC1 | 0.25 | C2 | 20 | TINUVIN765 | 0.25 | 30 | 585 | 1.1 | 60 | 98 | 55 |
| Example 31 | U31 | 5 | PC1 | 0.25 | C2 | 20 | TINUVIN765 | 0.25 | 30 | 585 | 1.2 | 45 | 96 | 50 |
| Example 32 | U32 | 5 | PC1 | 0.25 | C3/C4/C5 | 12/7/1 | TINUVIN765 | 0.25 | | | | | | |
| Example 33 | U33 | 5 | PC1 | 0.25 | C3/C4/C5 | 12/7/1 | TINUVIN765 | 0.25 | | | | | | |
| Example 34 | U34 | 5 | PC1 | 0.25 | C6 | 20 | TINUVIN765 | 0.25 | | | | | | |
| Example 35 | U35 | 5 | PC1 | 0.25 | C6 | 20 | TINUVIN765 | 0.25 | | | | | | |
| Example 36 | U36 | 5 | PC1 | 0.25 | C6 | 20 | TINUVIN765 | 0.25 | | | | | | |
| Example 37 | U37 | 5 | PC1 | 0.25 | C6 | 20 | TINUVIN765 | 0.25 | | | | | | |
| Example 38 | U38 | 5 | PC1 | 0.25 | C2 | 20 | TINUVIN765 | 0.25 | | | | | | |
| Example 39 | U39 | 5 | PC1 | 0.25 | C6 | 20 | TINUVIN765 | 0.25 | | | | | | |
| Example 40 | U40 | 5 | PC1 | 0.25 | C6 | 20 | TINUVIN765 | 0.25 | | | | | | |
| Example 41 | U41 | 5 | PC1 | 0.25 | C2 | 20 | TINUVIN765 | 0.25 | | | | | | |
| Example 42 | U27 | 5 | PC1/PC2/PC3 | 0.03/0.04/0.18 | C2 | 20 | TINUVIN765/Irganox245 | 0.25/0.05 | | | | | | |
| Example 43 | U27 | 5 | PC1/PC2/PC3 | 0.03/0.04/0.18 | C2 | 20 | TINUVIN765/Irganox245 | 0.25/0.05 | | | | | | |

TABLE 12-continued

|  |  |  |  |  |  |  |
|---|---|---|---|---|---|---|
| Example 32 | 30 | 585 | 1.0 | 60 | 92 | 45 |
| Example 33 | 30 | 585 | 1.2 | 45 | 93 | 43 |
| Example 34 | 30 | 585 | 1.0 | 60 | 90 | 42 |
| Example 35 | 30 | 585 | 1.0 | 60 | 88 | 43 |
| Example 36 | 30 | 585 | 1.0 | 60 | 97 | 55 |
| Example 37 | 30 | 585 | 1.2 | 70 | 95 | 50 |
| Example 38 | 30 | 585 | 0.7 | 150 | 98 | 40 |
| Example 39 | 30 | 585 | 1.2 | 35 | 70 | 30 |
| Example 40 | 30 | 585 | 1.2 | 30 | 70 | 30 |
| Example 41 | 30 | 585 | 0.6 | 180 | 95 | 35 |
| Example 42 | 30 | 570 | 1.1 | 45 | 97 | 50 |
| Example 43 | 30 | 570 | 1.1 | 45 | 98 | 50 |

TABLE 13

| | A component | | B component | | C component | | Other | | The photochromic charcteristics | | | | | |
|---|---|---|---|---|---|---|---|---|---|---|---|---|---|---|
| | Type | The added amount (g) | Type | The added amount (g) | Type | The added amount (g) | Type | The added amount (g) | The film thickness (μm) | λmax | The color optical density | The color fading speed | The durability | The release strength (N/25 mm) |
| Example 44 | Z1 | 5 | PC1 | 0.25 | C1 | 20 | — | — | 30 | 585 | 1.0 | 90 | 95 | 60 |
| Example 45 | Z2 | 5 | PC1 | 0.25 | C1 | 20 | — | — | 30 | 585 | 1.1 | 50 | 94 | 65 |
| Example 46 | Z3 | 5 | PC1 | 0.25 | C1 | 20 | — | — | 30 | 585 | 1.1 | 40 | 88 | 65 |
| Example 47 | Z4 | 5 | PC1 | 0.25 | C2 | 20 | — | — | 30 | 585 | 1.0 | 80 | 98 | 75 |
| Example 48 | Z5 | 5 | PC1 | 0.25 | C2 | 20 | — | — | 30 | 585 | 1.1 | 55 | 98 | 85 |
| Example 49 | Z6 | 5 | PC1 | 0.25 | C2 | 20 | — | — | 30 | 585 | 1.1 | 45 | 94 | 85 |
| Example 50 | Z7 | 5 | PC1 | 0.25 | C2 | 20 | — | — | 30 | 585 | 1.2 | 40 | 85 | 80 |
| Example 51 | Z8 | 5 | PC1 | 0.25 | C2 | 20 | — | — | 30 | 585 | 1.0 | 70 | 95 | 70 |
| Example 52 | Z9 | 5 | PC1 | 0.25 | C2 | 20 | — | — | 30 | 585 | 1.1 | 50 | 92 | 70 |
| Example 53 | Z10 | 5 | PC1 | 0.25 | C2 | 20 | — | — | 30 | 585 | 1.0 | 50 | 98 | 65 |
| Example 54 | Z11 | 5 | PC1 | 0.25 | C2 | 20 | — | — | 30 | 585 | 1.0 | 40 | 92 | 65 |
| Example 55 | Z12 | 5 | PC1 | 0.25 | C2 | 20 | — | — | 30 | 585 | 0.9 | 60 | 88 | 65 |
| Example 56 | Z13 | 5 | PC1 | 0.25 | C2 | 20 | — | — | 30 | 585 | 0.9 | 75 | 98 | 85 |
| Example 57 | Z14 | 5 | PC1 | 0.25 | C2 | 20 | — | — | 30 | 585 | 0.9 | 65 | 98 | 80 |
| Example 58 | Z15 | 5 | PC1 | 0.25 | C6 | 20 | — | — | 30 | 585 | 1.2 | 40 | 95 | 80 |
| Example 59 | Z16 | 5 | PC1 | 0.25 | C3/C5/C6 | 7/1/12 | — | — | 30 | 585 | 1.2 | 35 | 93 | 70 |
| Example 60 | Z17 | 5 | PC1 | 0.25 | C4/C5/C6 | 9/1/10 | — | — | 30 | 585 | 1.2 | 35 | 90 | 65 |
| Example 61 | Z18 | 5 | PC1 | 0.25 | C2 | 20 | — | — | 30 | 585 | 1.1 | 60 | 98 | 65 |
| Example 62 | Z19 | 5 | PC1 | 0.25 | C2 | 20 | — | — | 30 | 585 | 1.2 | 45 | 96 | 70 |
| Example 63 | Z20 | 5 | PC1 | 0.25 | C2 | 20 | — | — | 30 | 585 | 1.0 | 60 | 98 | 70 |
| Example 64 | Z21 | 5 | PC1 | 0.25 | C2 | 20 | — | — | 30 | 585 | 1.2 | 45 | 97 | 65 |
| Example 65 | Z22 | 5 | PC1 | 0.25 | C2 | 20 | — | — | 30 | 585 | 1.0 | 60 | 97 | 65 |
| Example 66 | Z23 | 5 | PC1 | 0.25 | C2 | 20 | — | — | 30 | 585 | 1.0 | 50 | 98 | 85 |
| Example 67 | Z24 | 5 | PC1 | 0.25 | C2 | 20 | — | — | 30 | 585 | 1.0 | 50 | 97 | 85 |
| Example 68 | Z25 | 5 | PC1 | 0.25 | C2 | 20 | — | — | 30 | 585 | 1.0 | 50 | 92 | 80 |
| Example 69 | Z26 | 5 | PC1 | 0.25 | C2 | 20 | — | — | 30 | 585 | 1.0 | 50 | 98 | 70 |
| Example 70 | Z27 | 5 | PC1 | 0.25 | C2 | 20 | — | — | 30 | 585 | 1.1 | 45 | 80 | 55 |
| Example 71 | Z28 | 5 | PC1 | 0.25 | C2 | 20 | — | — | 30 | 585 | 1.1 | 50 | 98 | 24 |
| Example 72 | Z29 | 5 | PC1 | 0.25 | C2 | 20 | — | — | 30 | 585 | 1.1 | 50 | 98 | 65 |
| Example 73 | Z30 | 5 | PC1 | 0.25 | C2 | 20 | — | — | 30 | 585 | 1.0 | 60 | 98 | 65 |

TABLE 14

| | A component | | B component | | C component | | Other | |
|---|---|---|---|---|---|---|---|---|
| | Type | The added amount (g) | Type | The added amount (g) | Type | The added amount (g) | Type | The added amount (g) |
| Example 74 | Z31 | 5 | PC1 | 0.25 | C1 | 20 | — | — |
| Example 75 | Z32 | 5 | PC1 | 0.25 | C2 | 20 | — | — |
| Example 76 | Z33 | 5 | PC1 | 0.25 | C2 | 20 | — | — |
| Example 77 | Z34 | 5 | PC1 | 0.25 | C2 | 20 | — | — |
| Example 78 | Z35 | 5 | PC1 | 0.25 | C2 | 20 | — | — |
| Example 79 | Z36 | 5 | PC1 | 0.25 | C2 | 20 | — | — |
| Example 80 | Z39 | 5 | PC1/PC2/PC3 | 0.03/0.04/0.18 | C2 | 20 | — | — |
| Example 81 | Z39 | 5 | PC1/PC2/PC3 | 0.03/0.04/0.18 | C2 | 20 | Irganox245 | 0.05 |
| Example 82 | Z40 | 5 | PC1/PC2/PC3 | 0.03/0.04/0.18 | C2 | 20 | — | — |
| Example 83 | Z40 | 5 | PC1/PC2/PC3 | 0.03/0.04/0.18 | C2 | 20 | Irganox245 | 0.05 |

TABLE 14-continued

|  | The film thickness (μm) | λmax | The photochromic charcteristics | | | The release strength (N/25 mm) |
|---|---|---|---|---|---|---|
|  |  |  | The color optical density | The color fading speed | The durability |  |
| Example 74 | 30 | 585 | 1.1 | 50 | 94 | 65 |
| Example 75 | 30 | 585 | 1.1 | 45 | 98 | 85 |
| Example 76 | 30 | 585 | 0.9 | 83 | 98 | 85 |
| Example 77 | 30 | 585 | 0.9 | 85 | 98 | 85 |
| Example 78 | 30 | 585 | 1.1 | 55 | 92 | 80 |
| Example 79 | 30 | 585 | 1.0 | 55 | 91 | 80 |
| Example 80 | 30 | 570 | 1.1 | 45 | 97 | 90 |
| Example 81 | 30 | 570 | 1.1 | 45 | 99 | 90 |
| Example 82 | 30 | 570 | 1.1 | 47 | 97 | 85 |
| Example 83 | 30 | 570 | 1.1 | 48 | 99 | 85 |

TABLE 15

| Example No. | A component | | B component | | D component | | C component | | Other | |
|---|---|---|---|---|---|---|---|---|---|---|
|  | Type | The added amount (g) | Type | The added amount (g) | Type | The added amount (g) | Type | The added amount (g) | Type | The added amount (g) |
| Example 84 | W1 | 5 | PC1 | 0.25 | D1 | 0.15 | C1 | 20 | — | — |
| Example 85 | W2 | 5 | PC1 | 0.25 | D1 | 0.15 | C1 | 20 | — | — |
| Example 86 | W3 | 5 | PC1 | 0.25 | D1 | 0.15 | C2 | 20 | — | — |
| Example 87 | W4 | 5 | PC1 | 0.25 | D1 | 0.15 | C2 | 20 | — | — |
| Example 88 | W5 | 5 | PC1 | 0.25 | D1 | 0.15 | C2 | 20 | — | — |
| Example 89 | W6 | 5 | PC1 | 0.25 | D1 | 0.15 | C2 | 20 | — | — |
| Example 90 | W7 | 5 | PC1 | 0.25 | D1 | 0.15 | C2 | 20 | — | — |
| Example 91 | W8 | 5 | PC1 | 0.25 | D1 | 0.15 | C2 | 20 | — | — |
| Example 92 | W9 | 5 | PC1 | 0.25 | D1 | 0.15 | C1 | 20 | — | — |
| Example 93 | W10 | 5 | PC1 | 0.25 | D1 | 0.15 | C2 | 20 | — | — |
| Example 94 | W11 | 5 | PC1 | 0.25 | D1 | 0.15 | C2 | 20 | — | — |
| Example 95 | W12 | 5 | PC1 | 0.25 | D1 | 0.15 | C2 | 20 | — | — |
| Example 96 | W13 | 5 | PC1 | 0.25 | D1 | 0.15 | C2 | 20 | — | — |
| Example 97 | W14 | 5 | PC1 | 0.25 | D1 | 0.15 | C2 | 20 | — | — |
| Example 98 | W15 | 5 | PC1 | 0.25 | D2 | 0.15 | C2 | 20 | — | — |
| Example 99 | W16 | 5 | PC1 | 0.25 | D2 | 0.15 | C6 | 20 | — | — |
| Example 100 | W17 | 5 | PC1 | 0.25 | D1 | 0.15 | C3/C5/C6 | 7/1/12 | — | — |
| Example 101 | W18 | 5 | PC1 | 0.25 | D1 | 0.15 | C4/C5/C6 | 9/1/10 | — | — |
| Example 102 | W19 | 5 | PC1 | 0.25 | D1 | 0.15 | C2 | 20 | — | — |
| Example 103 | W20 | 5 | PC1 | 0.25 | D1 | 0.15 | C2 | 20 | — | — |
| Example 104 | W21 | 5 | PC1 | 0.25 | D1 | 0.15 | C2 | 20 | — | — |
| Example 105 | W22 | 5 | PC1 | 0.25 | D1 | 0.15 | C6 | 20 | — | — |
| Example 106 | W23 | 5 | PC1 | 0.25 | D1 | 0.15 | C6 | 20 | — | — |
| Example 107 | W24 | 5 | PC1 | 0.25 | D1 | 0.15 | C6 | 20 | — | — |
| Example 108 | W25 | 5 | PC1 | 0.25 | D1 | 0.15 | C6 | 20 | — | — |
| Example 109 | W26 | 5 | PC1 | 0.25 | D1 | 0.15 | C2 | 20 | — | — |
| Example 110 | W27 | 5 | PC1 | 0.25 | D1 | 0.15 | C2 | 20 | — | — |
| Example 111 | W28 | 5 | PC1 | 0.25 | D1 | 0.15 | C2 | 20 | — | — |

| Example No. | The photochromic charcteristics | | | The release strength (N/25 mm) | | The heat resistance (° C.) |
|---|---|---|---|---|---|---|
|  | λmax | The color optical density | The color fading speed | The durability | The initial | After the boiling test | |
| Example 84 | 585 | 1.0 | 90 | 94 | 80 | 70 | 130 |
| Example 85 | 585 | 1.1 | 50 | 92 | 90 | 80 | 135 |
| Example 86 | 585 | 1.0 | 80 | 98 | 120 | 110 | 150 |
| Example 87 | 585 | 1.1 | 55 | 98 | 130 | 115 | 145 |
| Example 88 | 585 | 1.1 | 45 | 94 | 130 | 120 | 145 |
| Example 89 | 585 | 1.2 | 40 | 85 | 120 | 110 | 130 |
| Example 90 | 585 | 1.0 | 70 | 94 | 120 | 110 | 140 |
| Example 91 | 585 | 1.1 | 50 | 90 | 90 | 80 | 135 |
| Example 92 | 585 | 1.1 | 50 | 94 | 110 | 105 | 140 |
| Example 93 | 585 | 1.0 | 50 | 98 | 85 | 80 | 135 |
| Example 94 | 585 | 1.0 | 40 | 92 | 90 | 80 | 120 |
| Example 95 | 585 | 0.9 | 60 | 88 | 80 | 65 | 130 |
| Example 96 | 585 | 1.1 | 45 | 98 | 105 | 100 | 150 |

TABLE 15-continued

| | | | | | | | |
|---|---|---|---|---|---|---|---|
| Example 97  | 585 | 0.9 | 75 | 98 | 90  | 85  | 150 |
| Example 98  | 585 | 0.9 | 65 | 98 | 90  | 80  | 150 |
| Example 99  | 585 | 1.2 | 40 | 95 | 110 | 100 | 110 |
| Example 100 | 585 | 1.2 | 35 | 93 | 90  | 80  | 100 |
| Example 101 | 585 | 1.2 | 35 | 90 | 80  | 70  | 90  |
| Example 102 | 585 | 1.1 | 60 | 98 | 115 | 105 | 140 |
| Example 103 | 585 | 1.2 | 45 | 96 | 110 | 105 | 130 |
| Example 104 | 585 | 1.0 | 60 | 98 | 95  | 90  | 135 |
| Example 105 | 585 | 1.2 | 45 | 97 | 90  | 80  | 130 |
| Example 106 | 585 | 1.0 | 60 | 97 | 85  | 75  | 140 |
| Example 107 | 585 | 0.9 | 83 | 98 | 120 | 110 | 130 |
| Example 108 | 585 | 0.9 | 85 | 98 | 110 | 105 | 125 |
| Example 109 | 585 | 1.0 | 50 | 92 | 110 | 100 | 135 |
| Example 110 | 585 | 1.0 | 50 | 98 | 90  | 80  | 125 |
| Example 111 | 585 | 1.1 | 46 | 90 | 110 | 100 | 140 |

TABLE 16

| A component | | B component | | D component | | C component | | Other | |
|---|---|---|---|---|---|---|---|---|---|
| Type | The added amount (g) | Type | The added amount (g) | Type | The added amount (g) | Type | The added amount (g) | Other Type | |
| W5  | 5 | PC1 | 0.25 | D1 | 0.004 | C2 | 20 | — | |
| W5  | 5 | PC1 | 0.25 | D1 | 0.02  | C2 | 20 | — | |
| W5  | 5 | PC1 | 0.25 | D1 | 0.5   | C2 | 20 | — | |
| W5  | 5 | PC1 | 0.25 | D1 | 0.9   | C2 | 20 | — | |
| W5  | 5 | PC1 | 0.25 | D2 | 0.18  | C6 | 20 | — | |
| W5  | 5 | PC1 | 0.25 | D3 | 0.11  | C6 | 20 | — | |
| W5  | 5 | PC1 | 0.25 | D4 | 0.13  | C6 | 20 | — | |
| W5  | 5 | PC1 | 0.25 | D5 | 0.34  | C6 | 20 | — | |
| W5  | 5 | PC1 | 0.25 | D6 | 0.53  | C6 | 20 | — | |
| W5  | 5 | PC1 | 0.25 | D7 | 1.53  | C6 | 20 | — | |
| W29 | 5 | PC1/PC2/PC3 | 0.03/0.04/0.18 | D1 | 0.25 | C6/C7 | 8/12 | — | |
| W29 | 5 | PC1/PC2/PC3 | 0.03/0.04/0.18 | D1 | 0.25 | C6/C7 | 8/12 | Irganox245 | |
| W30 | 5 | PC1/PC2/PC3 | 0.03/0.04/0.18 | D1 | 0.25 | C6/C7 | 8/12 | — | |
| W30 | 5 | PC1/PC2/PC3 | 0.03/0.04/0.18 | D1 | 0.25 | C6/C7 | 8/12 | Irganox245 | |
| W31 | 5 | PC1/PC2/PC3 | 0.03/0.04/0.18 | D1 | 0.25 | C6/C7 | 8/12 | — | |
| W31 | 5 | PC1/PC2/PC3 | 0.03/0.04/0.18 | D1 | 0.25 | C6/C7 | 8/12 | Irganox245 | |

| Other | The photochromic charcteristics | | | The release strength (N/25 mm) | | The heat |
|---|---|---|---|---|---|---|
| The added amount (g) | λmax | The color optical density | The color fading speed | The durability | The initial | After the boiling test | resistance (° C.) |
| —    | 585 | 1.1 | 55 | 98 | 90  | 85  | 130 |
| —    | 585 | 1.1 | 55 | 98 | 100 | 95  | 130 |
| —    | 585 | 1.1 | 60 | 91 | 110 | 100 | 150 |
| —    | 585 | 1.1 | 65 | 86 | 105 | 85  | 160 |
| —    | 585 | 1.1 | 54 | 98 | 120 | 110 | 140 |
| —    | 585 | 1.1 | 52 | 98 | 120 | 115 | 140 |
| —    | 585 | 1.1 | 56 | 92 | 110 | 90  | 150 |
| —    | 585 | 1.1 | 55 | 98 | 120 | 110 | 135 |
| —    | 585 | 1.1 | 55 | 98 | 110 | 100 | 135 |
| —    | 585 | 1.1 | 50 | 95 | 90  | 70  | 120 |
| —    | 570 | 1.1 | 45 | 97 | 130 | 120 | 130 |
| 0.05 | 570 | 1.1 | 45 | 99 | 130 | 120 | 130 |
| —    | 570 | 1.1 | 48 | 97 | 120 | 110 | 140 |
| 0.05 | 570 | 1.1 | 49 | 99 | 120 | 110 | 135 |
| —    | 570 | 1.1 | 41 | 97 | 100 | 90  | 110 |
| 0.05 | 570 | 1.1 | 42 | 99 | 100 | 90  | 105 |

Comparative Examples 1 to 7

The preparation of the photochromic composition and the production of the photochromic laminated article were carried out as the same method as the example 1, except for using the polyurethane-urea resin, the photochromic compound and the organic solvent a shown in Table 17. The evaluation results of the obtained various photochromic multilayer bodies are shown in Table 17.

hexylisocyanate) were added into the three-necked flask having a stirring blade, a cooling pipe, a thermometer, and nitrogen gas introducing pipe; and reacted for 6 hours at 90° C. under the nitrogen atmosphere, thereby obtained the prepolymer having the isocyanate group at the terminal end. Then, after 200 ml of DMF was added, 12.7 g of 1,4-butanediol was dropped under the nitrogen atmosphere, and it was reacted for 24 hours at 90° C. after the dropping was completed; thereby the polyurethane resin (II) having the hydroxyl group at the

TABLE 17

| | A component | | B component | | C component | | Additives | | The film thickness (μm) | The photochromic charcteristics | | | | The release strength (N/25 mm) |
|---|---|---|---|---|---|---|---|---|---|---|---|---|---|---|
| | Type | The added amount (g) | Type | The added amount (g) | Type | The added amount (g) | Type | The added amount (g) | | λmax | The color optical density | The color fading speed | The durability | |
| Comparative example 1 | U42 | 5 | PC1 | 0.25 | C6 | 20 | — | — | 30 | 585 | 1.1 | 70 | 90 | 20 |
| Comparative example 2 | U43 | 5 | PC1 | 0.25 | C6 | 20 | — | — | 30 | 585 | 0.9 | 100 | 90 | 20 |
| Comparative example 3 | U44 | 5 | PC1 | 0.25 | C6 | 20 | — | — | 30 | 585 | 1.2 | 45 | 70 | 15 |
| Comparative example 4 | U45 | 5 | PC1 | 0.25 | C6 | 20 | — | — | 30 | 585 | 1.1 | 65 | 85 | 15 |
| Comparative example 5 | U46 | 5 | PC1 | 0.25 | C6 | 20 | — | — | 30 | 585 | 0.9 | 100 | 60 | 20 |
| Comparative example 6 | Z37 | 5 | PC1 | 0.25 | C2 | 20 | — | — | 30 | 585 | 1.0 | 42 | 80 | 50 |
| Comparative example 7 | Z38 | 5 | PC1 | 0.25 | C2 | 20 | — | — | 30 | 585 | 1.1 | 38 | 60 | 20 |

Comparative Example 8

The polyurethane resin (I) comprising the isocyanate group in the terminal end of the molecular chain, and the polyurethane resin (ii) comprising the hydroxyl group at the terminal end of the molecular chain were prepared as described in below.
(The Preparation of the Polyurethane Resin (I))

100 g of polycaprolactonepolyol (Praccel made by DAICEL CORPORATION) having the number average molecular weight of 1000, 39.5 g of 4,4'-methylenebis(cyclohexylisocyanate) were added into the three-necked flask having a stirring blade, a cooling pipe, a thermometer, and nitrogen gas introducing pipe; and reacted for 6 hours at 90° C. under the nitrogen atmosphere, thereby obtained the prepolymer (the polyurethane resin (I)) having the isocyanate group at the terminal end. The number average molecular weight of the obtained prepolymer (the polyurethane resin (I)) was 2500 in terms of polyoxyethylene (the theoretical value; 2800).
(The Preparation of the Polyurethane Resin (II))

100 g of polycaprolactonepolyol (Praccel made by DAICEL CORPORATION) having the number average molecular weight of 1000, 61.3 g of 4,4'-methylenebis(cycloterminal end of the molecular chain was prepared. The number average molecular weight of the obtained polyurethane resin (II) was 20000 in terms of the polyoxyethylene (the theoretical value; 18000).

By using, the polyurethane resin (I) and polyurethane resin (II) obtained in the above, THF (C6) as the organic solvent in the blending amount shown in Table 18, and 0.25 g of the photochromic compound (PC1), the photochromic composition was prepared by the same method as example 84. Also, by using the obtained photochromic composition, the photochromic laminated article was produced by the same method as example 84.

The evaluation results of the various obtained photochromic laminated article are shown in Table 18.

TABLE 18

| Comparative example No. | polyurethane resin | | polyurethane resin | | B component | | C component | | The photochromic charcteristics | | | | The release strength (N/25 mm) | | The heat resistance (° C.) |
|---|---|---|---|---|---|---|---|---|---|---|---|---|---|---|---|
| | Type | The added amount (g) | Type | The added amount (g) | Type | The added amount (g) | Type | The added amount (g) | λmax | The color optical density | The color fading speed | The durability | The initial | After the boiling test | |
| Comparative example 8 | (I) | 2.5 | (II) | 2.5 | PC1 | 0.25 | C6 | 20 | 587 | 1.1 | 50 | 60 | 80 | 40 | 80 |

As clear from the above examples 1 to 43, the polyurethane resin prepared using the suitable ratio of the polyol compound (A1 component), the polyisocyanate compound (A2 component), and the amino group containing compound (A3) in accordance with the present invention has excellent photochromic characteristic, the adhesive strength and the heat resistance.

Further, as clear from the above examples 44 to 83, the polyurethane-urea resin prepared by using the suitable ratio of the functionalization compound (A4 component) comprising the piperidine structure, the hindered phenol structure, the triazine structure or the benzotriazol structure within the molecule, in addition to A1 to A3 components, has further excellent photochromic characteristic, the adhesive strength (the adhesion) and the heat resistance.

Also, as clear from the above examples of 84 to 127, the photochromic composition mixed with the polyurethane-urea resin (A component), and the isocyanate compound (D component) according to the invention, has excellent photochromic characteristic, and the adhesive strength (the adhesion), and the heat resistance, and particularly has excellent adhesive strength (the adhesion).

On the other hand, in the comparative examples 1 to 5, the diol compound was used instead of the amino group containing compound, thus the adhesive strength and the heat resistance are lowered, and it did not simultaneously satisfy all of the physical properties.

Also, in the comparative example 6, by using the polydiol compound having the molecular weight of 400 to the chain extender, the weather resistance, the heat resistance, and further the adhesive strength further decreased. Also, as the comparative example 7, when the urethane resin was prepared without using A3 component which is the amino group containing compound, the softening point became too low, and the durability (the photochromic characteristic) and the adhesive strength declined.

Further, in the comparative example 8, the urethane resin composition made in to a high molecular weight after the film forming and mixing the prepolymer comprising the isocyanate group at the terminal end and the polyurethane resin comprising the hydroxyl group at the terminal end is used. However, in this case, the durability of the photochromic characteristic and further the adhesive strength were not sufficient.

The Preparation of the Adhesive Agent

The adhesive agent 1: the urethane(meth)acrylate adhesive agent 50 parts by weight of urethane oligomer tetra acrylate (tetrafunctional, U-4HA made by Shin-Nakamura Chemical Co., Ltd), 40 parts by weight of triethyleneglycoldimethacrylate (bifunctional), 10 parts by weight of γ-glycidoxypropylmethacrylate (bifunctional), and 0.5 parts by weight of mixed product (Irgacure 1870 made by CIBA Speciality Chemicals.) having 3:7 ratio of 1-hydroxycyclohexylphenylketone as the photopolymerization initiator and bis(2,6-dimethoxybenzoyl)-2,4,4-trimethyl-pentylphosphineoxide were stir mixed; thereby the adhesive agent 1 was obtained.

The adhesive agent 2: the 2 liquid type urethane adhesive agent 38 parts by weight of the urethane prepolymer having the hydroxyl group at the terminal end by reacting isophoronediisocyanate and polycarbonate polyol having the number average molecular weight of 800 in the mol ratio of 3:4, and 200 parts by weight of THF were mixed; and 5 parts by weight of isocyanurate modified hexamethylene diisocyanate having the isocyanate group at the terminal end were added; thereby the adhesive agent 2 was obtained.

The Adhesive Agent 3: The Moisture Curable Urethane Adhesive Agent

Under the nitrogen gas atmosphere, 18 parts by weight of polycarbonate diol having the number average molecular weight of 800, 10 parts by weight of isophoronediisocyanate, 100 parts by weight of DMF were prepared, and reacted for 5 hours at 100° C. under the nitrogen atmosphere; then 1.2 parts by weight of 1,4-butanediol as the chain extender were dropped and continued to react for 5 hours at 100° C., followed by removing the solvent by reduced pressure thereby obtained the polyurethane resin.

To 100 g of the obtained polyurethane resin, 50 g of THF as the organic solvent was added, then dissolved by stirring at the room temperature; thereby the adhesive agent 3 was obtained.

The Adhesive Agent 4: The Urethane Dead Polymer Adhesive Agent

To 10 g of polyurethane-urea resin (W4), 50 g of propyleneglycol-monomethylether as the organic solvent was added, then dissolved by stirring at the room temperature; thereby the adhesive agent 4 was obtained.

Example 128

The Preparation of the Photochromic Composition

To 5 g of polyurethane-urea resin (W29), 20 g of THF as the organic solvent was added, and stirred at 80° C. while dissolving by ultrasonic wave. After the polyurethane-urea resin was confirmed being dissolved, it was cooled to the room temperature, then 0.15 g of isophoronediisocyanate (D component) and 0.25 g of the photochromic compound (PC1) were added and stir mixed to obtain the photochromic composition.

The Production of the Photochromic Laminated Article

The adhesive agent 1 was coated on the polycarbonate sheet having the thickness of 400 μm, and by using F3000SQ (D valve) made by Fusion UV Systems JapanKK., it was photocured for 1 minute in the nitrogen flow, thereby obtained the polycarbonate sheet having the adhesive layer of layer thickness of 5 μm.

The above mentioned photochromic composition was coated on the PET film (Purex film with silicone coating film made by Teijin DuPont Films Japan Limited.), and dried for 30 minutes at 50° C. in the experiment room under the presence of the moist (23° C., relative humidity of 50%), then the photochromic adhesive sheet having the thickness of 40 μm was obtained by removing the PET film. Next, the obtained photochromic adhesive sheet was placed between two polycarbonate sheets having the above mentioned adhesive layer, and left for 24 hours at 40° C. in the experiment room under the presence of the moist (23° C., relative humidity of 50%), then it was further heat treated for 60 minutes at 110° C.; thereby the laminated article having the photochromic characteristic of the subject was obtained.

When the obtained photochromic laminated article was evaluated, the color optical density was 1.1, and the color fading speed was 98% as the photochromic characteristic. Also, the initial adhesive strength was 150N/25 mm, and after the boiling test it was 130N/25 mm. Note that, these evaluations were carried out as same as the example 1, and regarding the adhesive strength, the measurement was carried out to the initial one and those after one hour from the boiling test using the distilled water.

Examples 129 to 135

The photochromic composition was prepared by the same method as the example 128 except for using the polyurethane-urea resin, the isocyanate compound, the organic solvent shown in Table 19. Note that, obviously, as same as the example 128, the photochromic compound (PC1) was mixed so that it is 5 parts by weight (the actual used amount 0.25 g) with respect to polyurethane-urea resin (A component). Also, the photochromic laminated article was produced by the same method as the example 128 using the obtained photochromic composition, and the adhesive agent shown in Table 19. Note that, the drying and the curing of each adhesive layer was carried out by the method described in the following.

The evaluation results of the obtained various photochromic laminated article are shown in Table 19.

The curing method of the adhesive agent 1: the same method as the example 128.

The curing method of the adhesive agent 2: the adhesive agent 2 was coated on the polycarbonate sheet having the thickness of 400 μm, and cured by drying for 2 hours at 110° C., thereby the polycarbonate sheet having the adhesive layer of thickness of 5 μm.

The curing method of the adhesive agent 3: the adhesive agent 3 was coated on the polycarbonate sheet having the thickness of 400 μm, and dried for 5 minutes at 110° C., then left for 1 hour under the humidified condition (40° C., 80% RH), thereby the polycarbonate sheet having the adhesive layer of thickness of 5 μm.

The curing method of the adhesive agent 4: the adhesive agent 4 was coated on the polycarbonate sheet having the thickness of 400 μm, and dried for 10 minutes at 110° C., thereby the polycarbonate sheet having the adhesive layer of thickness of 5 μm.

TABLE 19

| Example No. | A component | | B component | | D component | | C component | | Other | |
|---|---|---|---|---|---|---|---|---|---|---|
| | Type | The added amount (g) | Type | The added amount (g) | Type | The added amount (g) | Type | The added amount (g) | Type | The added amount (g) |
| Example 128 | W29 | 5 | PC1 | 0.25 | D1 | 0.15 | C6 | 20 | — | — |
| Example 129 | W29 | 5 | PC1 | 0.25 | D1 | 0.15 | C6 | 20 | — | — |
| Example 130 | W29 | 5 | PC1 | 0.25 | D1 | 0.15 | C6 | 20 | — | — |
| Example 131 | W29 | 5 | PC1 | 0.25 | D1 | 0.15 | C6 | 20 | — | — |
| Example 132 | W16 | 5 | PC1 | 0.25 | D1 | 0.15 | C6 | 20 | Irganox245 | 0.15 |
| Example 133 | W16 | 5 | PC1 | 0.25 | D1 | 0.15 | C6 | 20 | Irganox245 | 0.15 |
| Example 134 | W16 | 5 | PC1 | 0.25 | D1 | 0.15 | C6 | 20 | Irganox245 | 0.15 |
| Example 135 | W16 | 5 | PC1 | 0.25 | D1 | 0.15 | C6 | 20 | Irganox245 | 0.15 |

| Example No. | Adhesive agent | The photochromic charcteristics | | | | The release strength (N/25 mm) | |
|---|---|---|---|---|---|---|---|
| | | λmax | The color optical density | The color fading speed | The durability | The initial | After the boiling test |
| Example 128 | Adhesive agent 1 | 585 | 1.1 | 43 | 98 | 150 | 130 |
| Example 129 | Adhesive agent 2 | 585 | 1.1 | 43 | 98 | 150 | 140 |
| Example 130 | Adhesive agent 3 | 585 | 1.1 | 42 | 98 | 170 | 160 |
| Example 131 | Adhesive agent 4 | 585 | 1.1 | 43 | 98 | 180 | 170 |
| Example 132 | Adhesive agent 1 | 585 | 1.2 | 40 | 99 | 150 | 130 |
| Example 133 | Adhesive agent 2 | 585 | 1.2 | 41 | 99 | 160 | 150 |
| Example 134 | Adhesive agent 3 | 585 | 1.2 | 41 | 99 | 180 | 170 |
| Example 135 | Adhesive agent 4 | 585 | 1.2 | 41 | 99 | 190 | 180 |

The invention claimed is:

1. A photochromic composition, comprising:
    (A) a polyurethane-urea resin having an urea bond in a molecular chain; and
    (B) a photochromic compound,
    wherein (A) the polyurethane-urea resin has a piperidine structure, a hindered phenol structure, a triazine structure, or a benzotriazol structure at a terminal end.

2. The photochromic composition as set forth in claim 1, wherein said (A) polyurethane-urea resin is the polyurethane-urea resin obtained by reacting,
    (A1) at least one polyol compound selected from the group consisting of polyether polyol, polycarbonate polyol, polycaprolactone polyol, and polyester polyol,
    (A2) a polyisocyanate compound having two or more isocyanate groups in the molecule,
    (A3) an amino group containing compound having two or more groups capable of reacting with the isocyanate group, and among these groups, at least one of the groups are amino group, and
    (A4) a functionalization compound having one or two groups, in the molecule, capable of reacting with the isocyanate group and having the piperidine structure, the hindered phenol structure, the triazine structure, or the benzotriazol structure in the molecule.

3. The photochromic composition as set forth in claim 2, wherein an amount ratio of components (A1), (A2), (A3), and (A4) used when obtaining (A) the polyurethane-urea resin satisfies n1:n2:n3:n4=0.3 to 0.89:1.0:0.1 to 0.69:0.01 to 0.2,
    wherein a total mol number of a hydroxyl group included in said component (A1) is n1, a total mol number of an isocyanate group included in said component (A2) is n2, a total mol number of an amino croup included in said component (A3) is n3, and a total mol number of groups capable of reacting with isocyanate group included in said component (A4) is n4.

4. The photochromic composition as set forth in claim 2, wherein (A1) the polyol compound has a molecular weight of 400 to 3000, and (A3) the amino group containing compound has a molecular weight of 50 to 300.

5. The photochromic composition as set forth in claim 2 wherein (A3) the amino group containing compound is at least one selected from the group consisting of diamine, triamine, aminoalcohol, aminocarboxylic acid, and aminothiol.

6. The photochromic composition as set forth in claim 1 wherein the content of (B) the photochromic compound is 0.1 to 20 parts by weight with respect to 100 parts by weight of said (A) polyurethane-urea resin.

7. The photochromic composition as set forth in claim 1 wherein 5 to 900 parts by weight of (C) an organic solvent is further comprised with respect to 100 parts by weight of (A) the polyurethane-urea resin.

8. An optical article having a multilayer structure wherein two optical sheets or films facing each other are bound via an adhesive layer comprising the photochromic composition as set forth in claim 1.

9. A production method of the optical article as set forth in claim 8, comprising:
forming a photochromic adhesive sheet comprising (A) the polyurethane-urea resin and (B) the photochromic compound dispersed in (A) the polyurethane-urea resin, by extending the photochromic composition comprising (A) the polyurethane-urea resin having the urea bond in the molecular chain, (B) the photochromic compound and (C) the organic solvent of 5 to 900 parts by weight with respect to 100 parts by weight of (A) the polyurethane-urea resin on a flat and smooth base material,
removing (C) the organic solvent by drying and separating the base material; and
forming said multilayer structure by binding two optical sheets or films by placing said photochromic adhesive sheet in between two optical sheets or films facing each other.

10. An optical article having a multilayer structure wherein two optical sheets or films facing each other are bound via a first adhesive layer comprising the photochromic composition as set forth in claim 1, and a second adhesive layer present at both sides of said first adhesive layer.

11. A photochromic composition comprising (A) a polyurethane-urea resin having an urea bond in the molecular chain, (B) a photochromic compound, and (D) an isocyanate compound having at least one isocyanate group in the molecule.

12. The photochromic composition as set forth in claim 11 wherein (A) the polyurethane-urea resin is terminated at the terminal end by reacting the terminal end thereof with (A5) a terminator having a group capable of reacting with one isocyanate group in the molecule.

13. The photochromic composition as set forth in claim 11 wherein (A) the polyurethane-urea resin has a piperidine structure, a hindered phenol structure, a triazine structure, or a benzotriazol structure at the terminal end.

14. The photochromic composition as set forth in claim 11 wherein (A) the polyurethane-urea resin is the polyurethane-urea resin obtained by reacting,
(A1) at least one polyol compound selected from the group consisting of polyether polyol, polycarbonate polyol, polycaprolactone polyol, and polyester polyol,
(A2) a polyisocyanate compound having two or more isocyanate group, in the molecule,
(A3) an amino group containing compound having two or more groups capable of reacting with the isocyanate group, and among these groups, at least one of the groups are amino group, and
(A4) a functionalization compound having one or two groups, in the molecule, capable of reacting with the isocyanate group and having the piperidine structure, the hindered phenol structure, the triazine structure, or the benzotriazol structure in the molecule.

15. The photochromic composition as set forth in claim 14 wherein an amount ratio of components (A1), (A2), (A3), and (A4) used when obtaining (A) the polyurethane-urea resin satisfies n1:n2:n3:n4=0.3 to 0.89:1.0:0.1 to 0.69:0.01 to 0.2,
wherein a total mol number of a hydroxyl group included in said component (A1) is n1, a total mol number of an isocyanate group included in said component (A2) is n2, a total mol number of an amino group included in said component (A3) is n3, and a total mol number of groups capable of reacting with isocyanate group included in said component (A4) is n4.

16. The photochromic composition as set forth in claim 11 wherein (D) the isocyanate compound has a molecular weight of less than 1000.

17. The photochromic composition as set forth in claim 11 wherein the content of (B) the photochromic compound is 0.1 to 20 parts by weight with respect to 100 parts by weight of said (A) polyurethane-urea resin.

18. The photochromic composition as set forth in claim 11 wherein 5 to 900 parts by weight of (C) an organic solvent is further comprised with respect to 100 parts by weight of (A) the polyurethane-urea resin.

19. An optical article having a multilayer structure wherein two optical sheets or films facing each other are bound via an adhesive layer comprising the photochromic composition as set forth in claim 11.

20. A production method of the optical article as set forth in claim 19, comprising:
forming a photochromic adhesive sheet comprising (A) the polyurethane-urea resin and (B) the photochromic compound dispersed in (A) the polyurethane-urea resin, by extending the photochromic composition comprising (A) the polyurethane-urea resin having the urea bond in the molecular chain, (B) the photochromic compound, (D) the isocyanate compound comprising at least one isocyanate group in the molecule and (C) the organic solvent of 5 to 900 parts by weight with respect to 100 parts by weight of (A) the polyurethane-urea resin on a flat and smooth base material,
removing (C) the organic solvent by drying and separating the base material; and
forming said multilayer structure by binding two optical sheets or films by placing said photochromic adhesive sheet in between two optical sheets or films facing each other.

21. An optical article having a multilayer structure wherein two optical sheets or films facing each other are bound via a first adhesive layer comprising the photochromic composition as set forth in claim 11, and a second adhesive layer present at both sides of said first adhesive layer.

* * * * *